US011036027B2

(12) United States Patent
Matsuhisa et al.

(10) Patent No.: US 11,036,027 B2
(45) Date of Patent: Jun. 15, 2021

(54) HOUSING, LENS DRIVE DEVICE PROVIDED WITH SAME, IMAGING DEVICE, ELECTRONIC APPARATUS, AND HOUSING PRODUCTION METHOD

(71) Applicant: Nidec Copal Corporation, Tokyo (JP)

(72) Inventors: Haruka Matsuhisa, Tokyo (JP); Yusuke Ehara, Tokyo (JP)

(73) Assignee: Nidec Copal Corporation, Tokyo (JP)

(*) Notice: Subject to any disclaimer, the term of this patent is extended or adjusted under 35 U.S.C. 154(b) by 603 days.

(21) Appl. No.: 15/580,215

(22) PCT Filed: Jun. 7, 2016

(86) PCT No.: PCT/JP2016/066956
§ 371 (c)(1),
(2) Date: Nov. 5, 2018

(87) PCT Pub. No.: WO2016/199776
PCT Pub. Date: Dec. 15, 2016

(65) Prior Publication Data

US 2019/0064476 A1 Feb. 28, 2019

(30) Foreign Application Priority Data

Jun. 12, 2015 (JP) ............................ JP2015-119833
Jun. 12, 2015 (JP) ............................ JP2015-119834
Jun. 12, 2015 (JP) ............................ JP2015-119835

(51) Int. Cl.
*G02B 7/09* (2021.01)
*G03B 5/00* (2021.01)
(Continued)

(52) U.S. Cl.
CPC ................ *G02B 7/09* (2013.01); *G02B 7/08* (2013.01); *G02B 27/646* (2013.01); *G03B 3/10* (2013.01);
(Continued)

(58) Field of Classification Search
CPC .......... G02B 27/646; G02B 7/08; G02B 7/09; G03B 2205/0015; G03B 2205/0069;
(Continued)

(56) References Cited

U.S. PATENT DOCUMENTS

2010/0098394 A1* 4/2010 Ishihara .............. G02B 27/646 396/55
2012/0050895 A1 3/2012 Kotanagi
(Continued)

FOREIGN PATENT DOCUMENTS

CN 102385136 A 3/2012
JP 2011-65140 A 3/2011
(Continued)

OTHER PUBLICATIONS

The First Office Action issued in corresponding Chinese Patent Application No. 201680032782.4 dated Oct. 9, 2019, with English translation.

(Continued)

*Primary Examiner* — Joseph P Martinez
*Assistant Examiner* — Vipin Patel
(74) *Attorney, Agent, or Firm* — Troutman Pepper Hamilton Sanders LLP

(57) ABSTRACT

The housing includes a plate-shaped base; and a cover provided with a bottom plate and a side plate, and covers a main surface of the base. The base has in the main surface, a wall part which extends along the peripheral edge of the main surface, and faces the side plate of the cover. The side plate having an opening exposing a portion of the wall part. An adhesive bonding the base and the cover together is provided in a gap between the wall part and the side plate. The cross-sectional area of the gap in a cross section orthogonal to at least one direction from the direction from the wall part exposed from the opening, to either end of the
(Continued)

wall part in the length direction, and the direction from the height-direction end of the wall part exposed from the opening, to the main surface of the base, decreases in said at least one direction.

11 Claims, 61 Drawing Sheets

(51) Int. Cl.
*G03B 3/10* (2021.01)
*H04N 5/225* (2006.01)
*G02B 7/08* (2021.01)
*G02B 27/64* (2006.01)

(52) U.S. Cl.
CPC ............. *G03B 5/00* (2013.01); *H04N 5/2252* (2013.01); *H04N 5/2254* (2013.01); *G03B 2205/0015* (2013.01); *G03B 2205/0069* (2013.01)

(58) Field of Classification Search
CPC .......... G03B 3/10; G03B 5/00; H04N 5/2252; H04N 5/2254
See application file for complete search history.

(56) References Cited

U.S. PATENT DOCUMENTS

2013/0136438 A1* 5/2013 Lee .......................... G02B 7/08 396/133
2015/0014141 A1* 1/2015 Rao ..................... B32B 37/1284 200/600
2015/0212291 A1* 7/2015 Lee .......................... G02B 7/08 348/360

FOREIGN PATENT DOCUMENTS

JP 2011-187697 A 9/2011
JP 2012-47906 A 3/2012
JP 2011-48319 A 3/2014
JP 2014-179795 A 9/2014
WO 2014/178260 A1 11/2014

OTHER PUBLICATIONS

International Search Report dated Sep. 6, 2016 during the prosecution of in International Application No. PCT/JP2016/066956.

* cited by examiner

[FIG. 1]
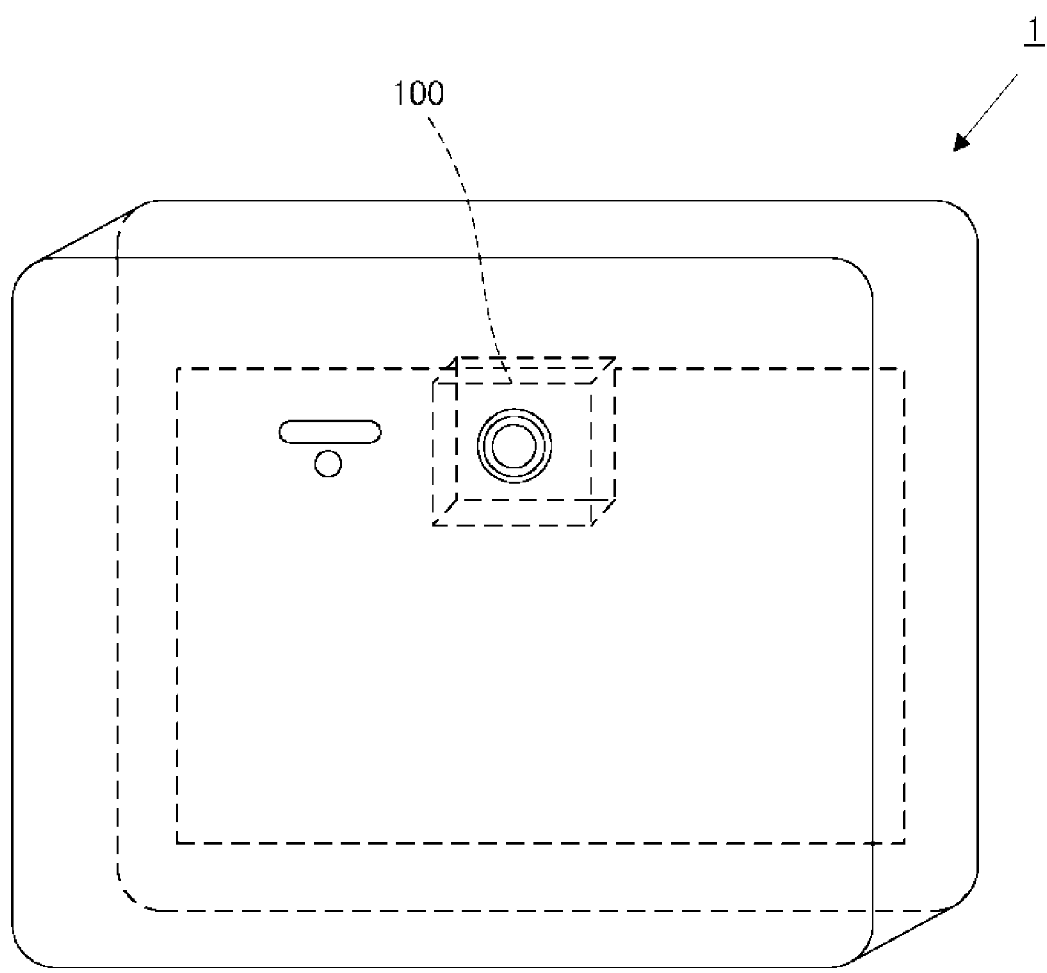

[FIG. 2]
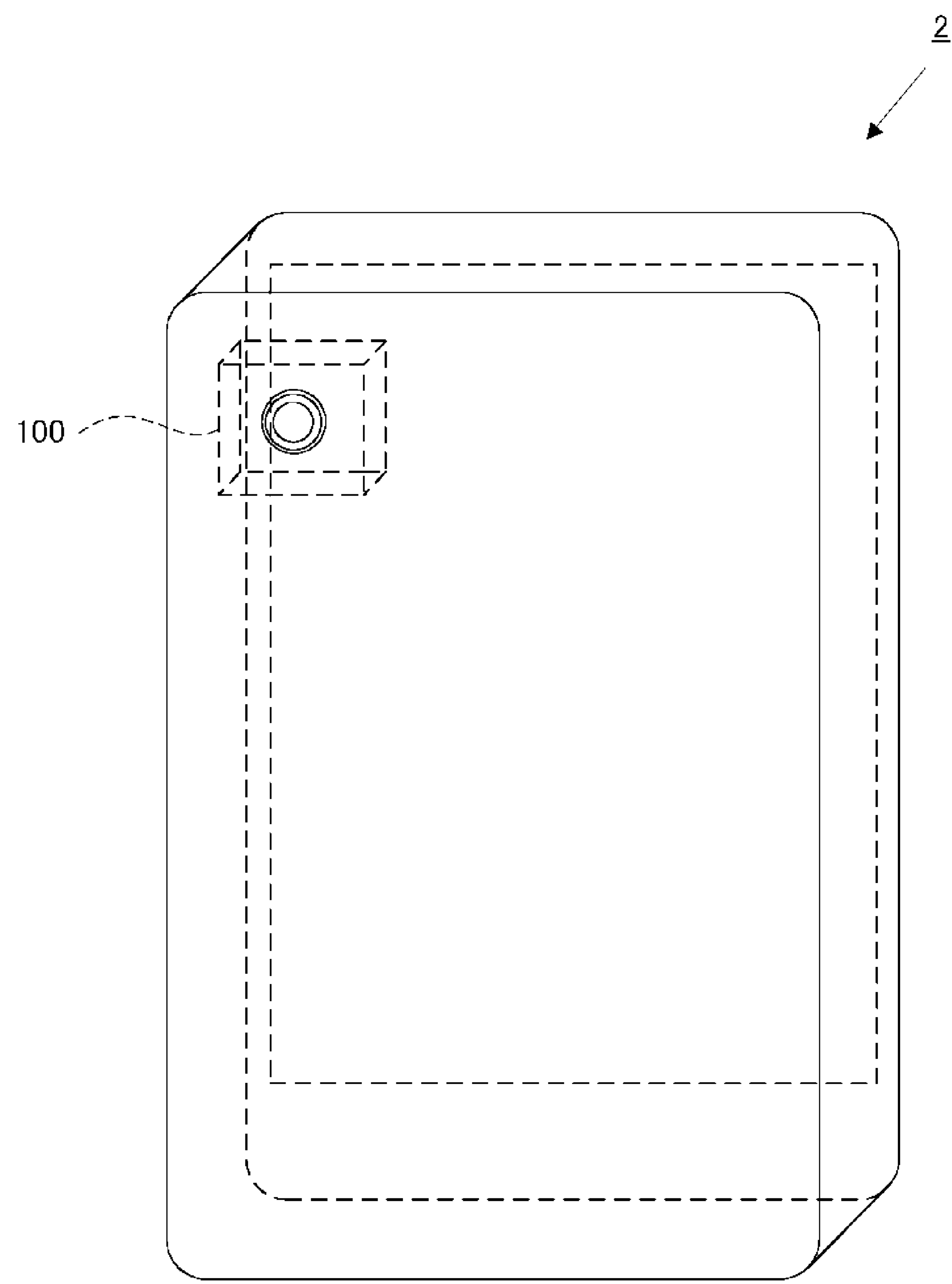

[FIG. 3]
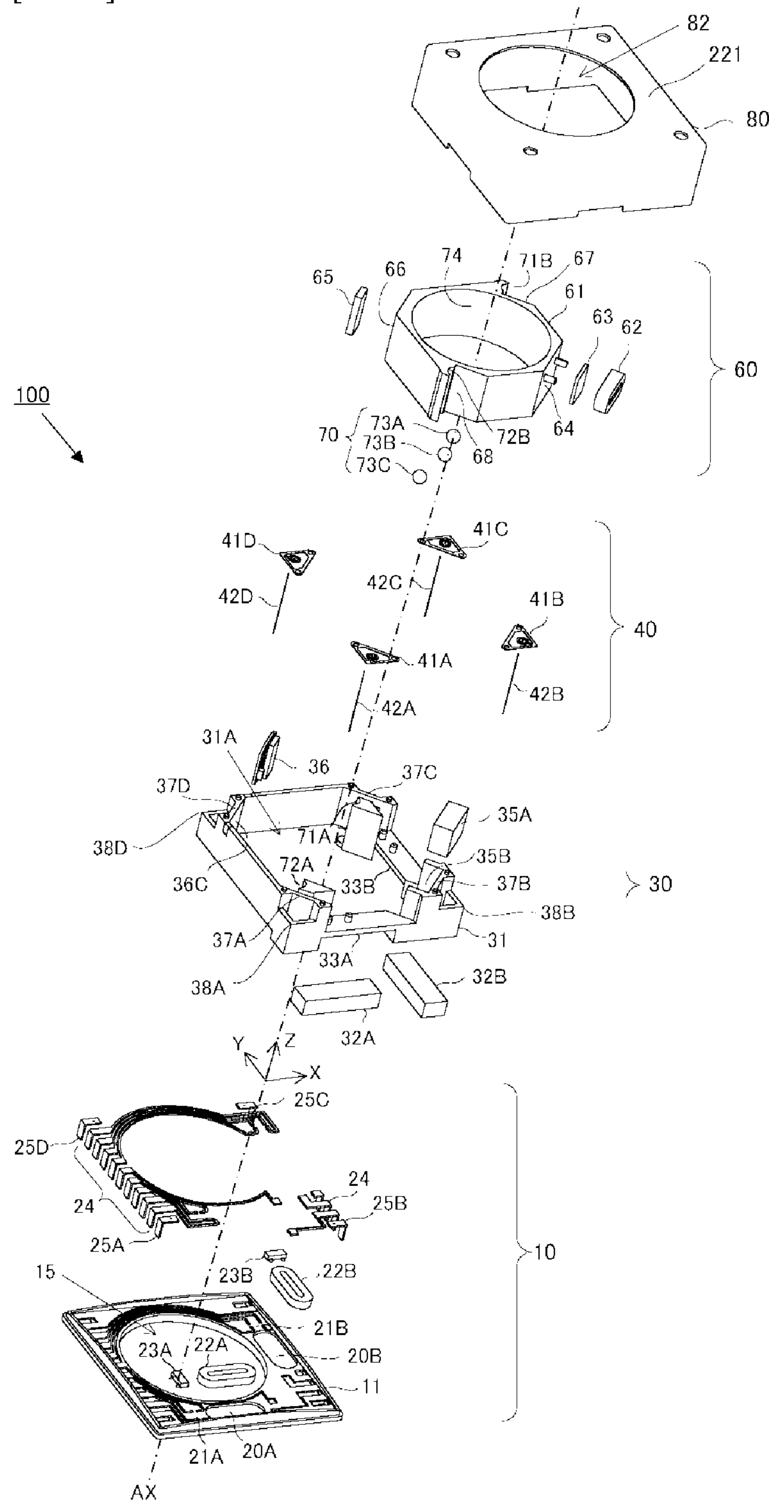

[FIG. 4]
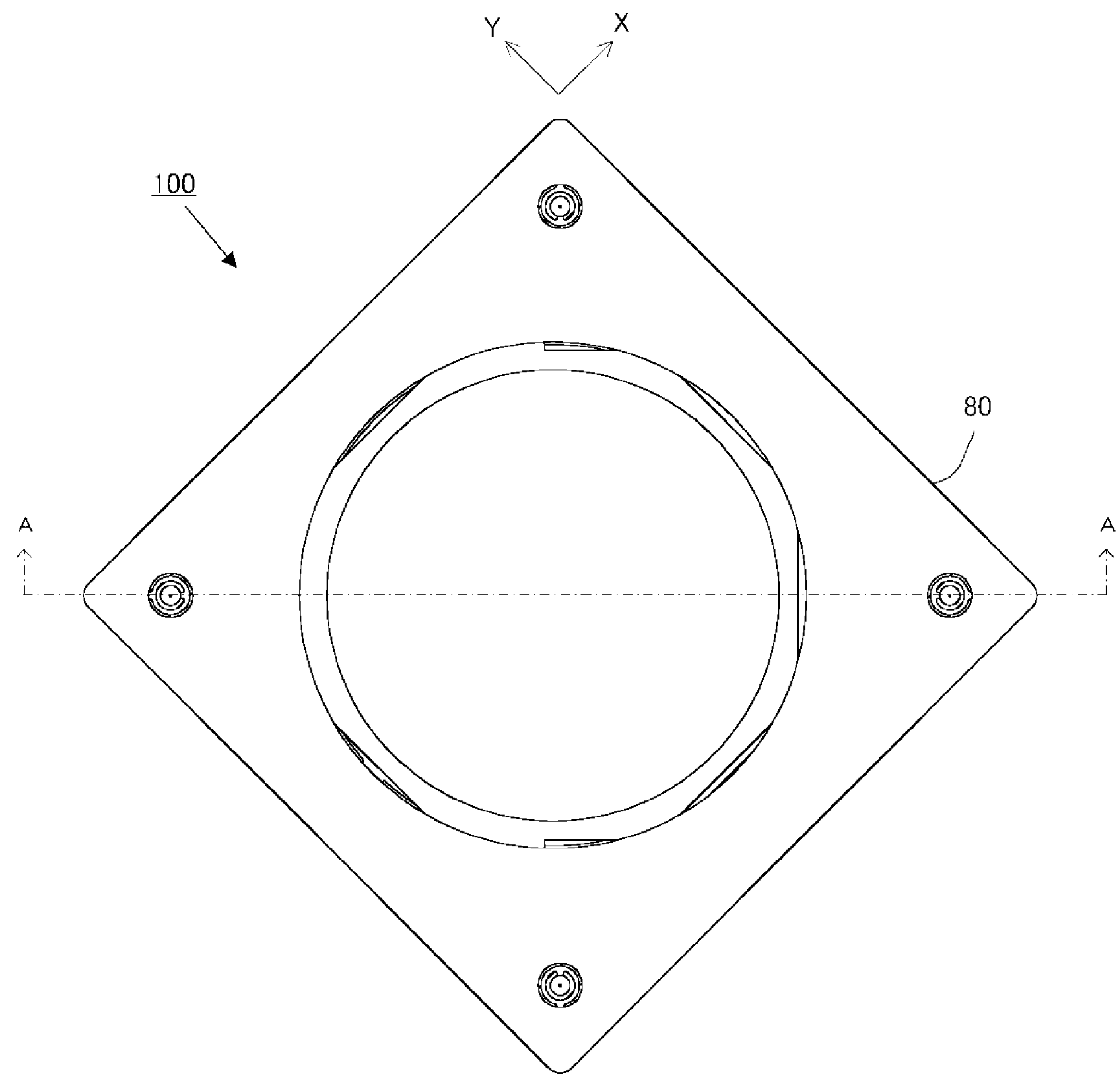

[FIG. 5]
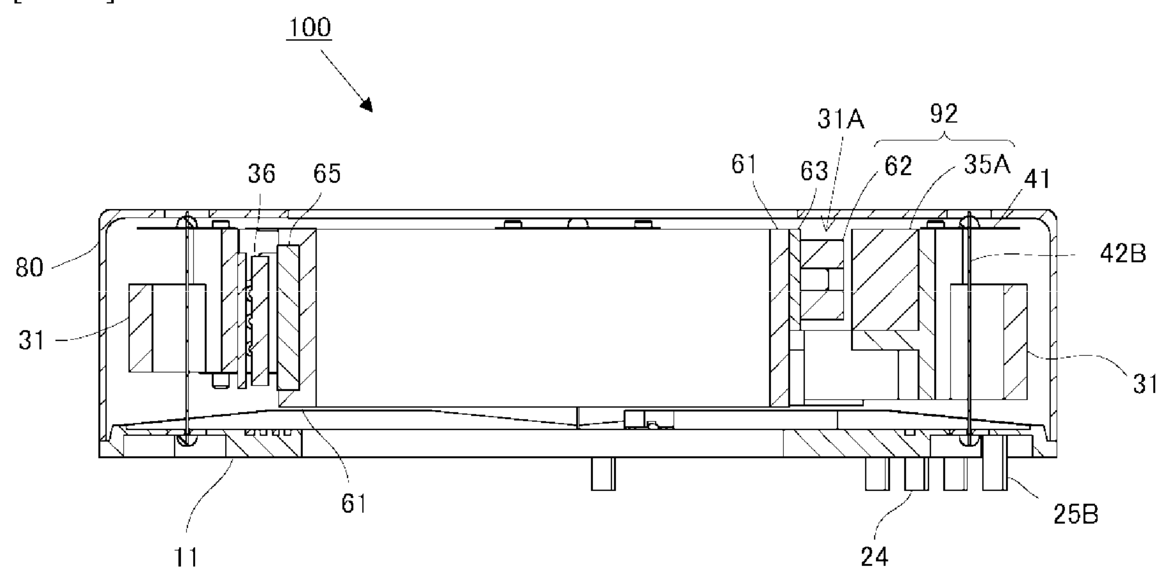

[FIG. 6]
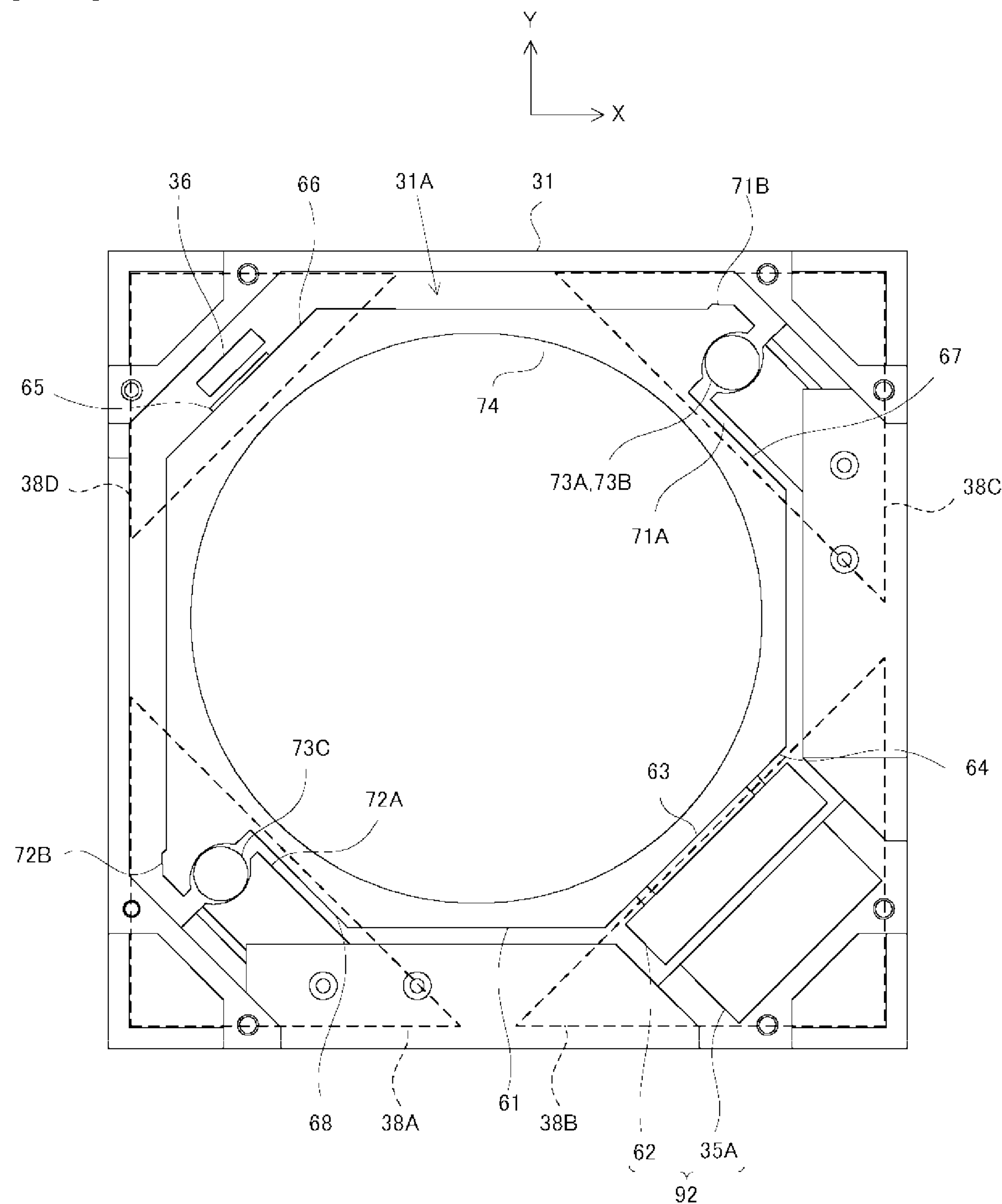

[FIG. 7]
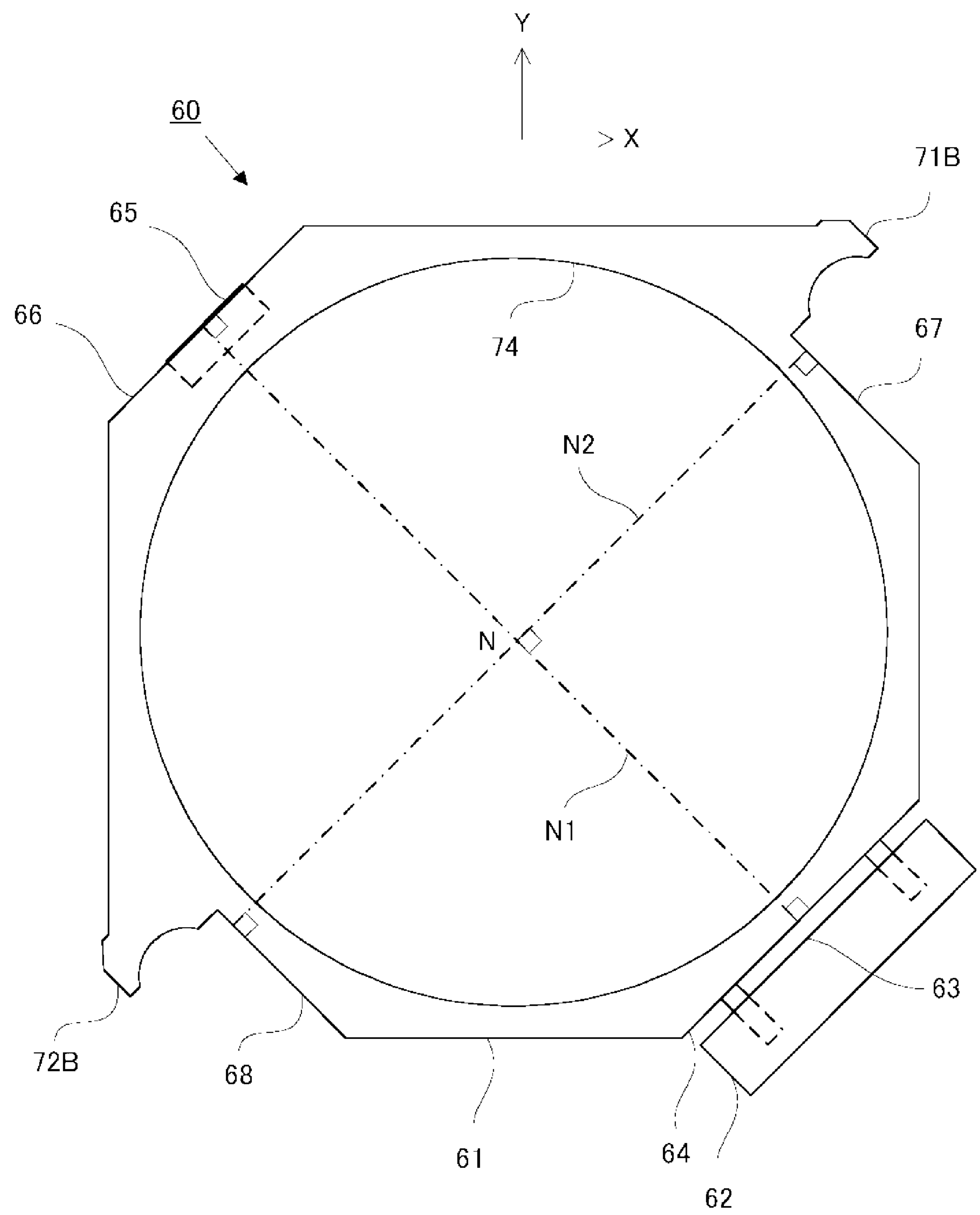

[FIG. 8]
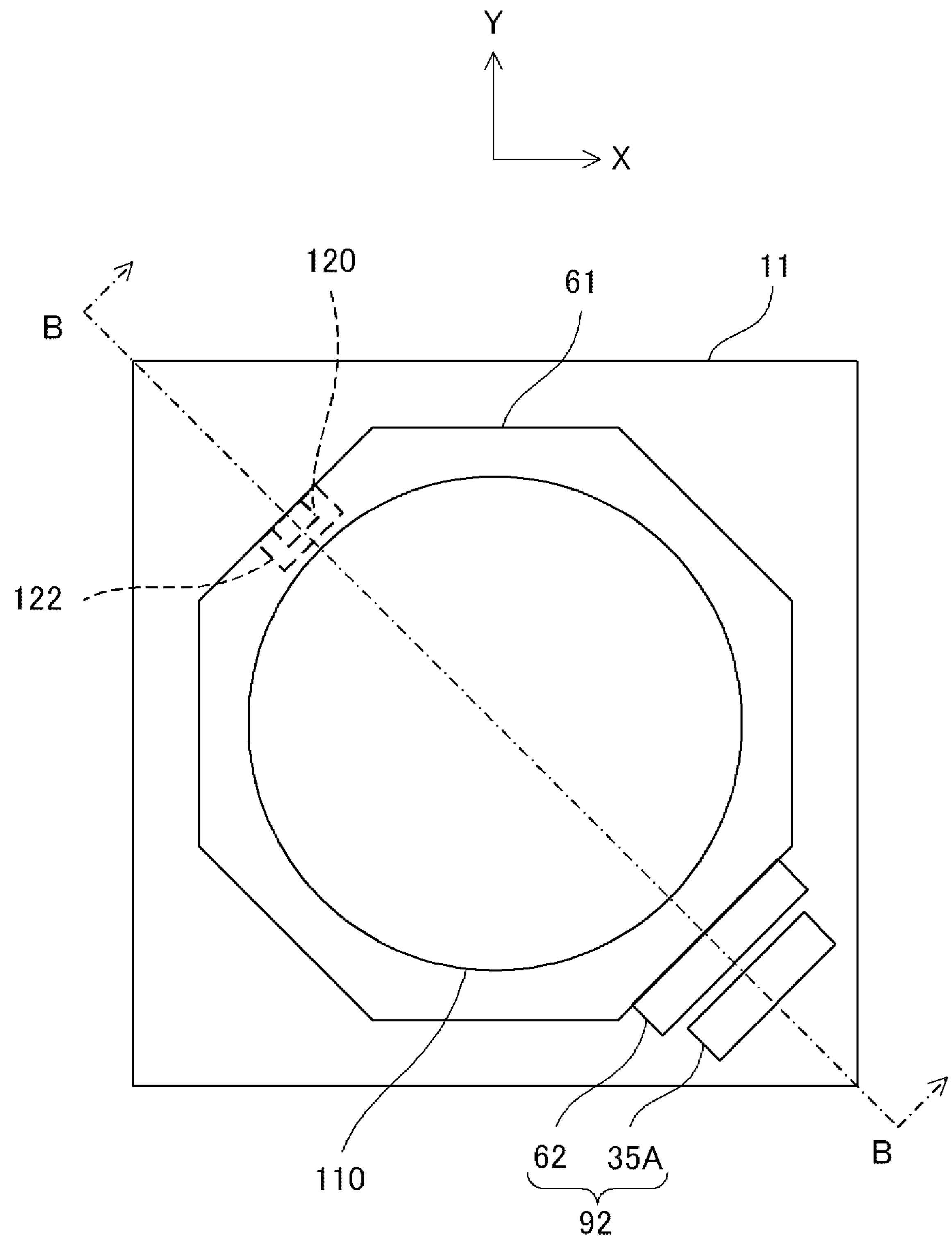

[FIG. 9]
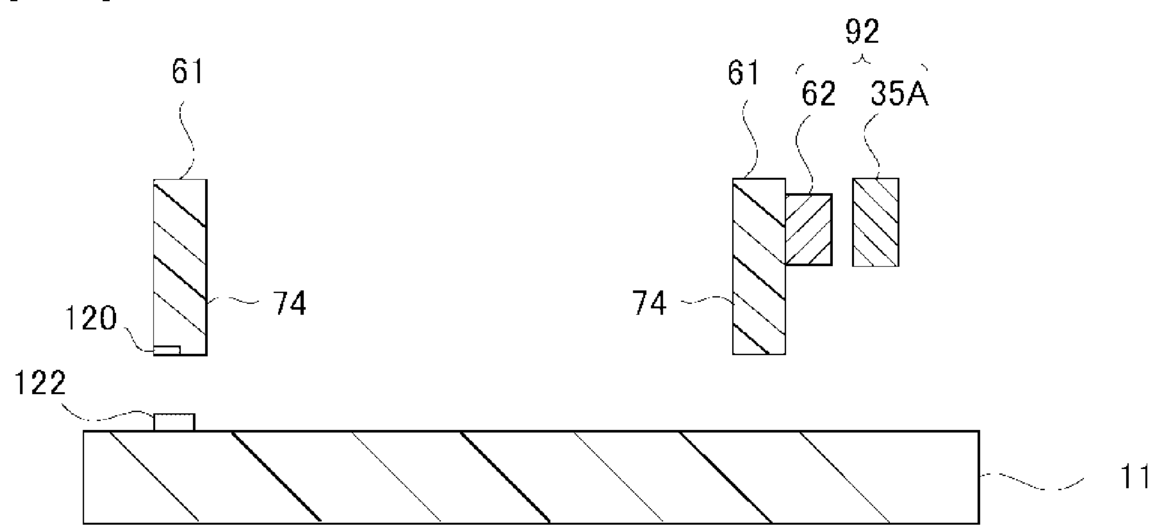

[FIG. 10A]
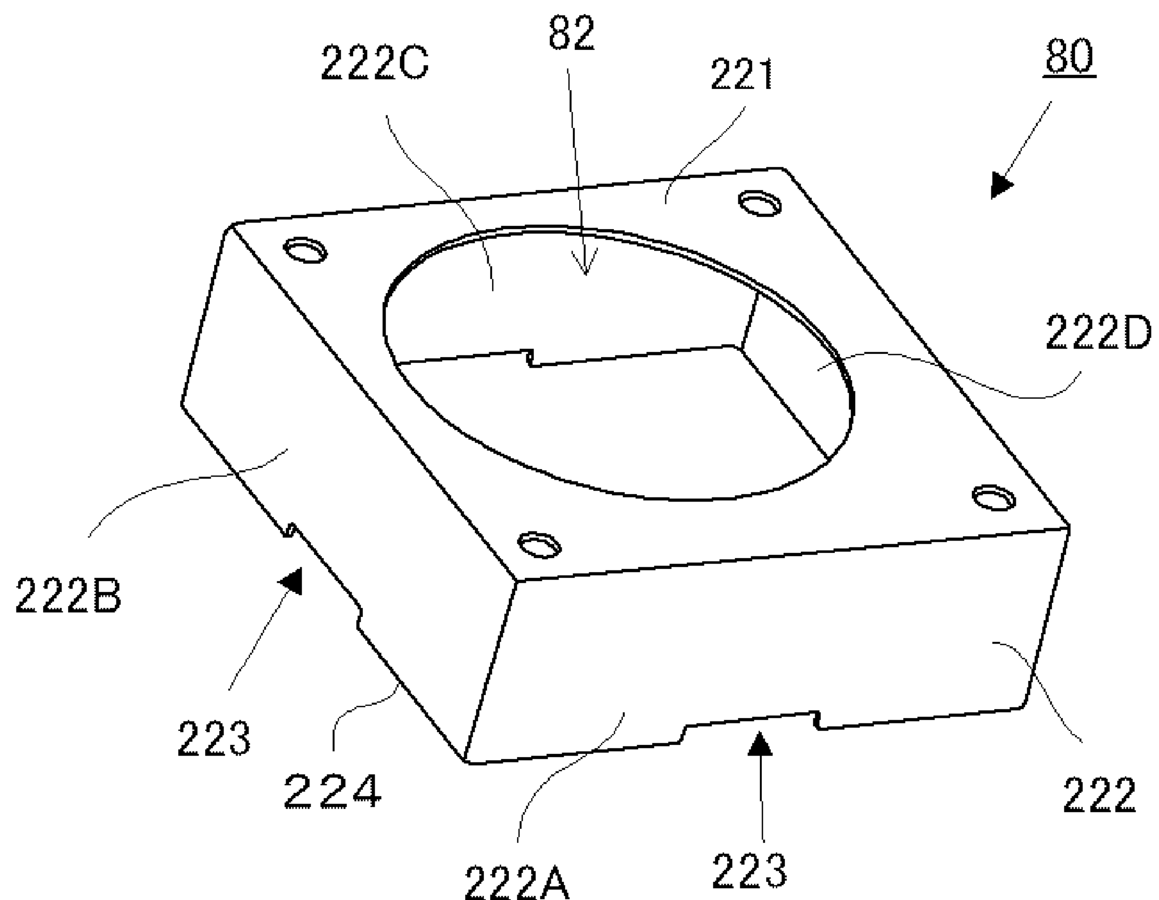

[FIG. 10B]
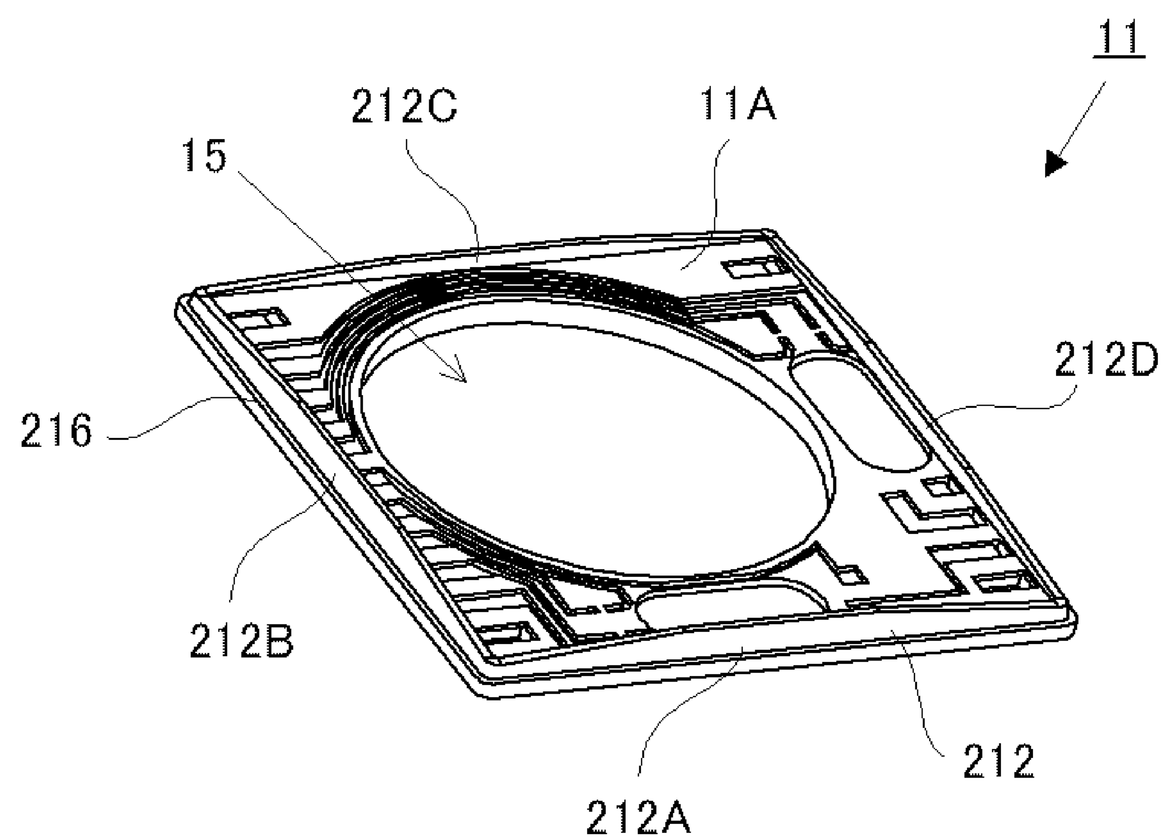

[FIG. 11A]
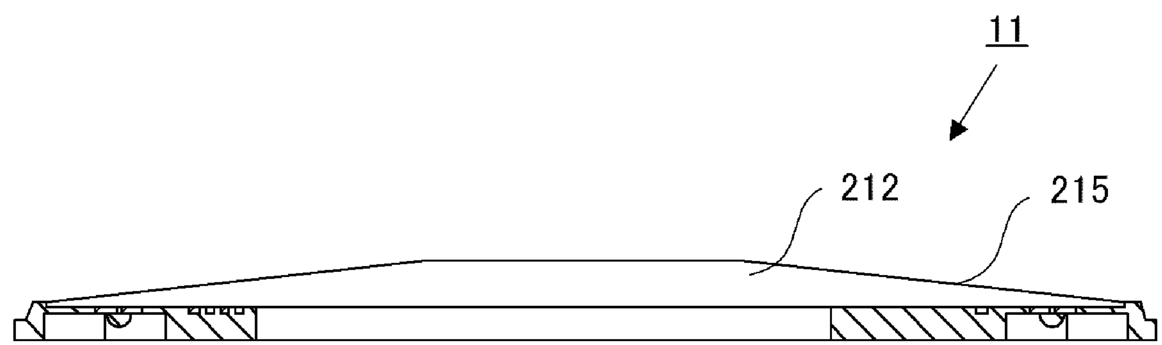

[FIG. 11B]
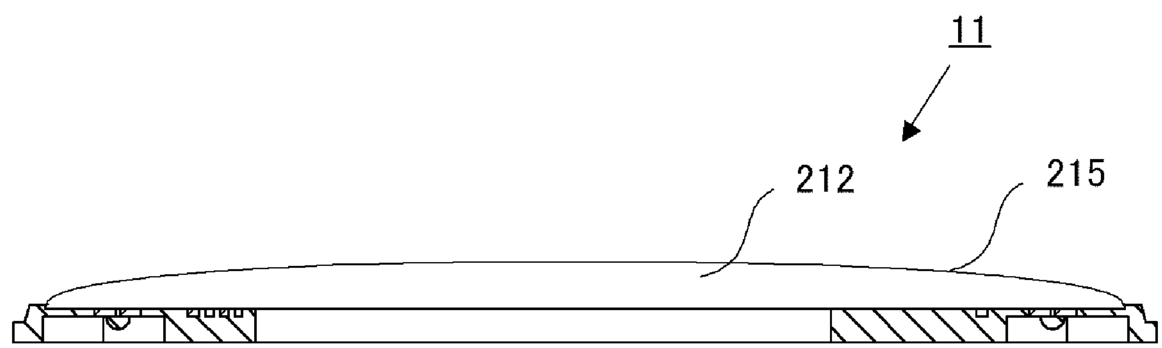

[FIG. 11C]
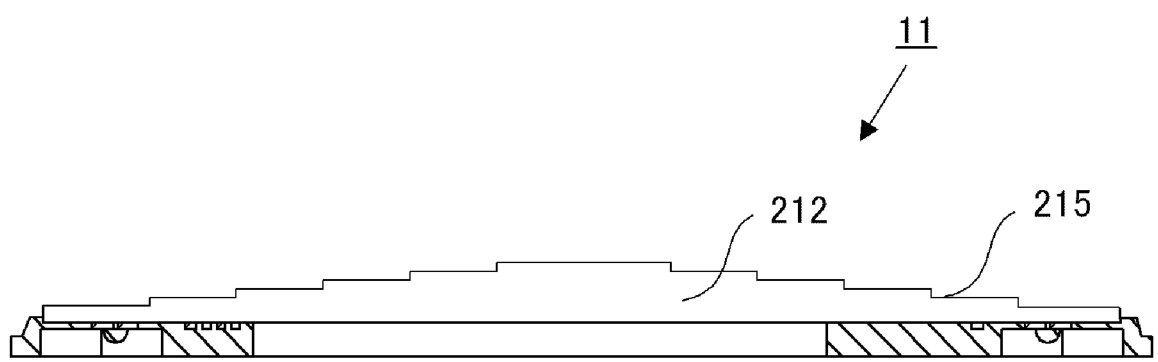

[FIG. 11D]
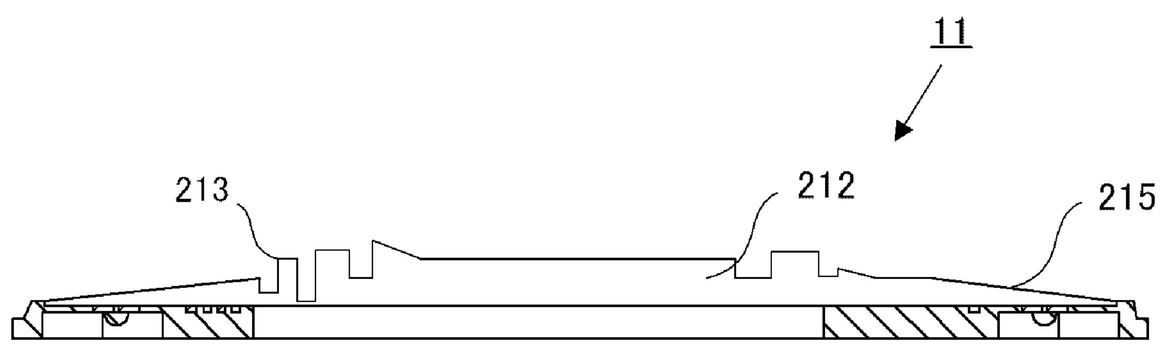

[FIG. 12A]
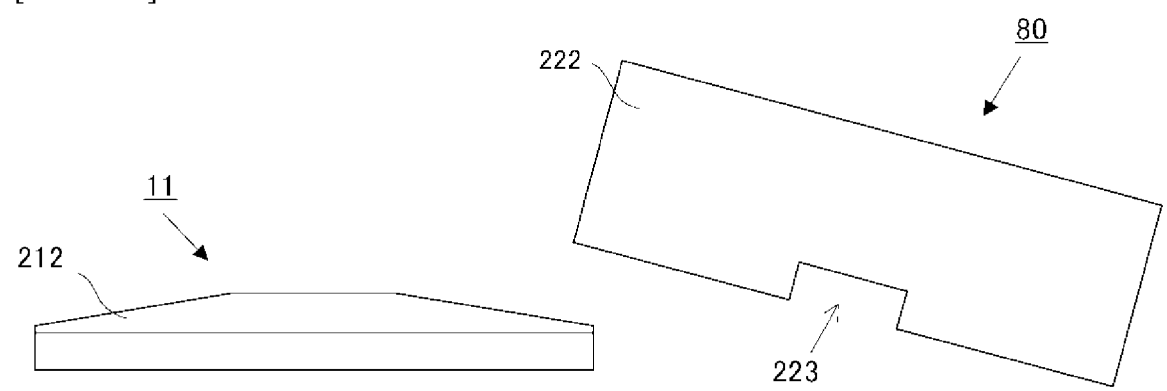

[FIG. 12B]
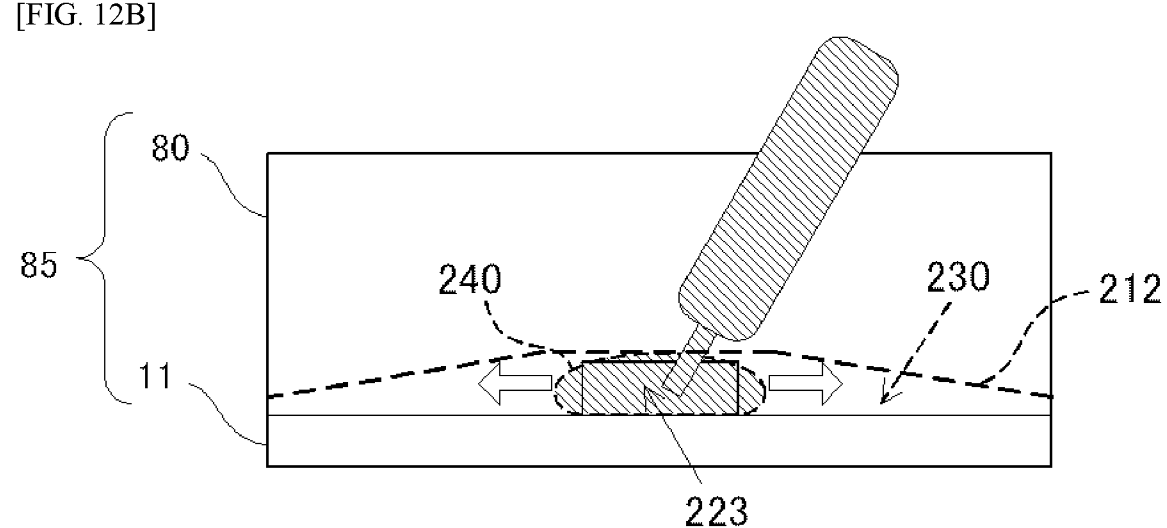

[FIG. 12C]
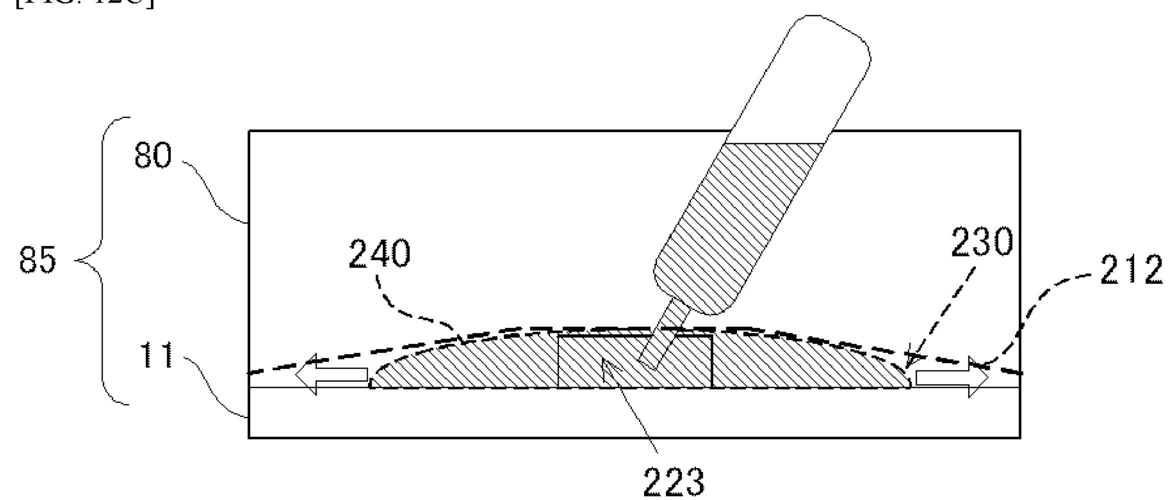

[FIG. 12D]
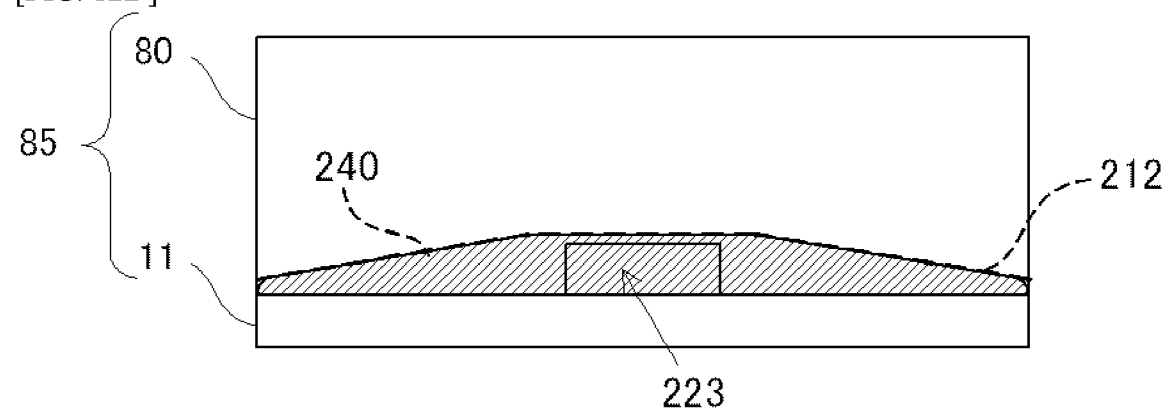

[FIG. 13A]
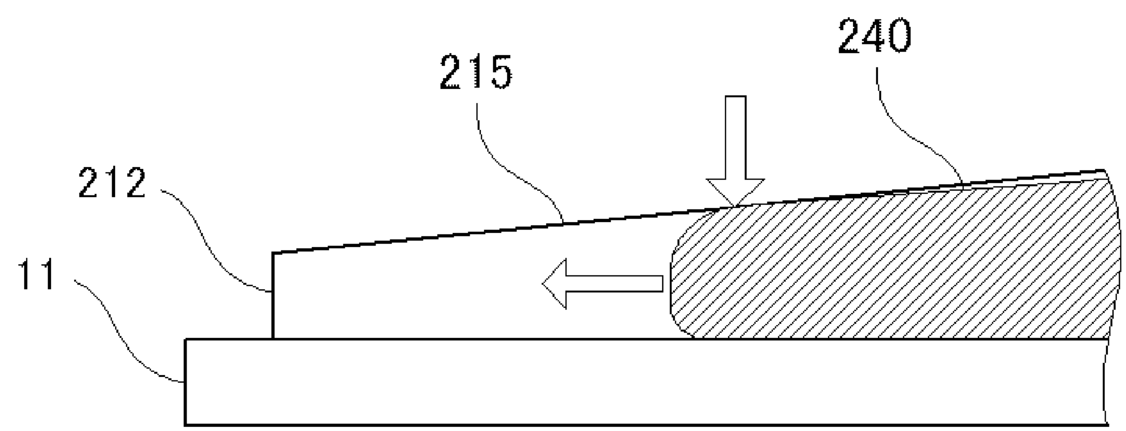

[FIG. 13B]
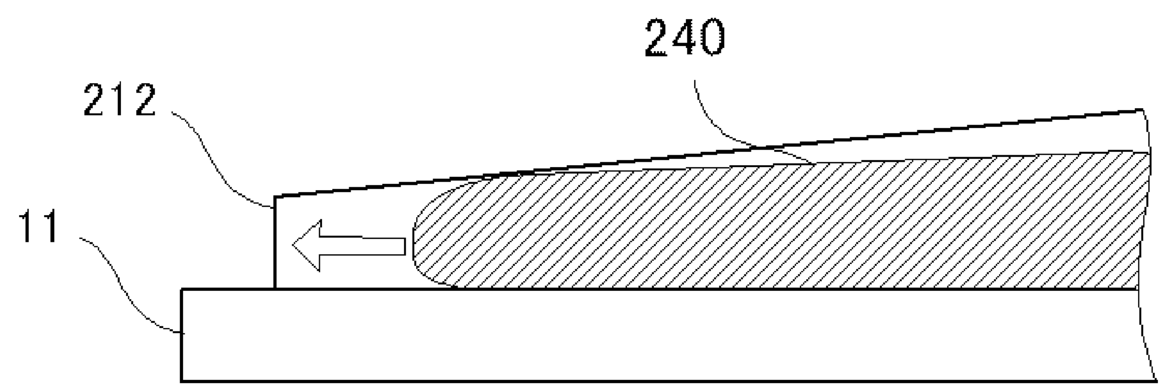

[FIG. 14A]
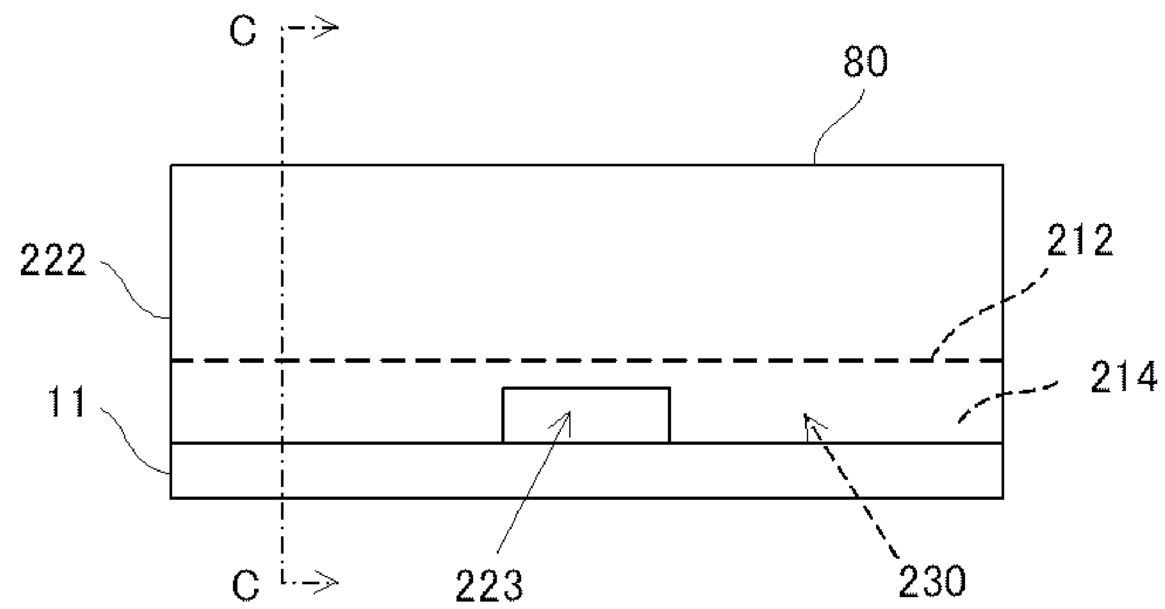

[FIG. 14B]
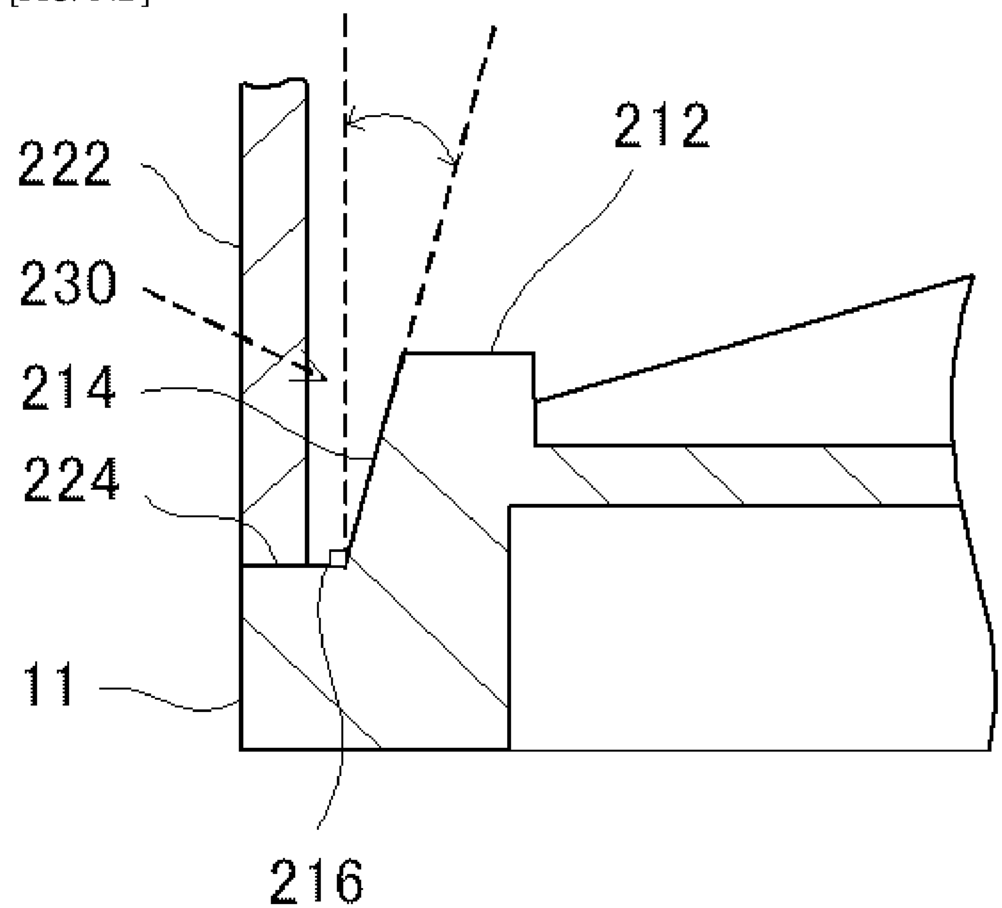

[FIG. 15A]
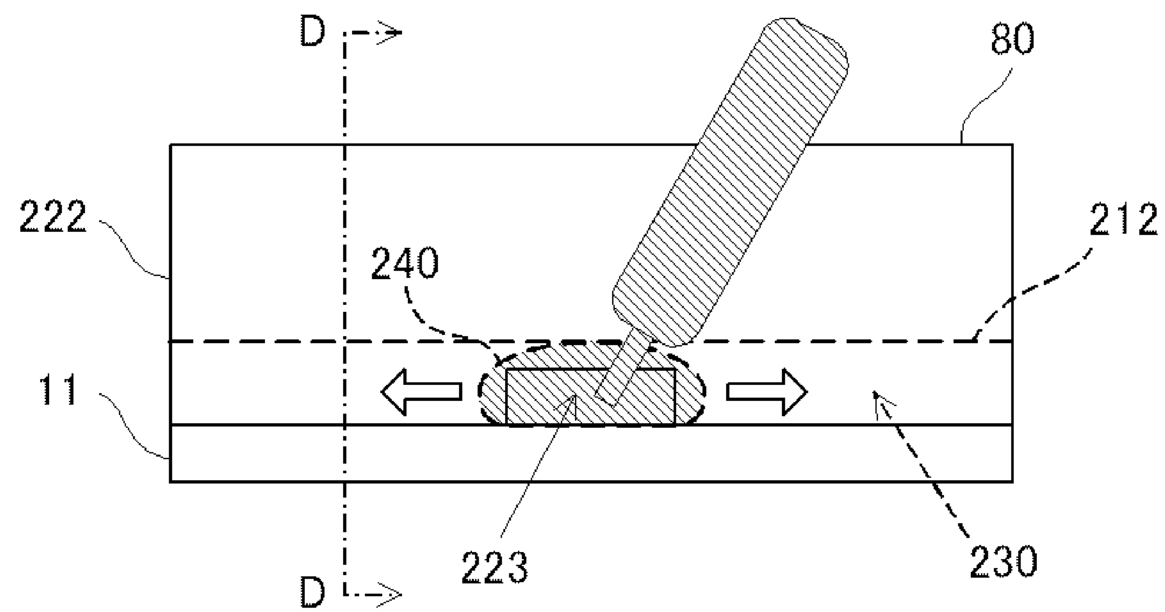

[FIG. 15B]
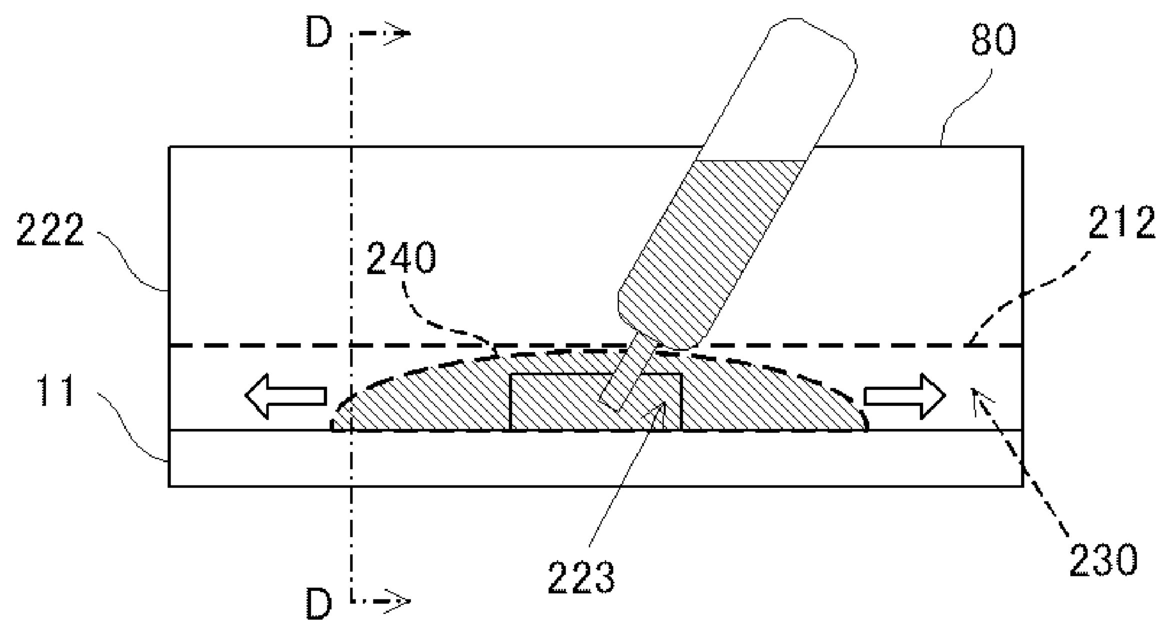

[FIG. 15C]
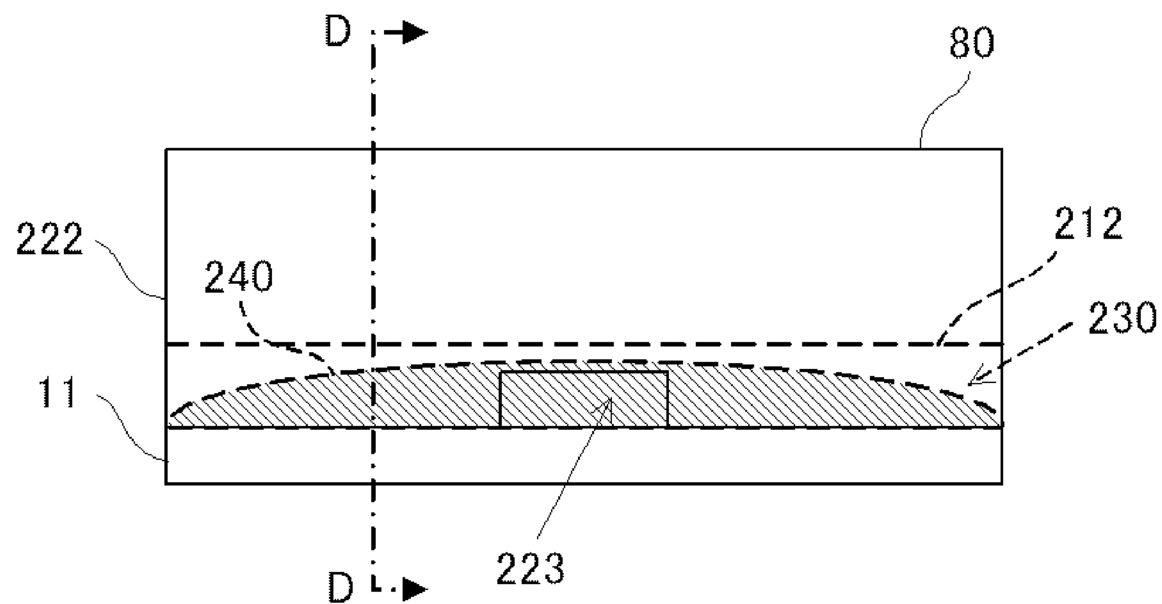

[FIG. 16A]
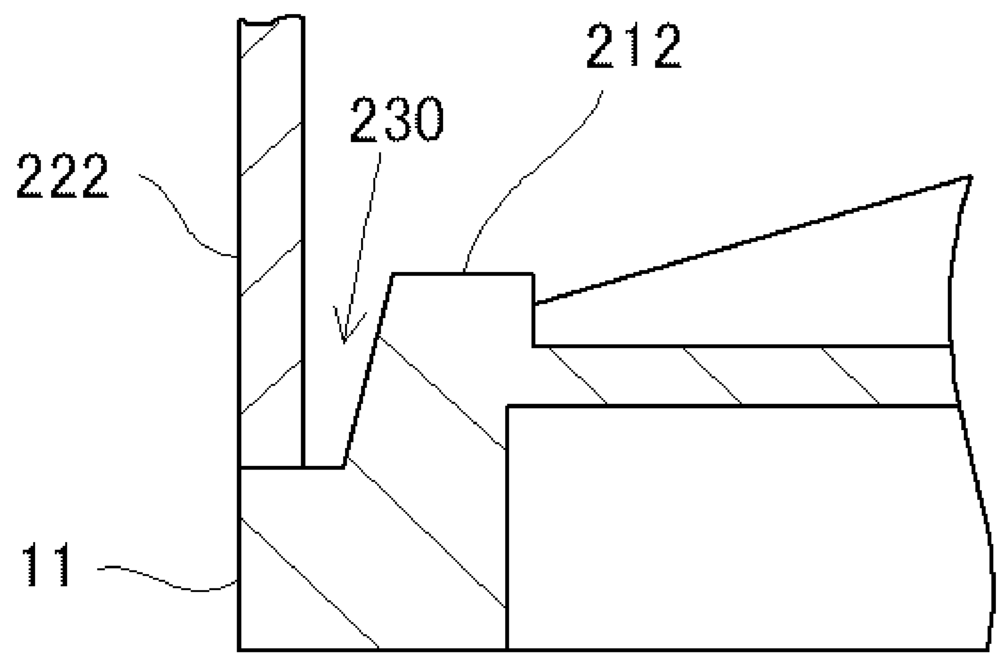

[FIG. 16B]
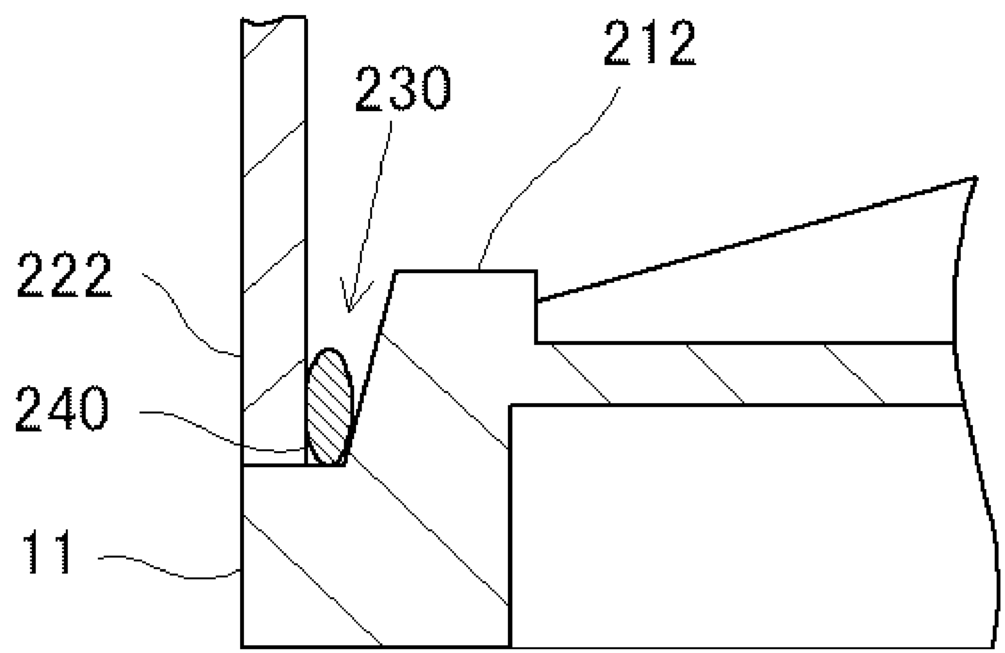

[FIG. 16C]
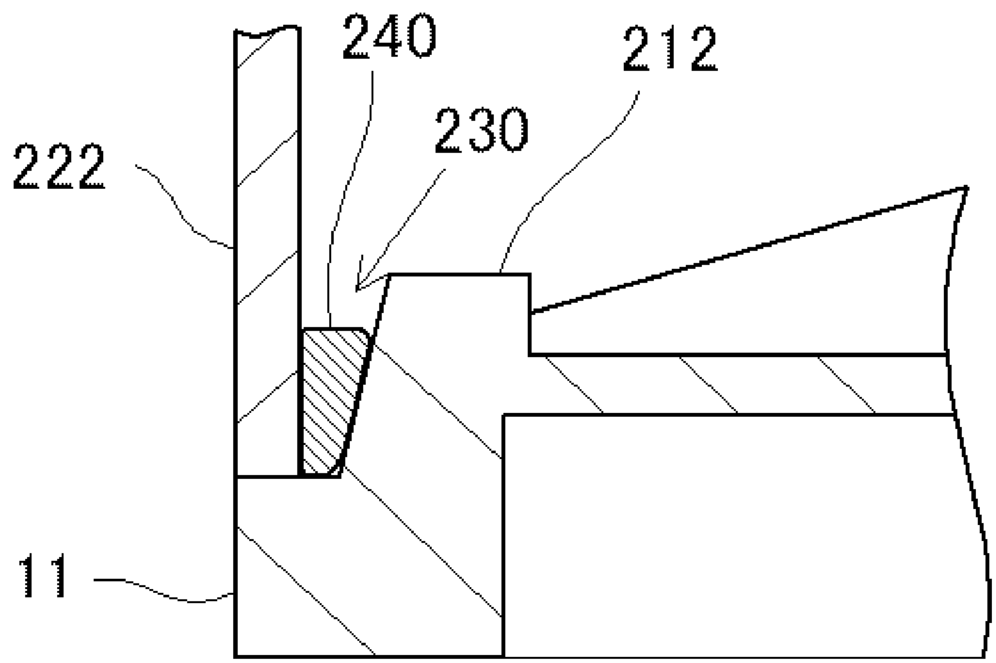

[FIG. 17A]
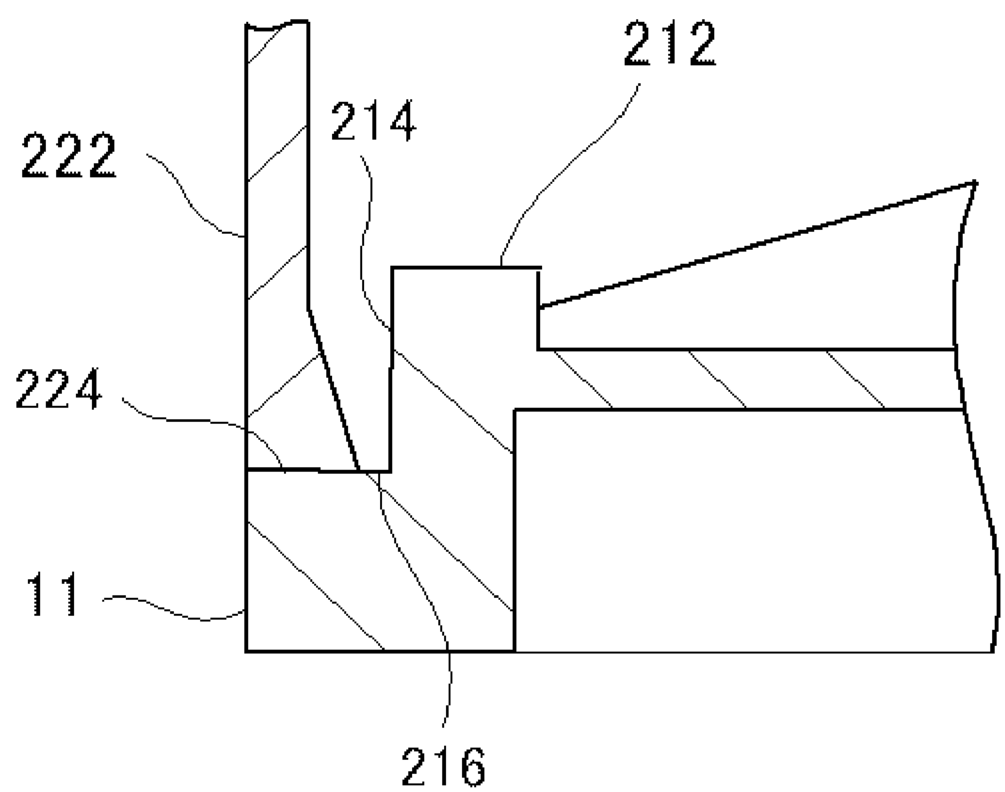

[FIG. 17B]
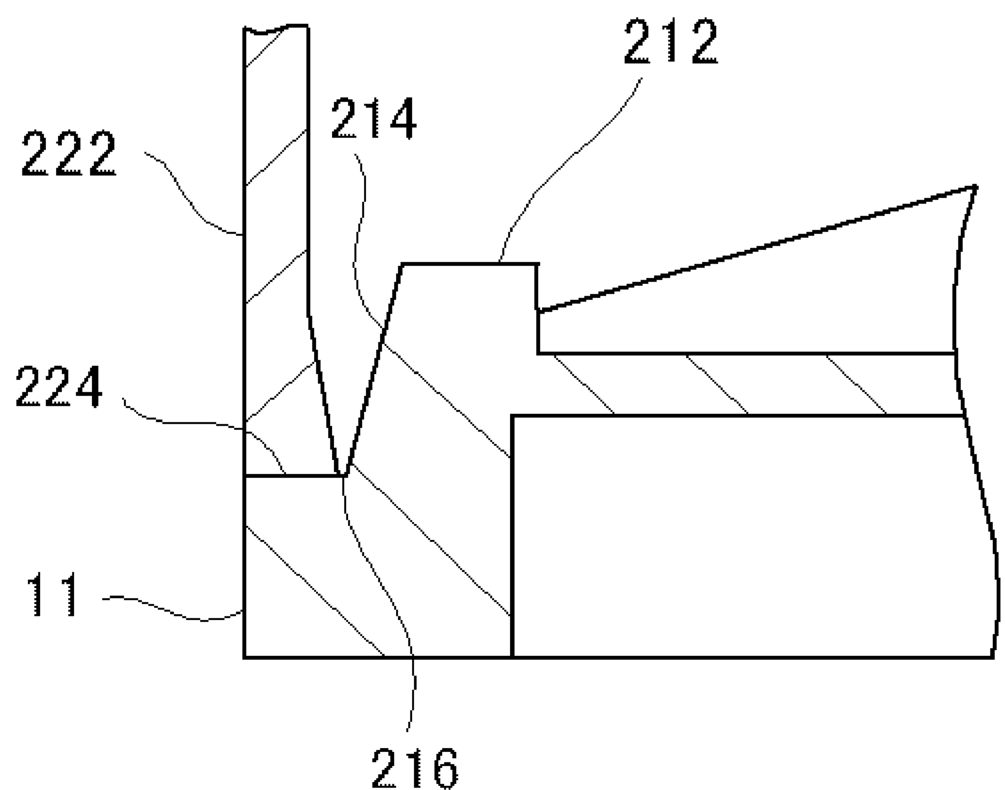

[FIG. 18]
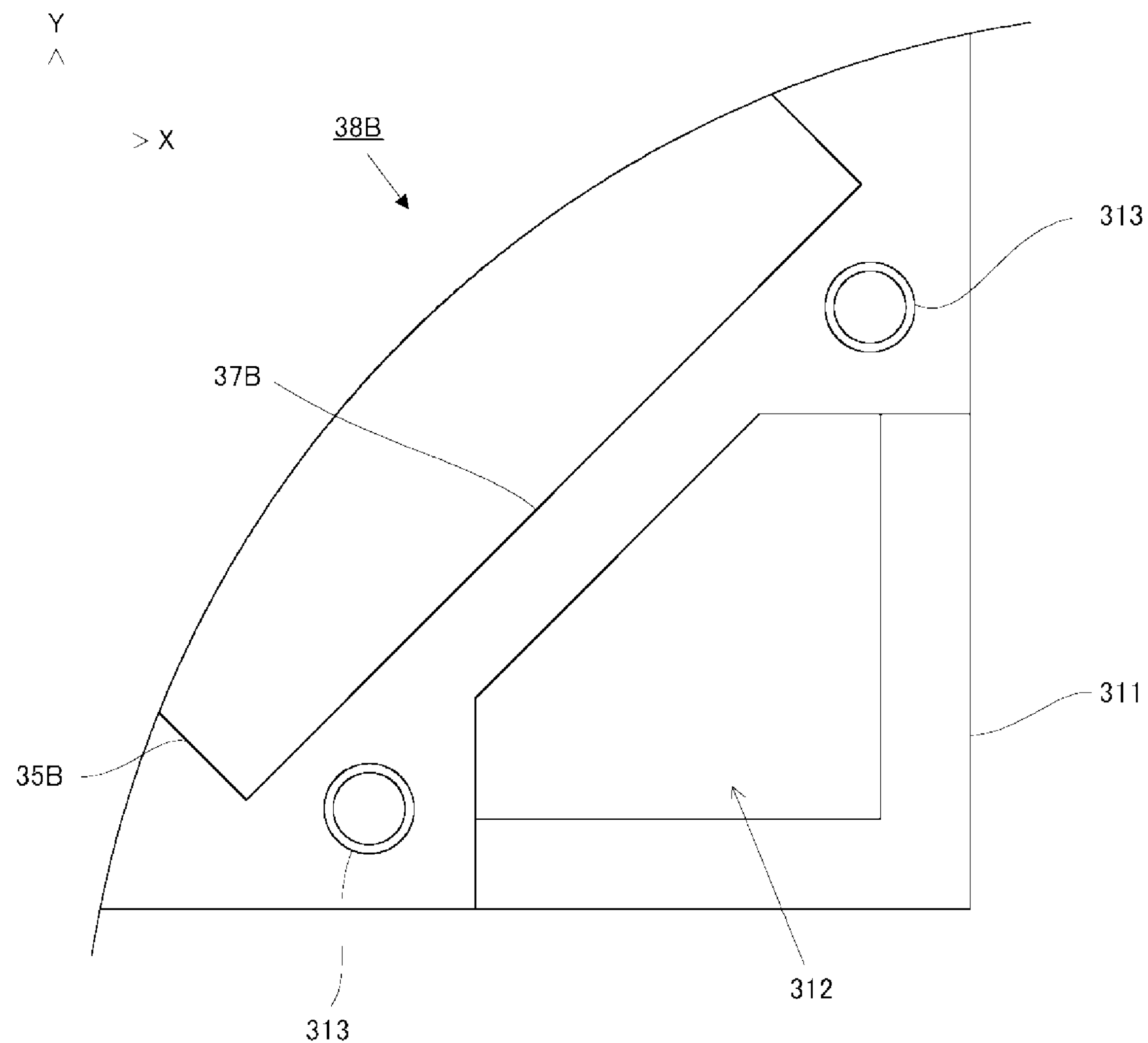

[FIG. 19]
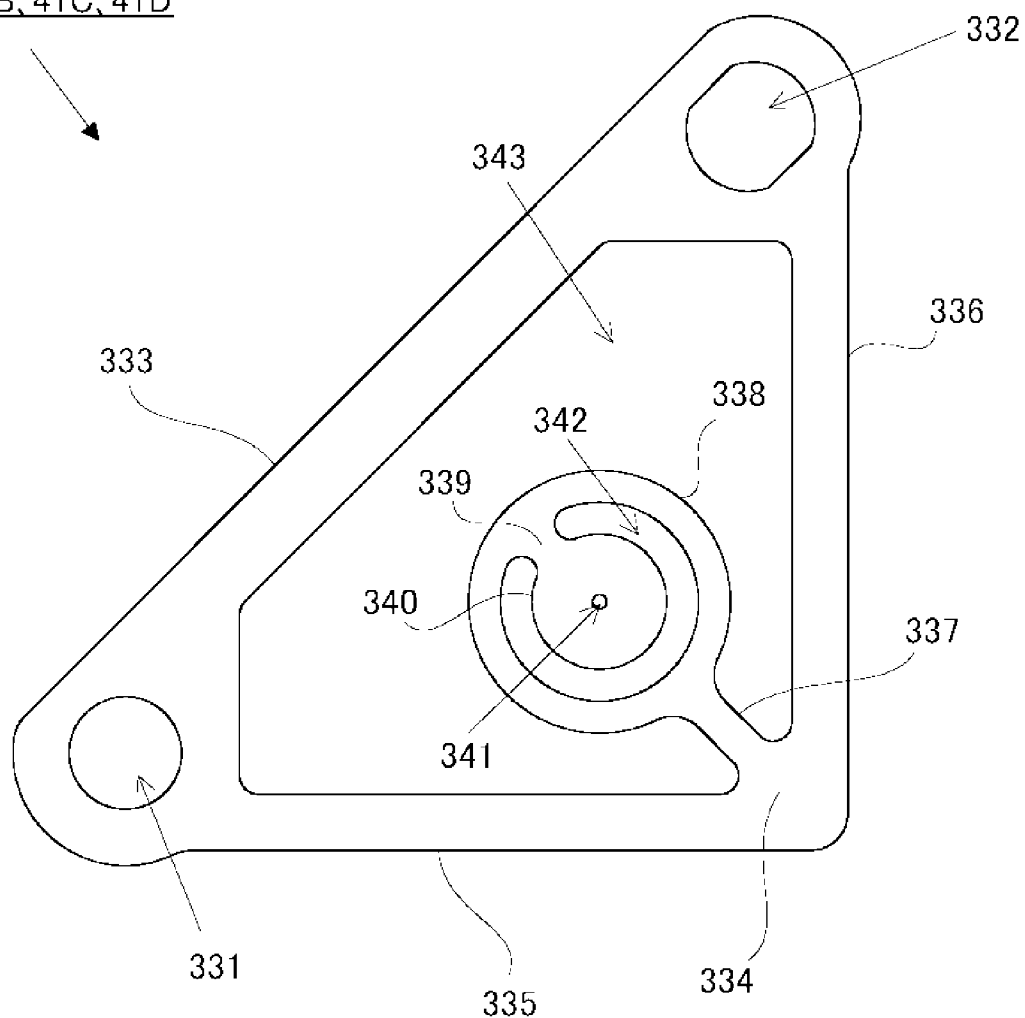

[FIG. 20]
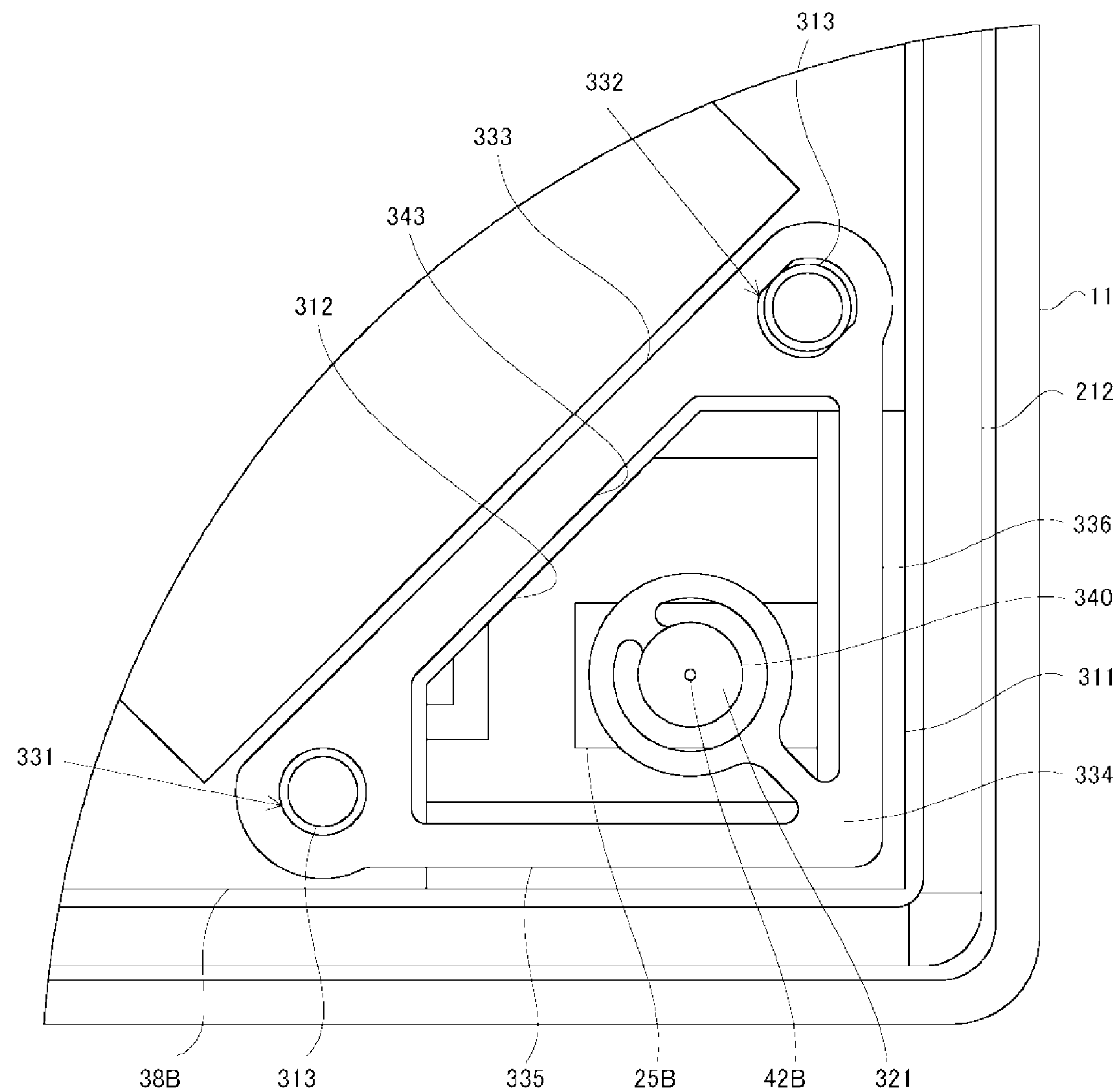

[FIG. 21]
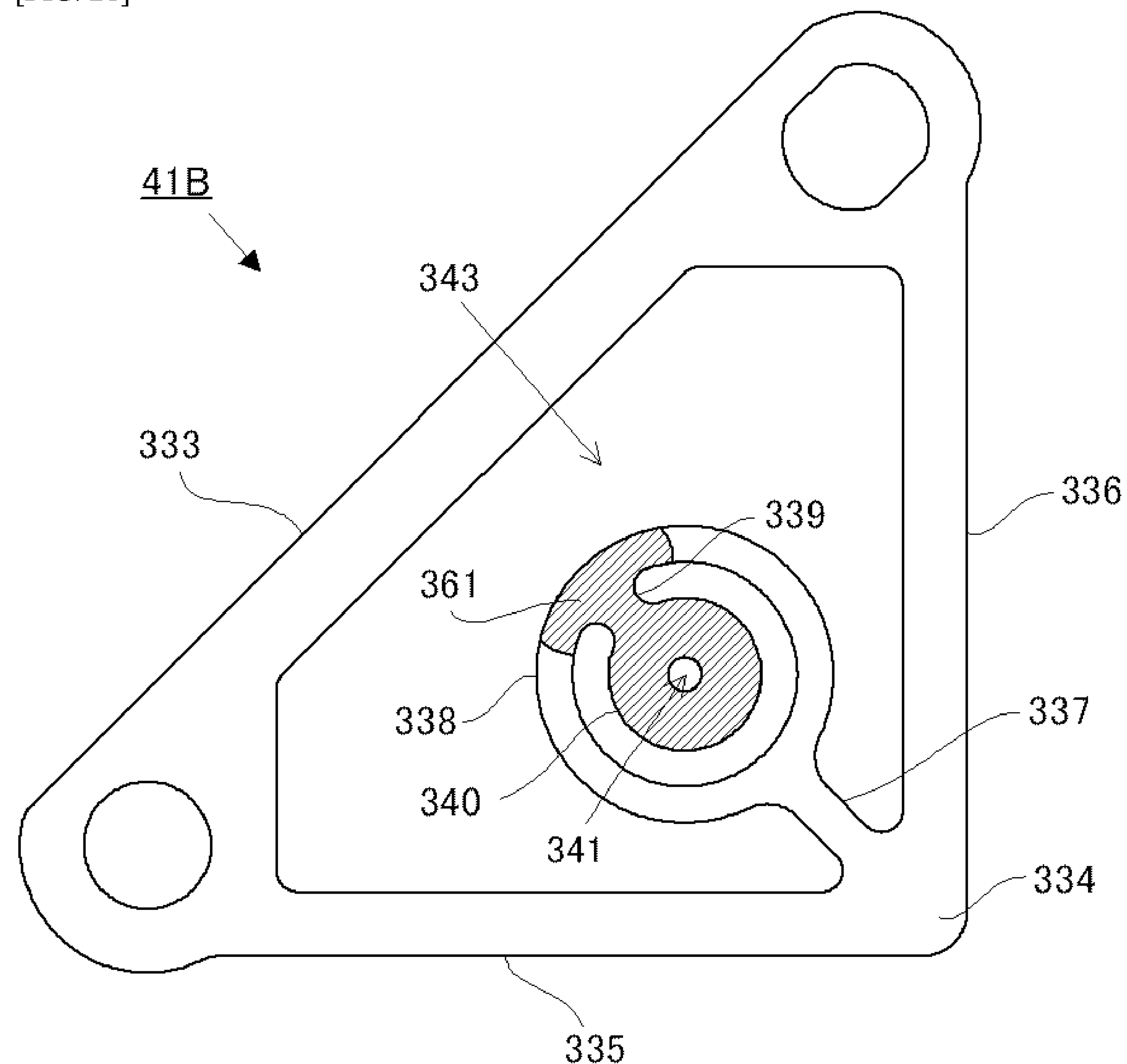

[FIG. 22]
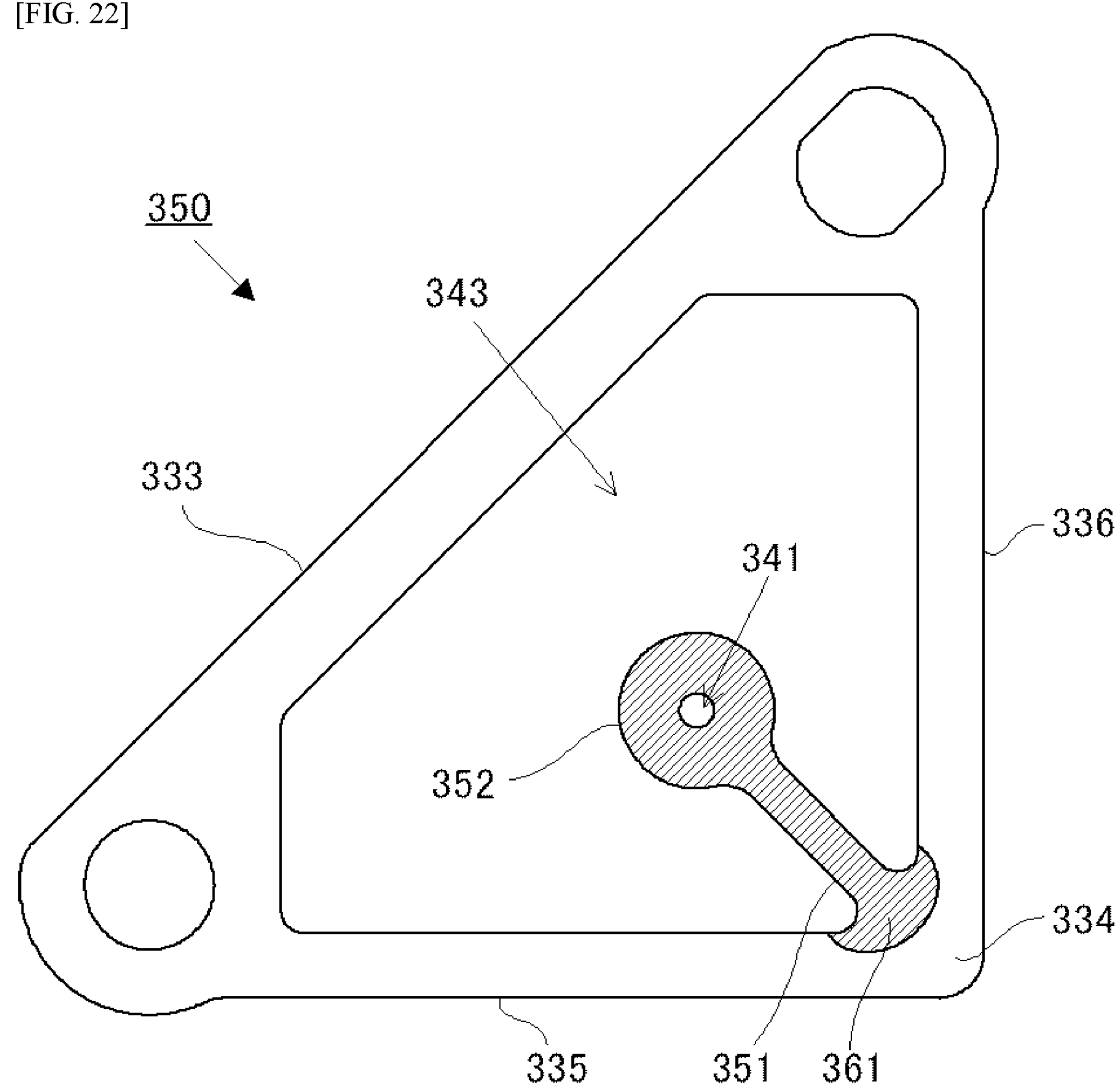

[FIG. 23]
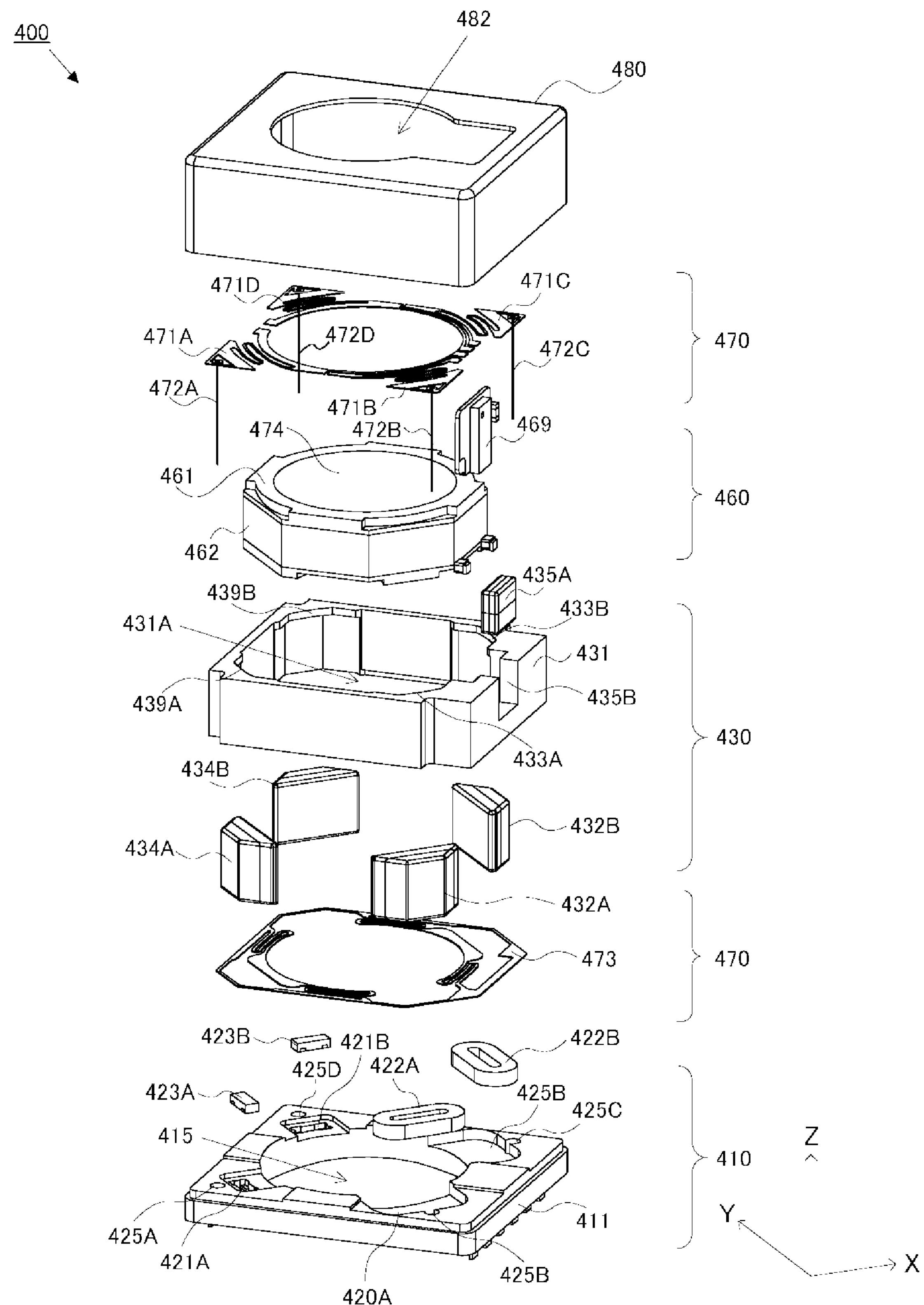

[FIG. 24]
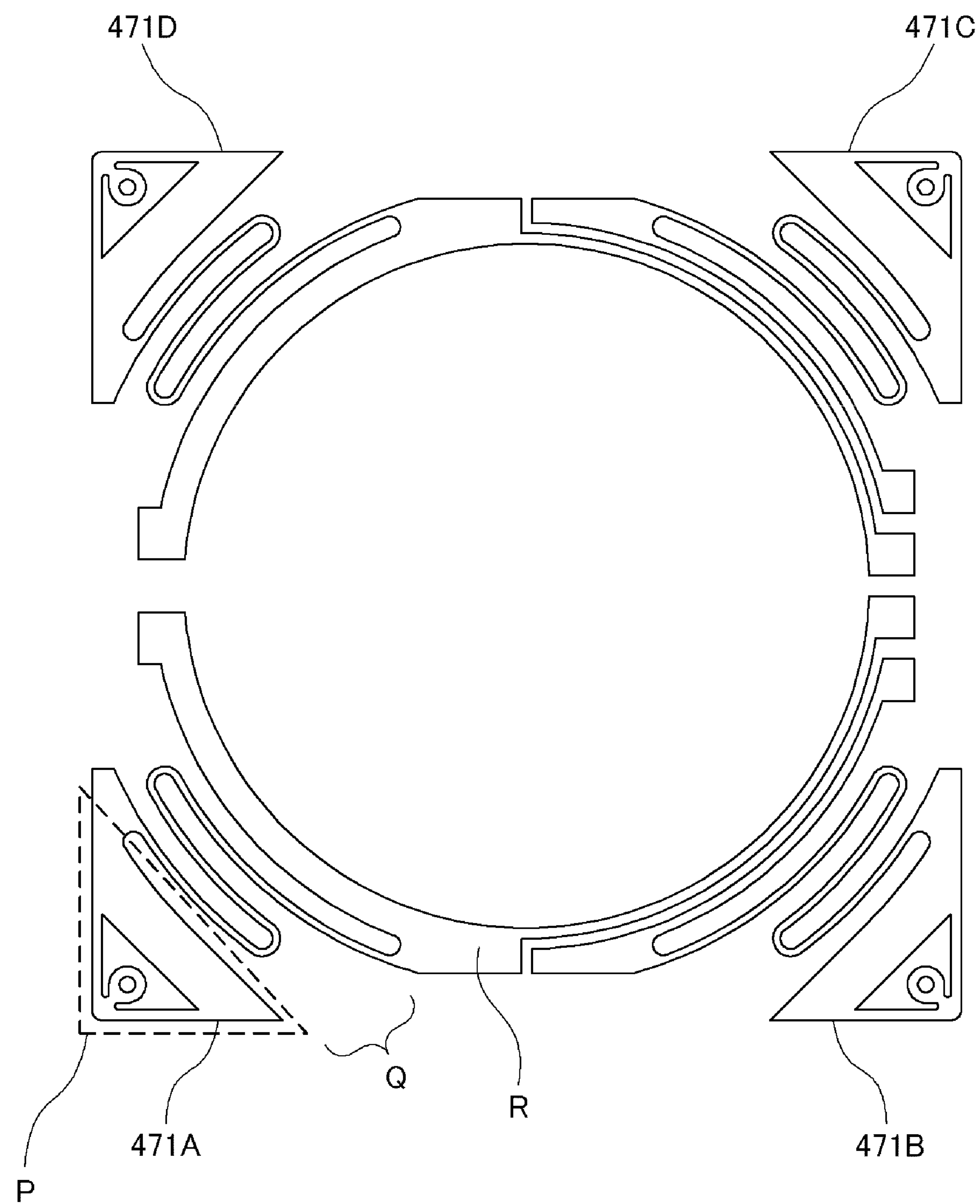

[FIG. 25]
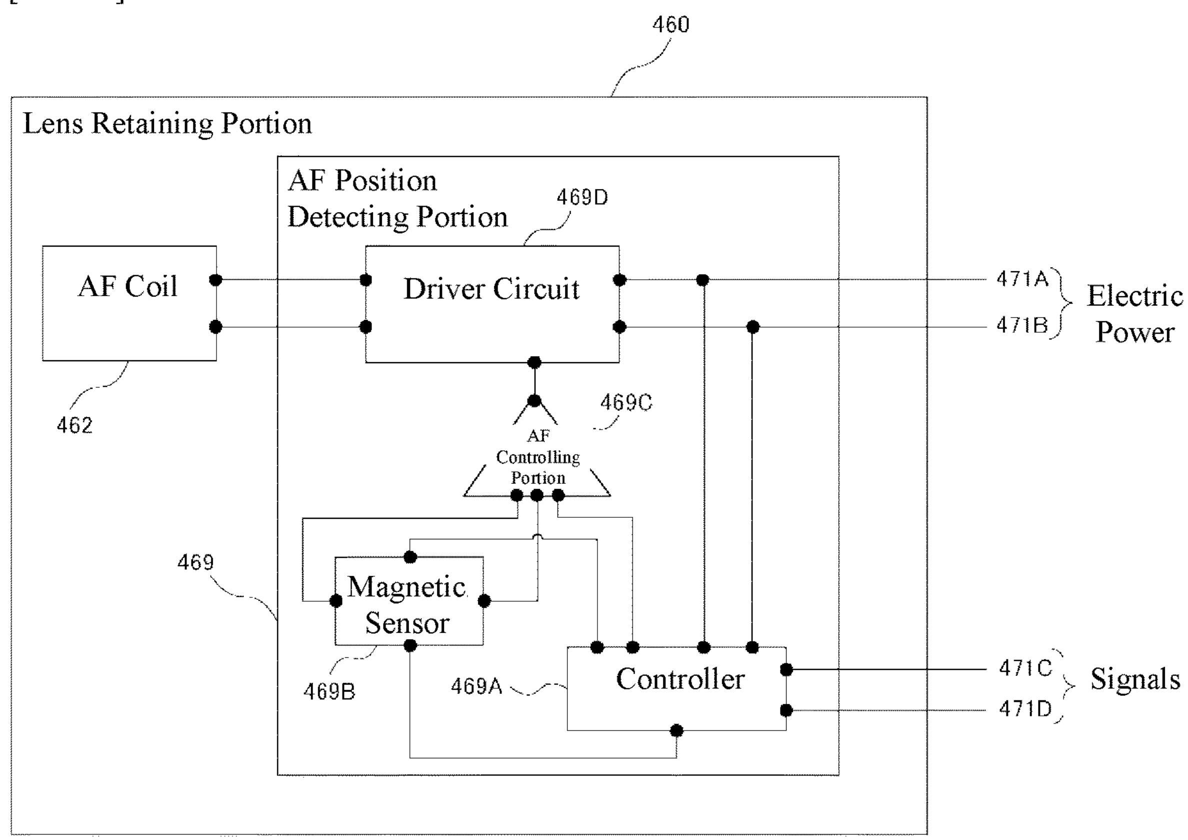

[FIG. 26]
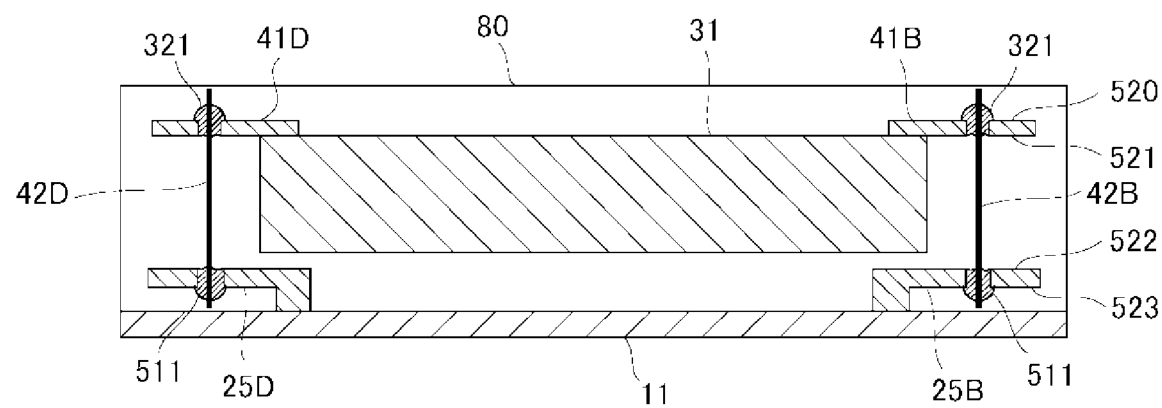

[FIG. 27]
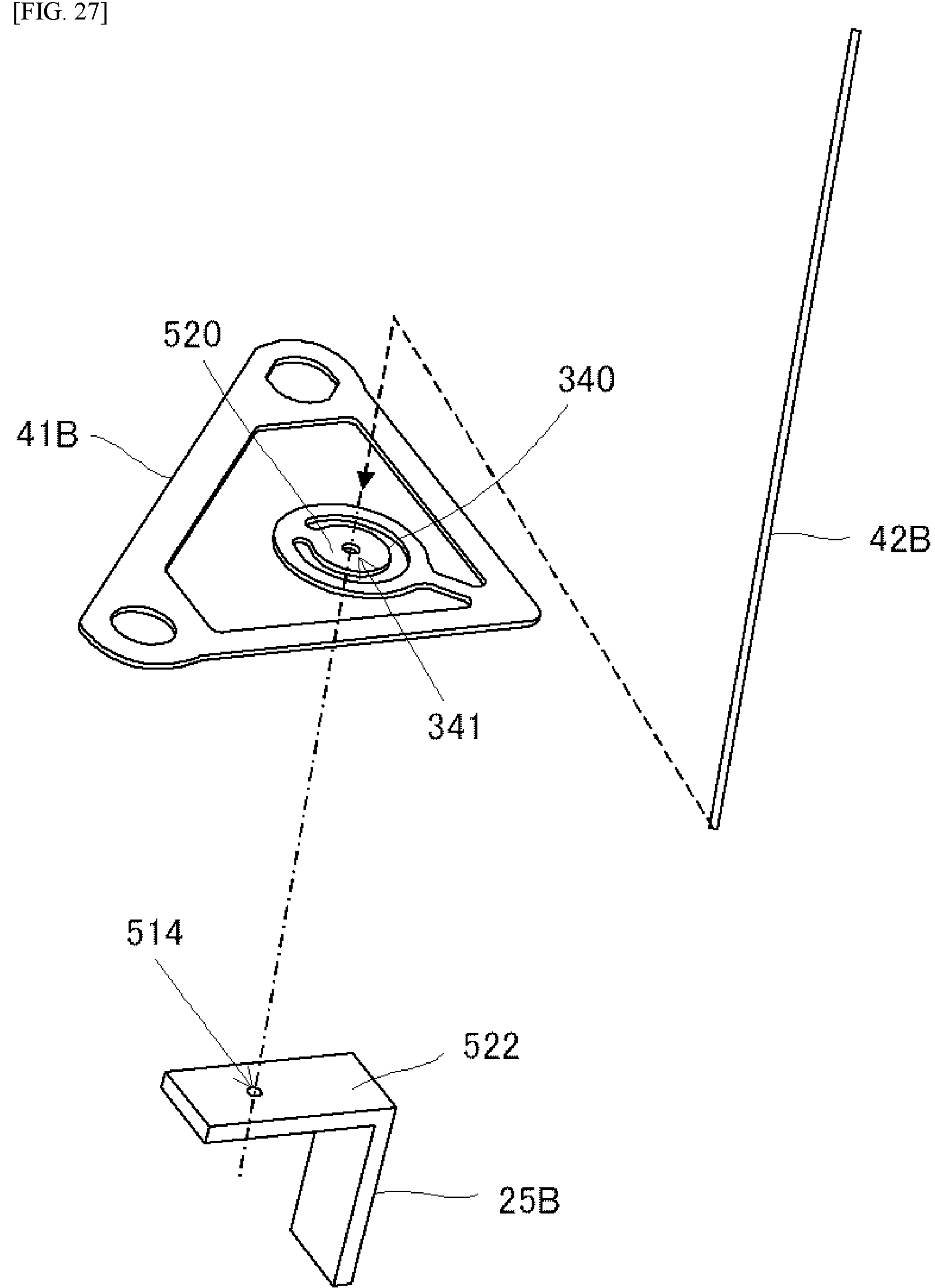

[FIG. 28]
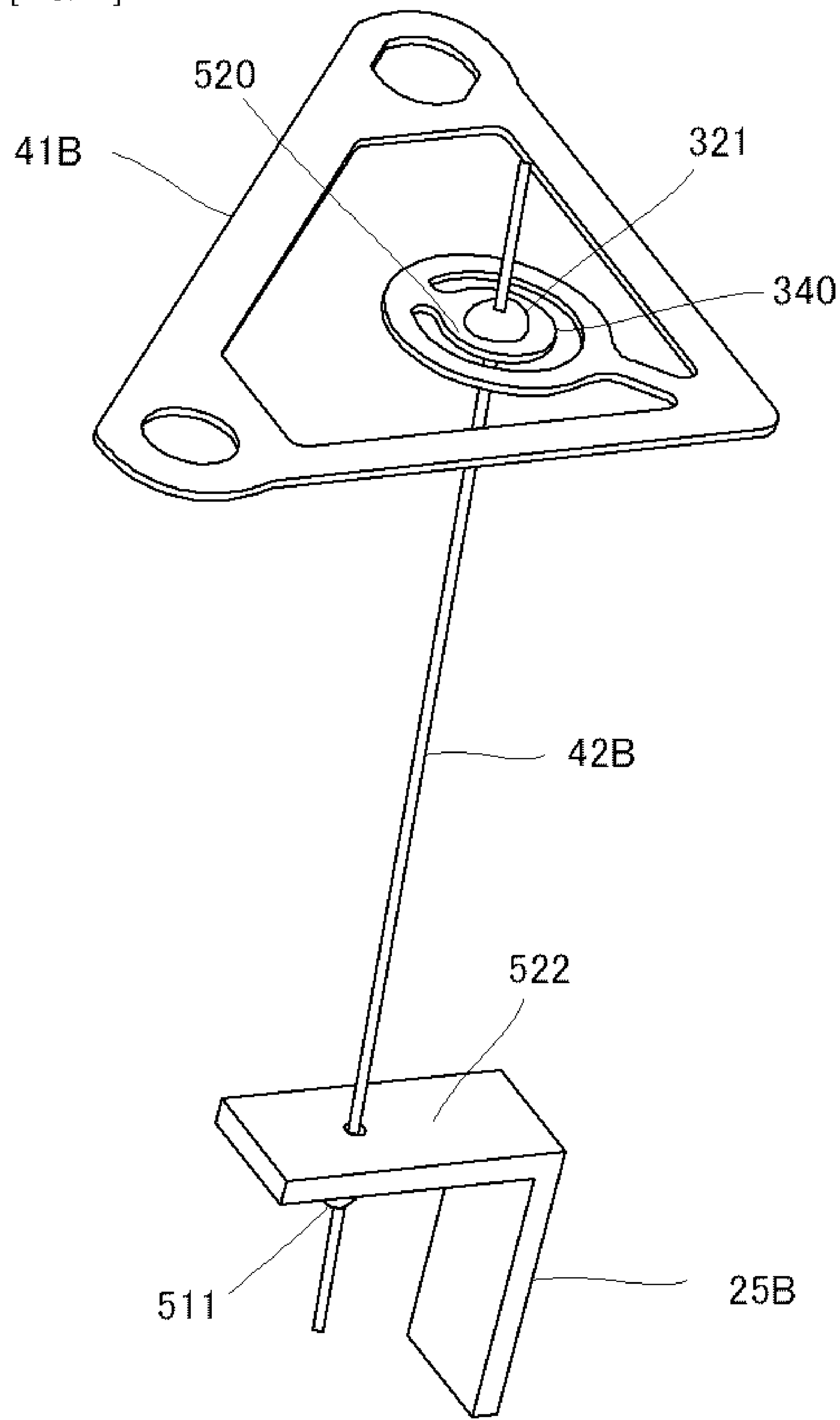

[FIG. 29]
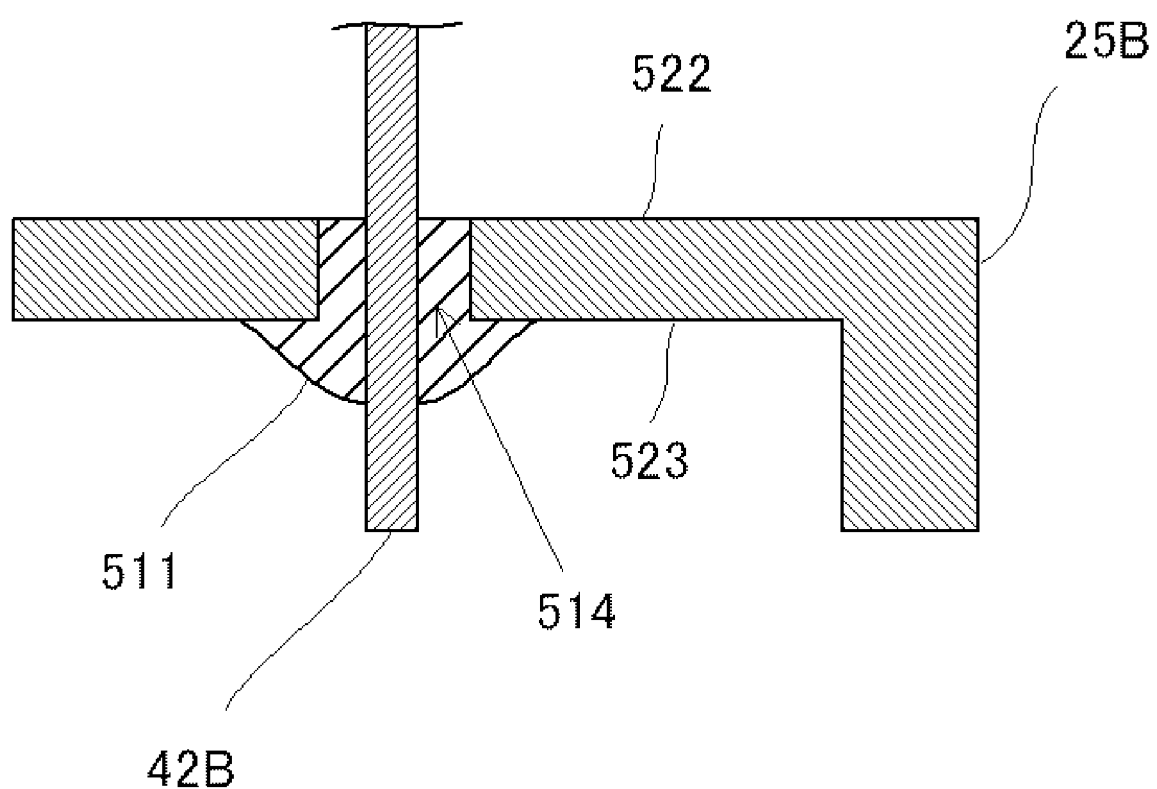

[FIG. 30]
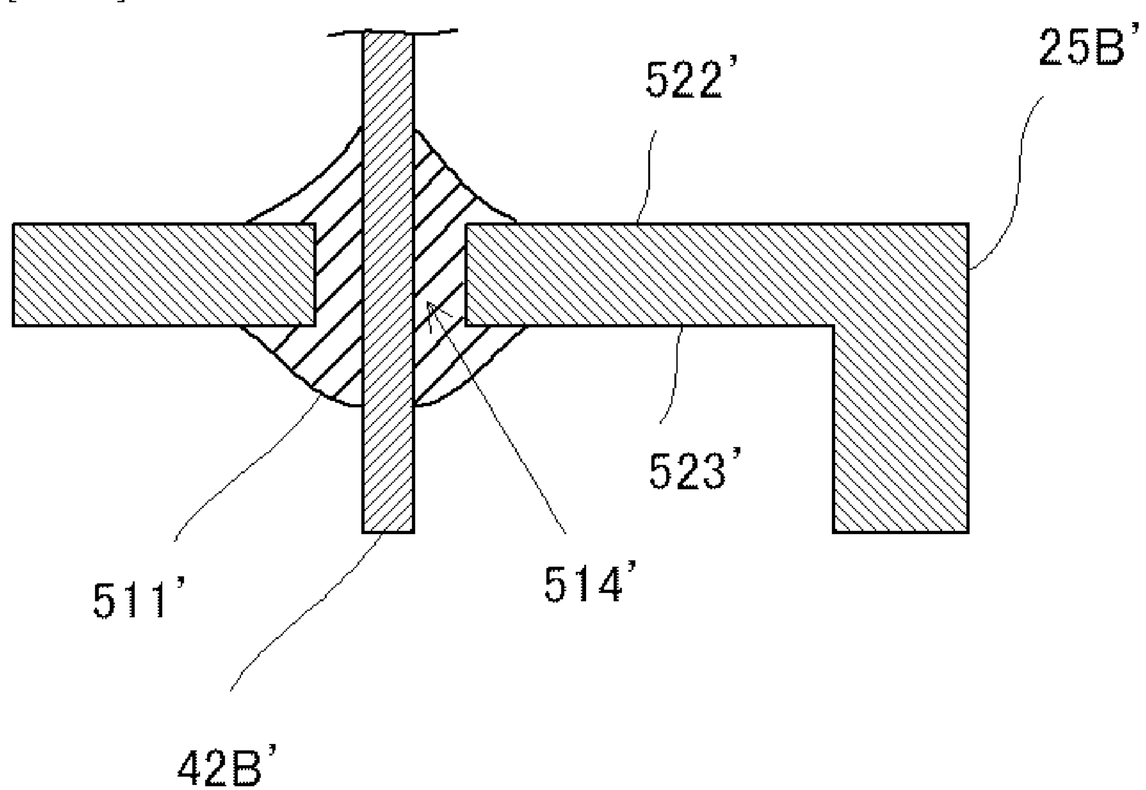

[FIG. 31]
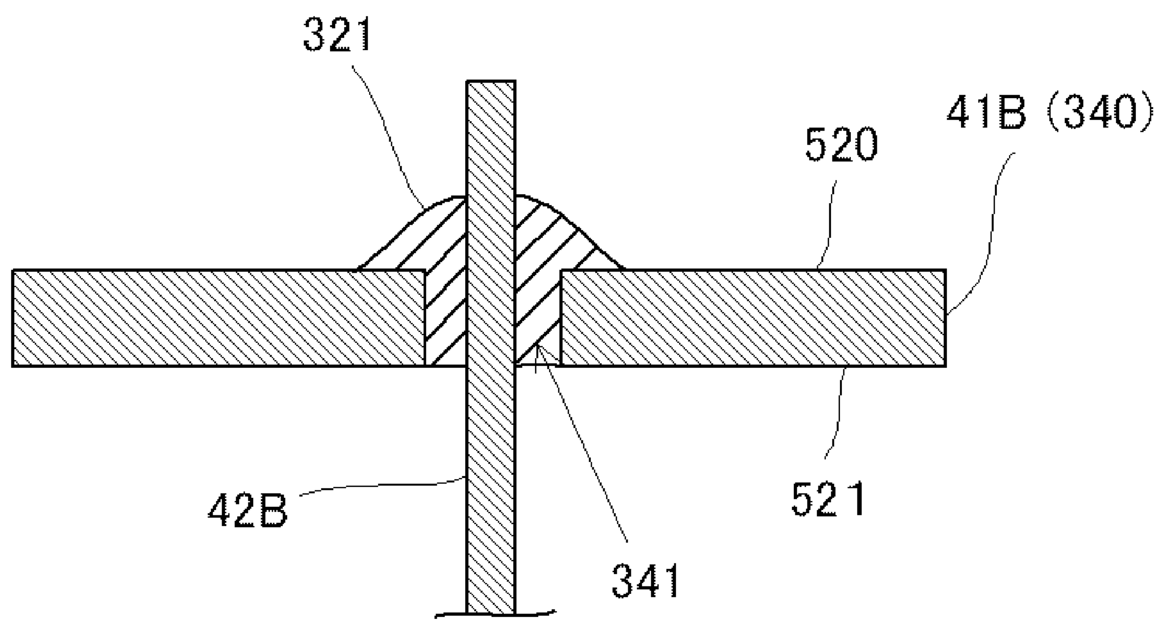

[FIG. 32]
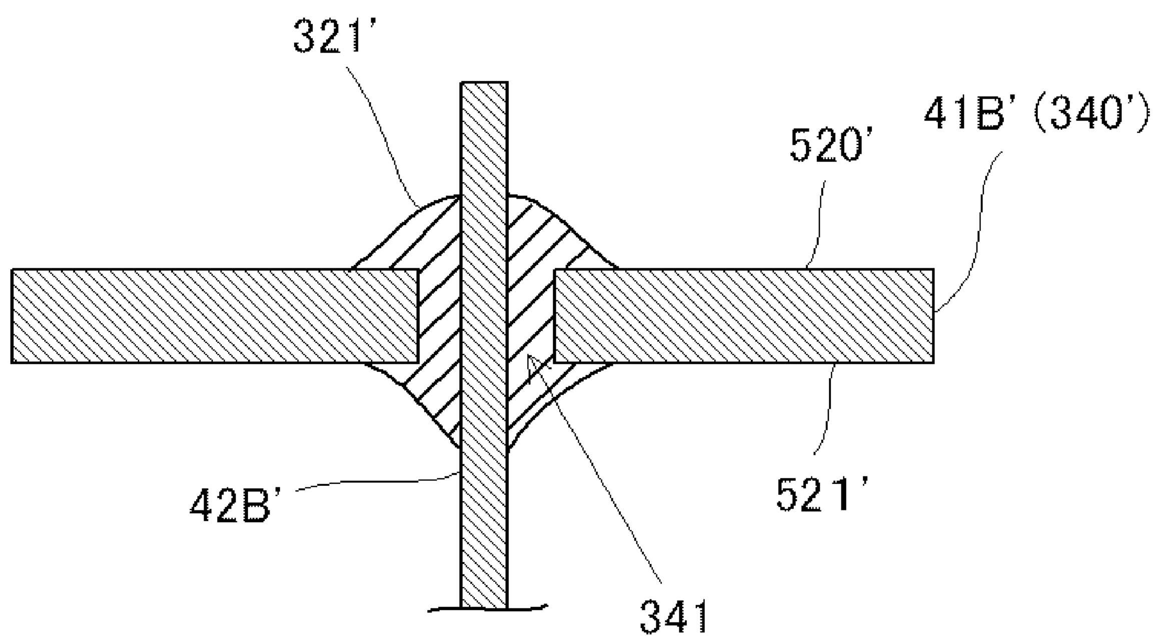

[FIG. 33A]
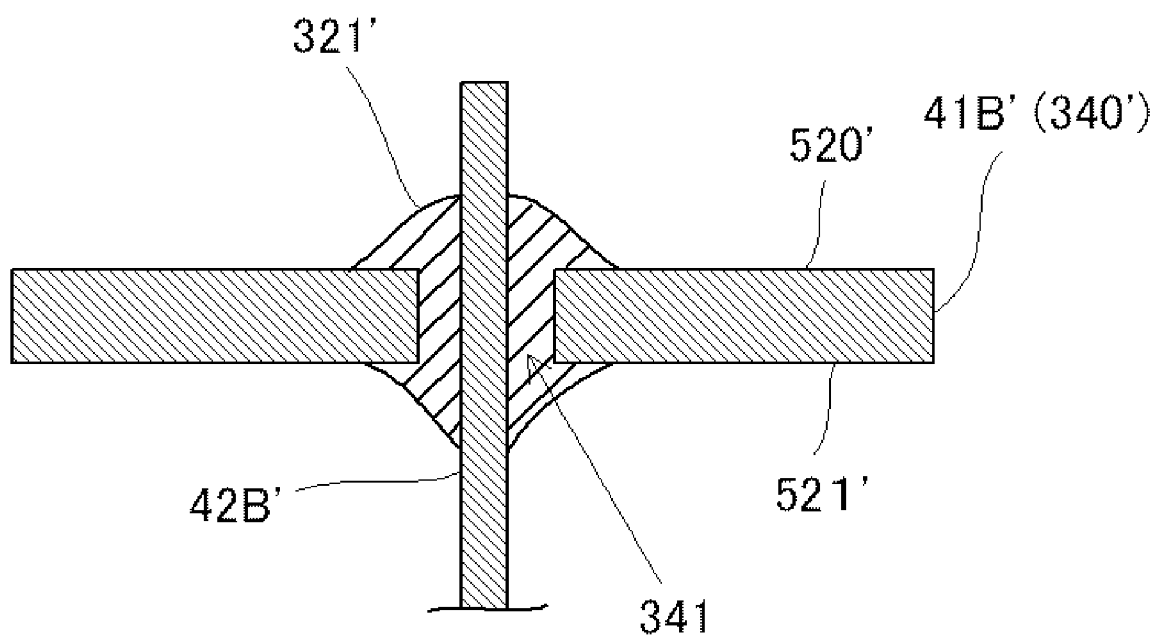

[FIG. 33B]
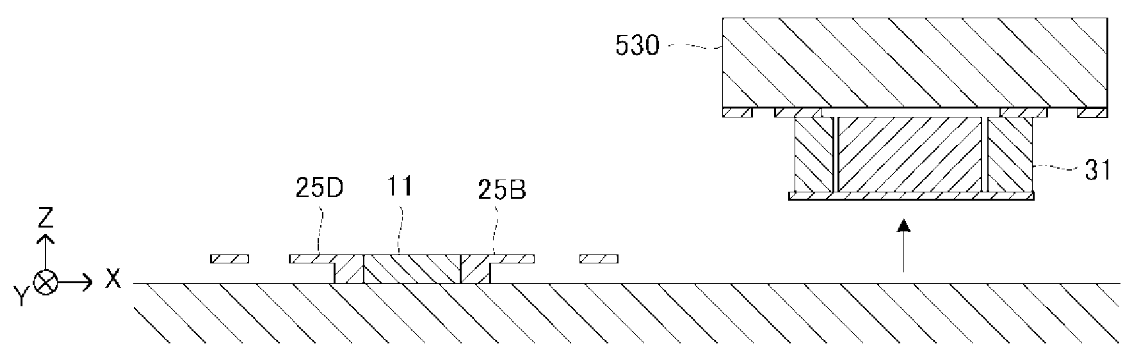

[FIG. 33C]
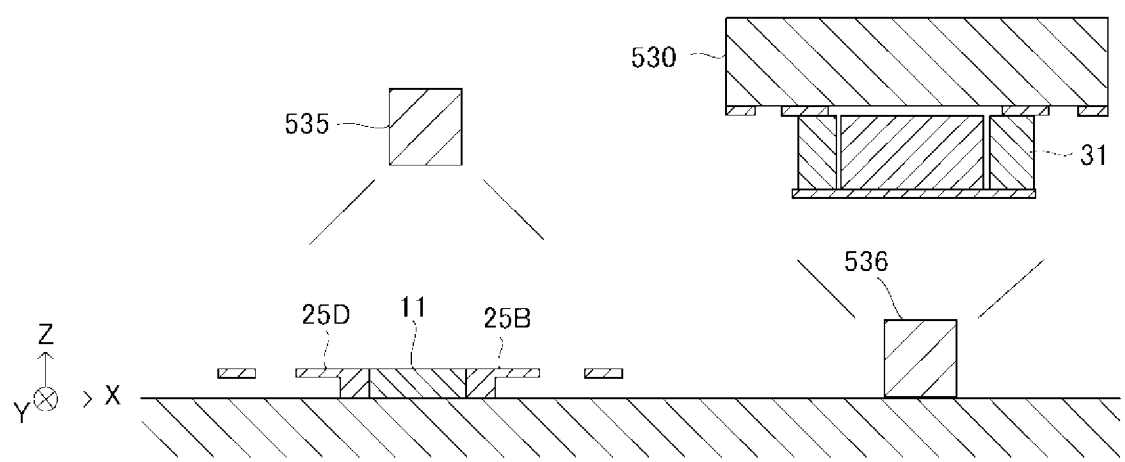

[FIG. 33D]
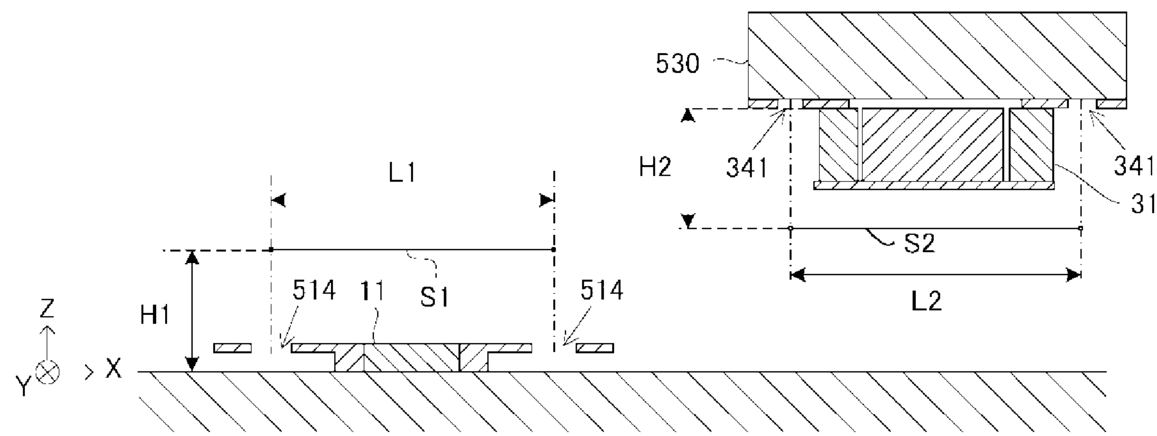

[FIG. 33E]
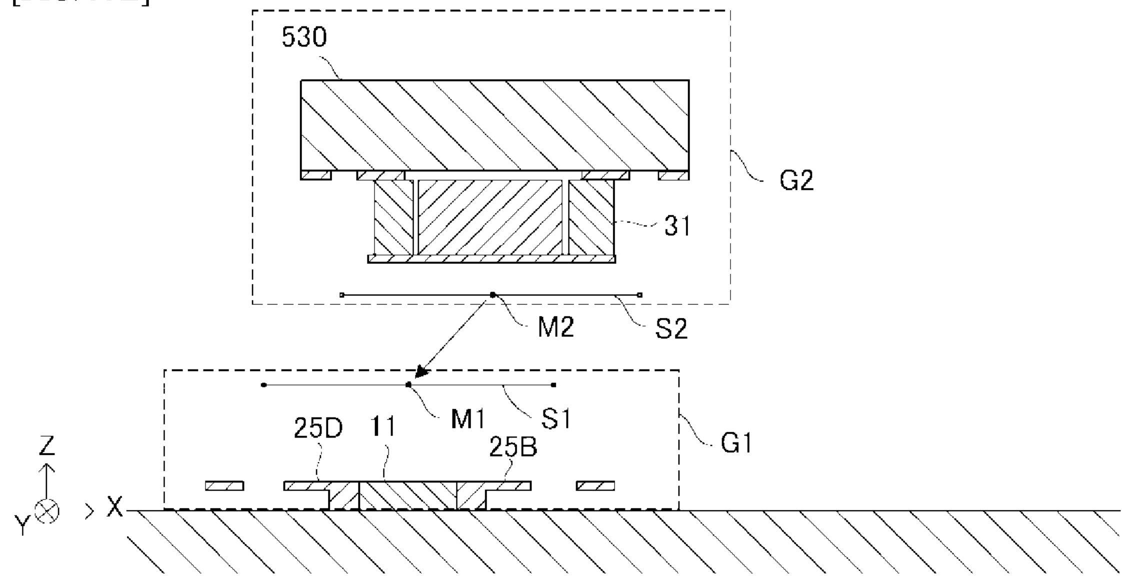

[FIG. 33F]
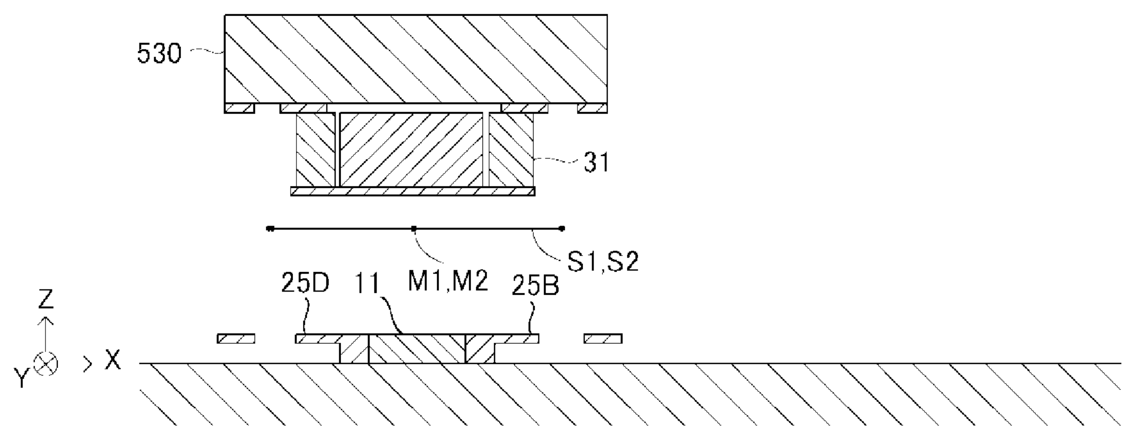

[FIG. 33G]
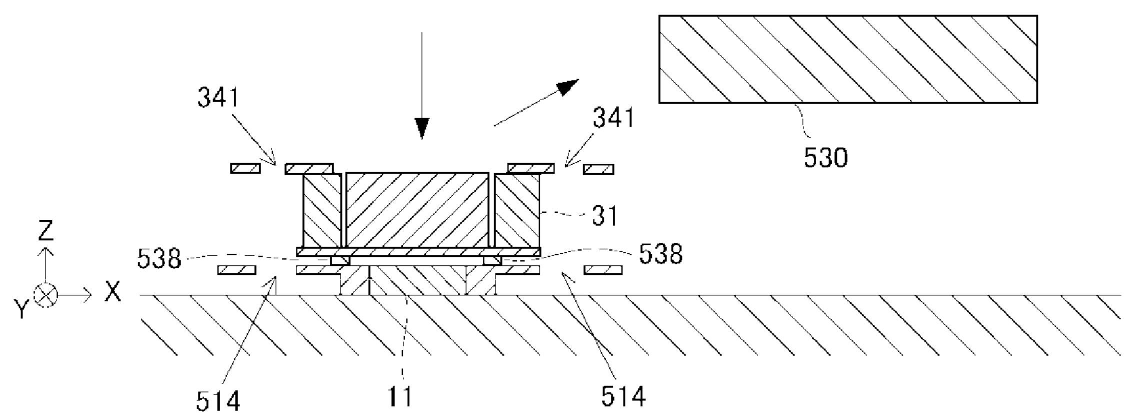

[FIG. 34]
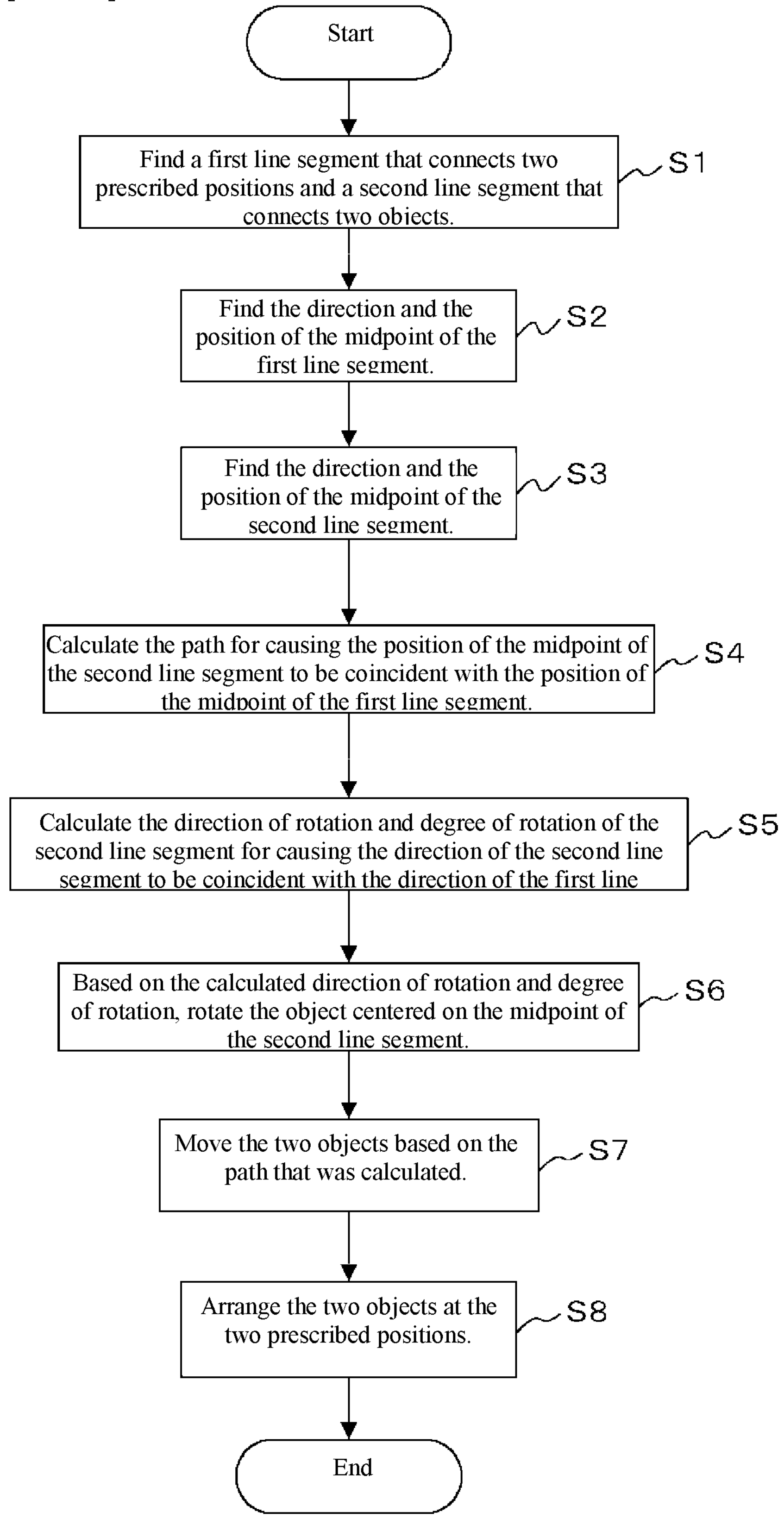

[FIG. 35A]
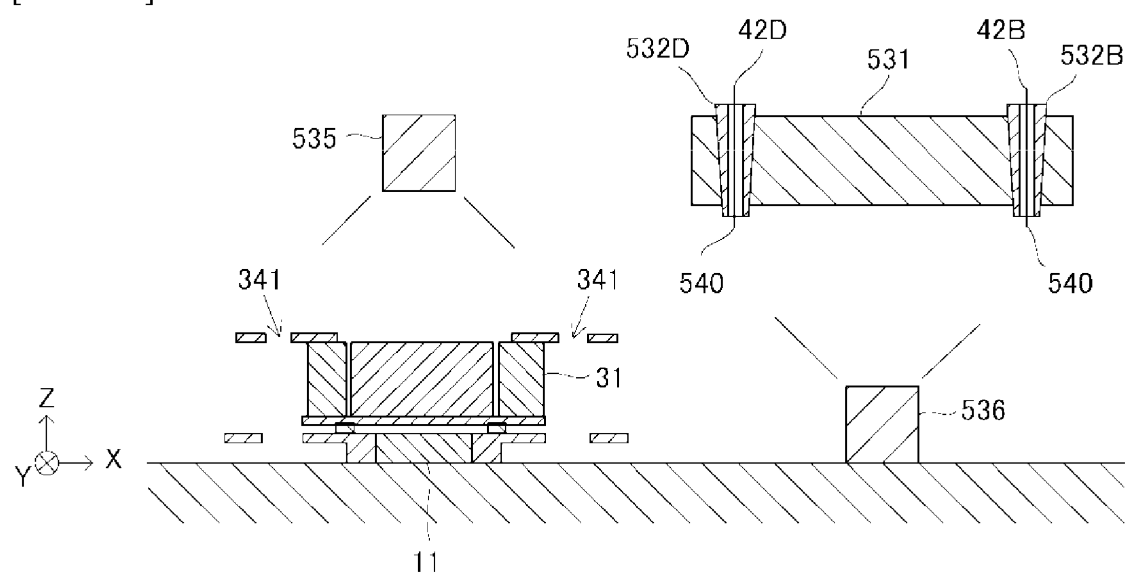

[FIG. 35B]
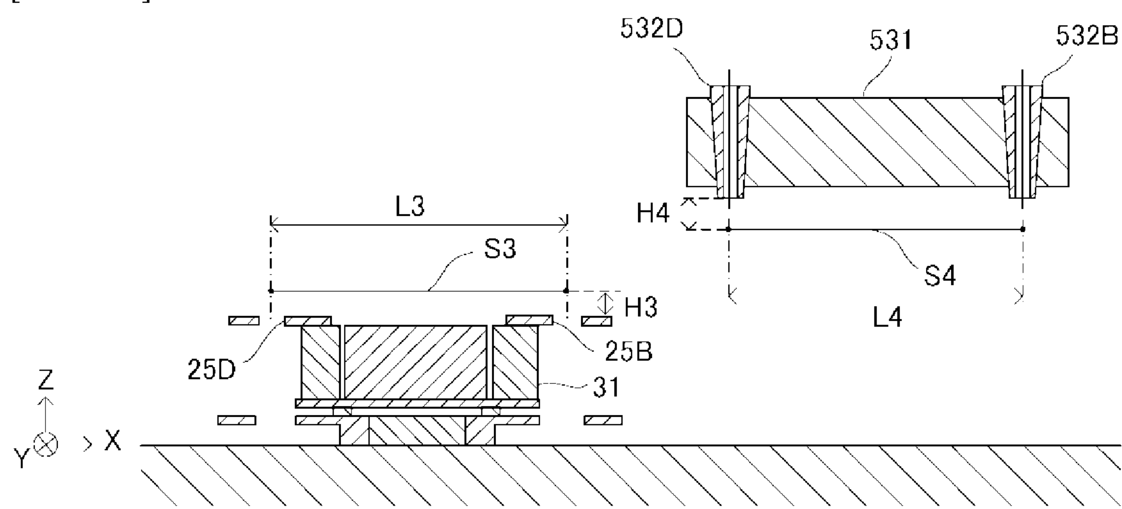

[FIG. 35C]
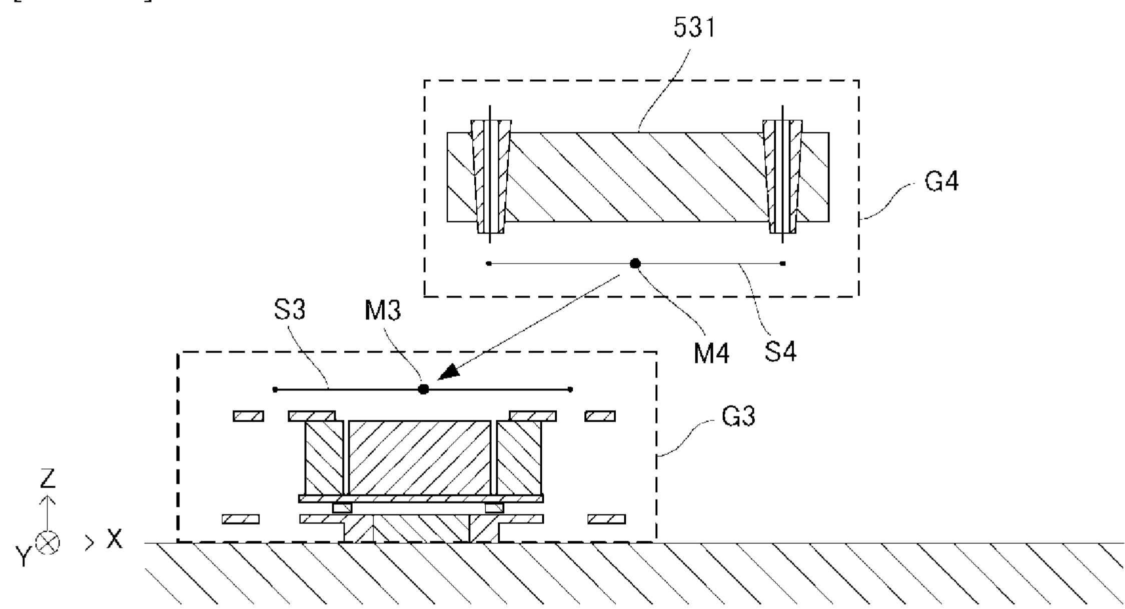

[FIG. 35D]
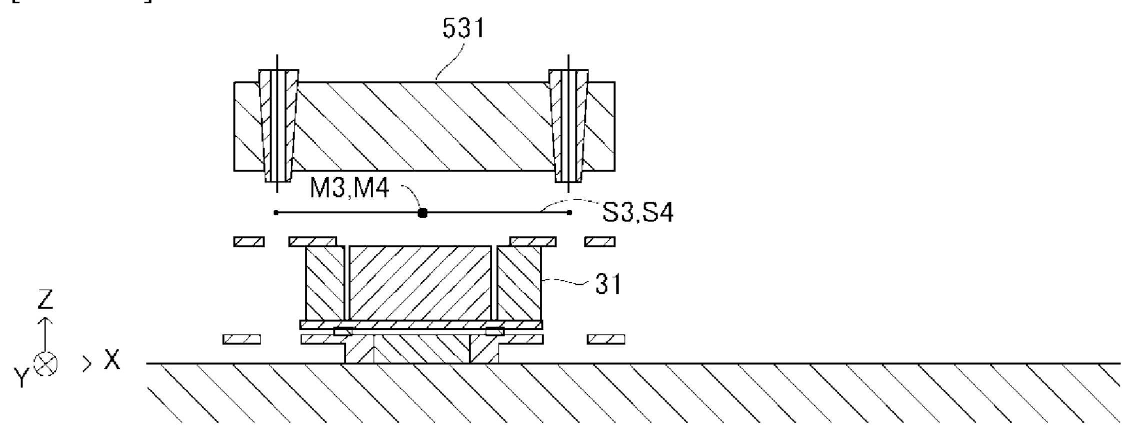

[FIG. 35E]
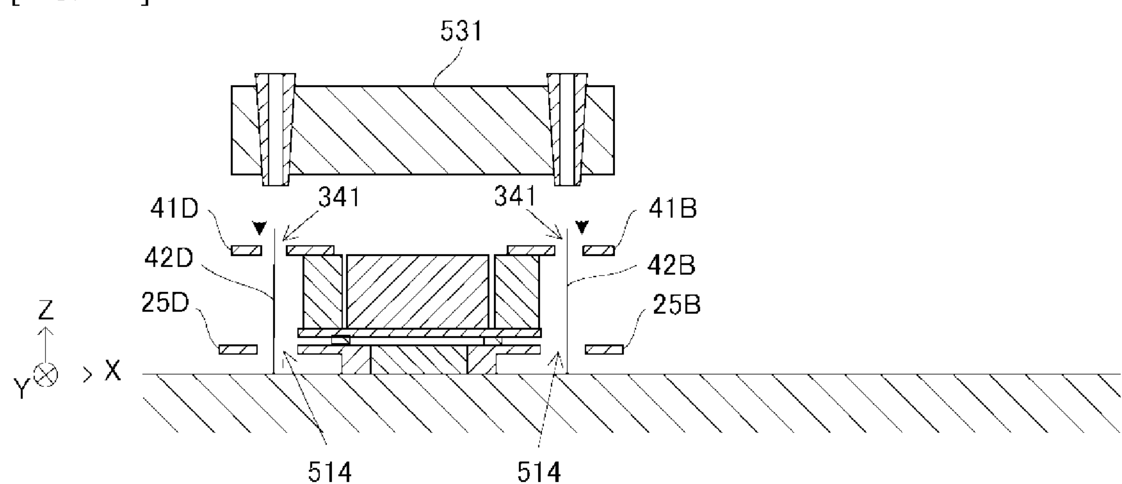

[FIG. 36]
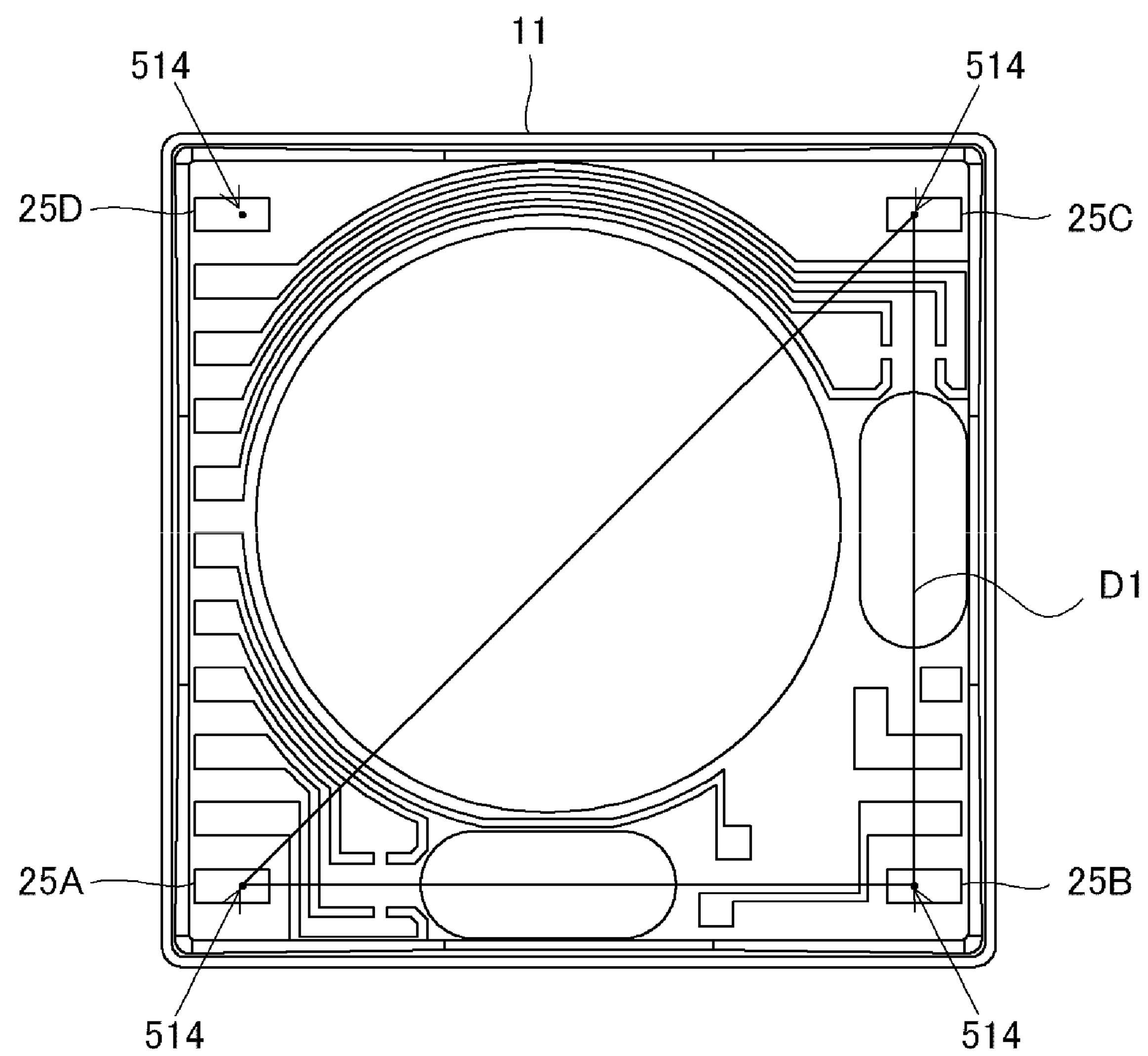

[FIG. 37]
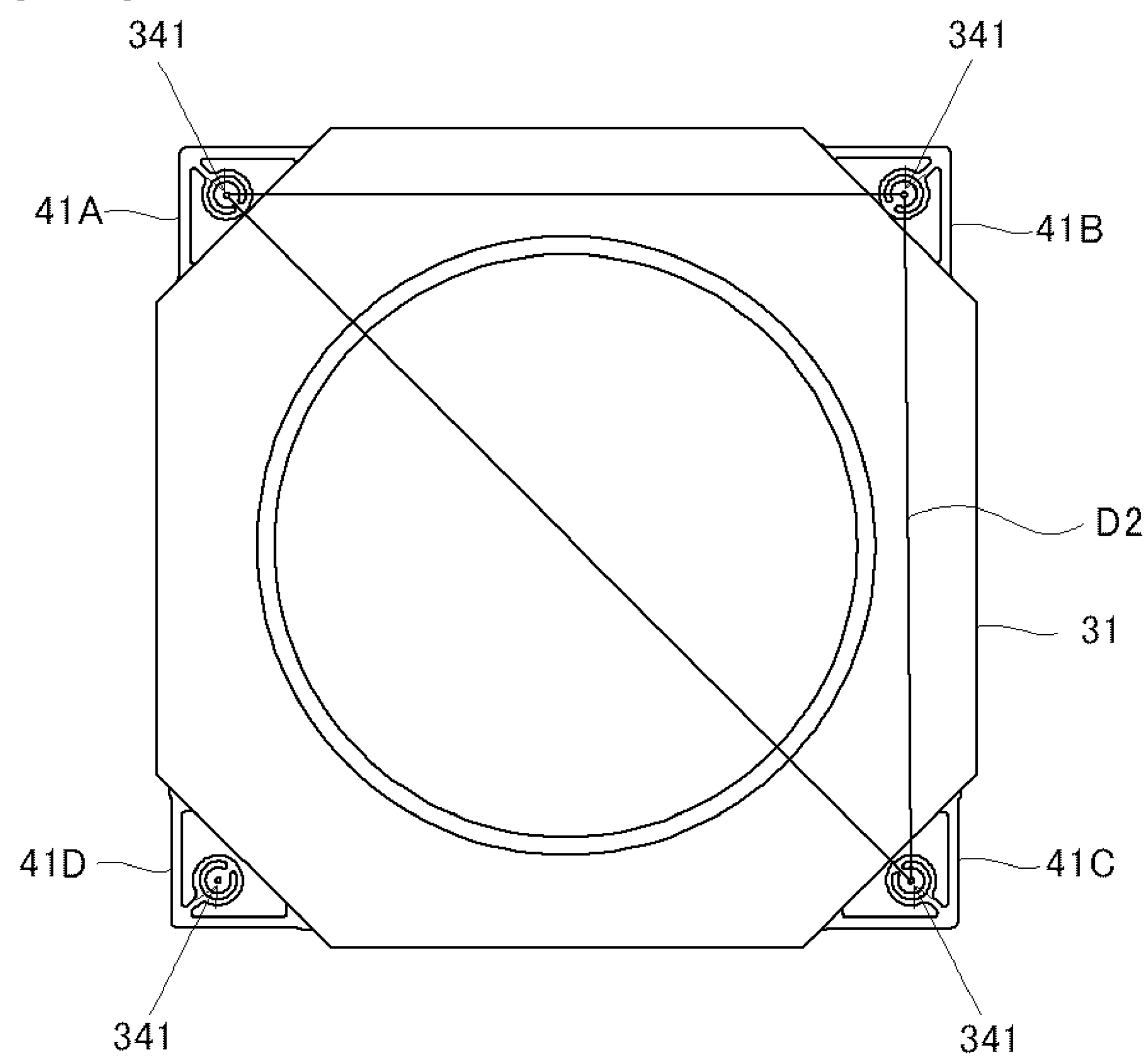

HOUSING, LENS DRIVE DEVICE PROVIDED WITH SAME, IMAGING DEVICE, ELECTRONIC APPARATUS, AND HOUSING PRODUCTION METHOD

CROSS-REFERENCE TO RELATED APPLICATIONS

This is a U.S. national phase application under 35 U.S.C. § 371 of International Patent Application No. PCT/JP2016/066956, filed Jun. 7, 2016, and claims benefit of priority to Japanese Patent Application No. 2015-119833, filed Jun. 12, 2015, Japanese Patent Application No. 2015-119834, filed Jun. 12, 2015 and Japanese Patent Application No. 2015-119835, filed Jun. 12, 2015. The entire contents of these applications are hereby incorporated by reference.

FILED OF TECHNOLOGY

The present invention relates to a case, a lens driving device, imaging device, and electronic device equipped therewith, and a case manufacturing method.

BACKGROUND

As driving devices for driving imaging lenses of imaging devices there are known lens driving devices comprising driving portions that are structured from coils and magnets. For example, Patent Document 1 discloses a camera shake correcting device comprising a driving device for autofocusing. Driving devices for autofocus and driving portions of camera shake correcting devices are structured from coils and magnets.

The camera shake correcting device of Japanese Unexamined Patent Application Publication 2011-65140 includes a base that is provided with an autofocus driving device, suspension wires, and a position sensor, and a cover that is attached to the base, for covering the autofocus driving device, the suspension wires, and the position sensor. A coil is attached to the cover. A magnet is attached to the autofocus driving device at a position that faces the coil.

SUMMARY

Sometimes when the cover is attached to the base, an adhesive agent is caused to penetrate between the cover and the base, through capillary action, to adhesively bond the cover and the base. In such a case, penetration of the adhesive agent between the cover and the base requires a long time.

The present invention was created in contemplation of the situation set forth above, and the object thereof is to provide a case wherein the adhesive agent can penetrate all the way to the end portions of the gap between the cover and the base rapidly, and to provide a lens driving device, an imaging device, and an electronic device, equipped therewith, and to provide a method for manufacturing the case.

In order to achieve the object set forth above, a case according to a first aspect of the present invention has a plate-shaped base; and a cover having a bottom plate and a side plate that extends from and end portion of the bottom plate, for covering a primary face of the base, wherein:

the base has, on the primary face, a wall portion that extends along a peripheral edge portion of the primary face and that faces the side plate of the cover;

the side plate has an opening portion that exposes a portion of the wall portion; an adhesive agent for bonding the base and the cover is provided in a gap between the wall portion and the side plate; and a cross-sectional area with a cross-section that is perpendicular to at least one direction of the gap of the wall portion and the side plate faces at least one direction in a direction that faces a length-direction end portion of the wall portion from the wall portion that is exposed from the opening portion, and/or a direction that faces a primary face of the base from a height-direction end portion of the wall portion that is exposed from the opening portion.

The height of the wall portion from the primary face of the base may be lower further toward a length-direction end portion of the wall portion from the wall portion that is exposed from the opening portion.

The height of the wall portion may be lowered stepwise.

The spacing between the wall portion and the side plate may be narrower further toward the primary face of the base from the height-direction end portion of the wall portion.

The face of the wall portion that faces the side plate may be angled relative to the plane that is perpendicular to the primary face of the base.

The face of the side plate that faces the wall portion may be angled relative to the plane that is perpendicular to the primary face of the base.

A lens driving device according to a second aspect of the present invention includes the case described above;

a lens retaining portion, for holding a lens, enclosed within the case; and a driving portion, enclosed within the case, for driving the lens retaining portion in the optical axial direction of the lens or in a direction that is perpendicular to the optical axial direction of the lens.

A lens driving device according to a third aspect of the present invention has a lens retaining portion for holding a lens group;

a driving portion for driving the lens retaining portion in the optical axial direction of the lens;

a position detecting portion for detecting a position of the lens retaining portion in the optical axial direction of the lens; and the case, for enclosing the lens retaining portion, the driving portion, and the position detecting portion, wherein:

in the plan view, the driving portion and the position detecting portion are mutually provided at positions with the lens held therebetween.

A lens driving device according to a fourth aspect of the present invention includes a lens retaining portion for holding a lens group;

a rectangular frame for enclosing the lens retaining portion;

two supporting portions for supporting the lens retaining portion on the frame; a driving portion for driving the lens retaining portion in the optical axial direction of the lens; and the case, for enclosing the lens retaining portion, the frame, and the two supporting portions, wherein:

in the plan view, the supporting portions are disposed at respective opposing corner portions of the frame, and the driving portion is disposed in a corner portion other than the corner portions wherein the supporting portions are disposed.

A method for manufacturing an imaging device according to a fifth aspect according to the present invention that has the lens driving device described above.

A method for manufacturing an electronic device according to a sixth aspect according to the present invention that has the lens driving device described above.

A method for manufacturing a case according to a seventh aspect according to the present invention is:

a method for manufacturing a case that comprises, on a primary face, a plate-shaped base that has a wall portion that extends along a peripheral portion of the primary face, and a cover having a bottom plate and a side plate that extends from and end portion of the bottom plate and that is provided with an opening portion, for covering a primary face of the base, including:

a step for causing the side plate and the wall portion to oppose each other, exposing a portion of the wall portion from the opening portion, and disposing the cover on the base; a step for filling a gap between the wall portion and the side plate with an adhesive agent from the opening portion;

a step for causing the adhesive agent to penetrate from the wall portion that is exposed from the opening portion in at least a direction wherein the cross-sectional area of the gap between the wall portion and the side plate becomes narrow; and a step for curing the adhesive agent that has penetrated into the gap between the side plate and the wall portion.

The present invention enables an adhesive agent to be caused to penetrate to the end portion of the gap between the base and the cover in a short period of time.

BRIEF DESCRIPTIONS OF THE DRAWINGS

FIG. 1 is a schematic diagram depicting an imaging device provided with a lens driving device as set forth in an example according to the present invention.

FIG. 2 is a schematic diagram depicting an electronic device provided with a lens driving device as set forth in the example according to the present invention.

FIG. 3 is an assembly perspective diagram of a lens driving device according to the example according to the present invention.

FIG. 4 is a plan view diagram of a lens driving device according to the example according to the present invention.

FIG. 5 is a cross-sectional view along the section A-A in the lens driving device depicted in FIG. 4.

FIG. 6 is a schematic diagram depicting the arrangement of a lens holding portion as set forth in the example according to the present invention.

FIG. 7 is a schematic diagram depicting a lens holding portion as set forth in the example according to the present invention.

FIG. 8 is a schematic diagram for explaining a lens driving device as set forth in another example according to the present invention.

FIG. 9 is a schematic diagram depicting a cross-section along the section B-B in the lens driving device depicted in FIG. 8.

FIG. 10A is a perspective diagram of a cover portion according to a further example according to the present invention.

FIG. 10B is a perspective diagram of a base according to the further example according to the present invention.

FIG. 11A is a side view depicting a wall portion of a base according to the further example according to the present invention.

FIG. 11B is a side view depicting a modified example of a wall portion of a base according to the further example according to the present invention.

FIG. 11C is a side view depicting a modified example of a wall portion of a base according to the further example according to the present invention.

FIG. 11D is a side view depicting a modified example of a wall portion of a base according to the further example according to the present invention.

FIG. 12A is a schematic diagram for explaining a step for disposing a cover portion on a base according to the further example according to the present embodiment.

FIG. 12B is a schematic diagram for explaining a step for filling an adhesive agent into a gap from an opening portion according to the further example according to the present embodiment.

FIG. 12C is a schematic diagram for explaining a step for causing an adhesive agent to penetrate into a gap according to the further example according to the present embodiment.

FIG. 12D is a schematic diagram for explaining a step for causing an adhesive agent to penetrate into a gap according the further example according to the present embodiment.

FIG. 13A is a schematic diagram for explaining penetration of an adhesive agent to an end portion that arrives at a top face of a wall portion according to the further example according to the present embodiment.

FIG. 13B is a schematic diagram for explaining penetration of an adhesive agent to an end portion that arrives at a top face of a wall portion according to the further example according to the present embodiment.

FIG. 14A is a side view depicting a base and a cover portion according to a yet further example according to the present invention.

FIG. 14B is a schematic diagram depicting a cross-section, along the section C-C, of the base and the cover portion depicted in FIG. 14A.

FIG. 15A is a schematic diagram for explaining a step for filling an adhesive agent into a gap from an opening portion according to the yet further example according to the present embodiment.

FIG. 15B is a schematic diagram for explaining a step for causing an adhesive agent to penetrate into a gap according to the yet further example according to the present embodiment.

FIG. 15C is a schematic diagram for explaining a step for causing an adhesive agent to penetrate into a gap according to the yet further example according to the present embodiment.

FIG. 16A is a schematic diagram depicting a cross-section, along the section D-D, of the base and the cover portion of FIG. 15A.

FIG. 16B is a schematic diagram depicting a cross-section, along the section D-D, of the base and the cover portion of FIG. 15B.

FIG. 16C is a schematic diagram depicting a cross-section, along the section D-D, of the base and the cover portion of FIG. 15C.

FIG. 17A is a schematic diagram depicting a modified example of a wall portion of a base according to an example according to the present invention.

FIG. 17B is a schematic diagram depicting a modified example of a wall portion of a base and a side plate of a cover portion according to the example according to the present invention.

FIG. 18 is a partial enlarged diagram depicting a corner portion of a frame according to another example according to the present invention.

FIG. 19 is a plan view diagram of a top leaf spring according to another example according to the present invention.

FIG. 20 is a partial enlarged diagram depicting a top leaf spring and a suspension wire according to another example according to the present invention.

FIG. 21 is a schematic diagram for explaining the spread of flux in the another example according to the present invention.

FIG. 22 is a schematic diagram for explaining the spread of flux according to a reference example.

FIG. 23 is an assembly perspective diagram of a lens driving device according to a further example according to the present invention.

FIG. 24 is a plan view diagram of a top leaf spring according to the further example according to the present invention.

FIG. 25 is a block diagram of a lens holding portion according to further example according to the present invention.

FIG. 26 is a schematic diagram depicting schematically a lead frame, the suspension wire, and a top leaf spring in a cross-section, viewed along the section A-A, of the lens driving device depicted in FIG. 4.

FIG. 27 is a perspective diagram depicting a lead frame, a suspension wire, and a top leaf spring according to a yet further example according to the present invention.

FIG. 28 is a perspective diagram depicting a lead frame, a suspension wire, and a top leaf spring, connected through solder, according to a yet further example according to the present invention.

FIG. 29 is a schematic diagram depicting connecting of a lead frame and a suspension wire according to a yet further example according to the present invention.

FIG. 30 is a schematic diagram illustrating the joining between the lead frame and a suspension wire in a reference example.

FIG. 31 is a schematic diagram depicting connecting of a top leaf spring and a suspension wire according to a yet further example according to the present invention.

FIG. 32 is a schematic diagram illustrating the joining between the top leaf spring and a suspension wire in a reference example.

FIG. 33A is a schematic diagram depicting a base portion and an OIS frame according to an example according to the present invention.

FIG. 33B is a schematic diagram for explaining the movement of an OIS frame portion in an example according to the present invention.

FIG. 33C is a schematic diagram for explaining the imaging of a base portion and an OIS frame portion in an example according to the present invention.

FIG. 33D is a schematic diagram for explaining the intersection of a line segment and a line segment in an example according to the present invention.

FIG. 33E is a schematic diagram for explaining the positional relationship of a base portion and the positional relationship of an OIS frame portion in an example according to the present invention.

FIG. 33F is a schematic diagram for explaining the movement of an OIS frame portion in an 11th embodiment according to the present invention.

FIG. 33G is a schematic diagram depicting an aligned OIS frame according to an example according to the present invention.

FIG. 34 is a flowchart of an aligning method according to an example according to the present invention.

FIG. 35A is a schematic diagram for explaining imaging of an OIS frame portion and a suspension wire in an example according to the present invention.

FIG. 35B is a schematic diagram for explaining the intersection of a line segment and a line segment in an example according to the present invention.

FIG. 35C is a schematic diagram for explaining movement of a suspension wire according to an example according to the present invention.

FIG. 35D is a schematic diagram depicting an aligned suspension wire according to an example according to the present invention.

FIG. 35E is a schematic diagram for explaining insertion of a suspension wire into a through hole according to an example according to the present invention.

FIG. 36 is a schematic diagram for explaining a triangular surface formed from a through hole of a base portion according to a further example according to the present embodiment.

FIG. 37 is a schematic diagram for explaining a triangular surface formed from a top leaf spring of a base portion according to a further example according to the present embodiment.

DETAILED DESCRIPTION

A lens driving device 100 according to the present embodiment will be explained in reference to FIG. 1 through FIG. 7.

The lens driving device 100, as illustrated in FIGS. 1 and 2, is provided in an imaging device 1, an electronic device 2, or the like, that has an imaging element. The lens driving device 100 comprises an automatic focal point adjusting (automatic focusing: AF) mechanism, and a camera shaking preventing mechanism (for example, an optical image stabilizer (OIS), for preventing camera shake. The imaging device 1 is a camera, which may be a digital camera, a monitoring camera, or the like. The electronic device 2 is a mobile terminal, which may be a smart phone, a laptop-type personal computer, or the like, that has an imaging function. The imaging element may be, for example, a CCD (charge-coupled device), a CMOS (complementary metal oxide semiconductor), or the like.

The lens driving device 100, as illustrated in FIG. 3, comprises: a base portion 10, an OIS frame portion 30, a frame supporting portion 40, a lens retaining portion 60, a lens supporting portion 70, and a cover portion 80.

The base portion 10 is structured from a base 11, lead frames 24, 25A, 25B, 25C, and 25D, OIS coils 22A and 22B, and OIS position detecting portions 23A and 23B.

The OIS frame portion 30 is structured from a frame 31, OIS magnets 32A and 32B, an AF magnet 35A, and an AF position detecting portion 36. The OIS magnet 32A and the OIS coil 22A of the base portion 10 structure an OIS driving portion for driving the OIS frame portion 30. The OIS magnet 32B and the OIS coil 22B of the base portion 10 also structure an OIS guiding portion for driving the OIS frame portion 30.

The OIS frame portion 30 holds a lens retaining portion 60. Moreover, the OIS frame portion 30 is driven by an OIS driving portion, to swivel, in a direction that is perpendicular to the optical axis AX of the lens in a lens barrel (not shown), which is held in the lens retaining portion 60. Through this, the lens driving device 100 prevents camera shake. Note that one or more lenses is provided in the lens barrel.

The frame supporting portion 40 is structured from suspension wires 42A, 42B, 42C, and 42D and top leaf springs 41A, 41B, 41C, and 41D. The frame supporting portion 40 supports the OIS frame portion 30 so as to enable rotation.

The lens retaining portion 60 is structured from a cylindrical member 61, an AF coil 62, a yoke 63, and an AF position detecting magnet 65. The cylindrical member 61 holds the lens barrel. The AF coil 62 and the AF magnet 35A of the OIS frame portion 30 structure an AF driving portion 92.

The lens retaining portion 60 is driven by the AF driving portion 92, to move in the direction of the optical axis AX of the lens. The lens driving device 100 adjusts the focal point thereby.

The lens supporting portion 70 is a set of bearings 73A and 73B, and a bearing 73C. The set of bearings 73A and 73B, and the bearing 73C, as illustrated in FIGS. 3 and 6, are disposed between the OIS frame portion 30 and the lens retaining portion 60. The lens supporting portion 70 supports the lens retaining portion 60.

A cover portion 80 is attached to a base 11 of the base portion 10 as shown in FIGS. 4 and 5. The cover portion 80 covers the OIS frame portion 30, the frame supporting portion 40, the lens retaining portion 60, and the lens supporting portion 70.

The specific structure of the lens driving device 100 will be explained below.

Note that, for ease in understanding, the object side of the lens barrel, when viewed from the lens, will be explained as the "front," and the focusing side of the lens in the lens barrel will be explained as the "back." Moreover, the optical axis AX of the lens is defined as the Z axis, and directions that are perpendicular to the Z axis and perpendicular to each other are defined as the X axis and the Y axis.

The base portion 10 is structured from a rectangular base 11, lead frames 24, 25A, 25B, 25C, and 25D that are provided on the base 11, OIS coils 22A and 22B, and OIS position detecting portions 23A and 23B.

The base 11 has a circular opening portion 15 in the center portion thereof. The light from the imaging subject that passes through the lens of the lens barrel passes through the opening portion 15 to arrive at an imaging element (not shown) that is disposed therebehind. A cover portion 80 is attached to the base 11.

The respective OIS coils 22A and 22B are installed respectively in the supporting portions 20A and 20B. The supporting portions 20A and 20B are formed on the base 11 along two adjacent sides of the base 11. The OIS position detecting portions 23A and 23B are provided along respective supporting portions 21A and 21B that are adjacent to respective supporting portions 20A and 20B.

The OIS coil 22A generates a magnetic field for moving the OIS frame portion 30 in the Y axial direction. Moreover, the OIS coil 22B generates a magnetic field for moving the OIS frame portion 30 in the X axial direction. The OIS coils 22A and 22B respectively face the OIS magnets 32A and 32B of the OIS frame portion 30. The OIS coil 22A and the OIS magnet 32A structure an OIS driving portion for driving the OIS frame portion 30 in the Y axial direction. The OIS coil 22B and the OIS magnet 32B structure an OIS driving portion for driving the OIS frame portion 30 in the X axial direction. The driving of the OIS frame portion 30 and the camera shake prevention, by the OIS driving portion, will be described below.

In addition, the OIS position detecting portions 23A and 23B face the respective OIS magnets 32A and 32B of the OIS frame portion 30. The OIS position detecting portion 23A detects the position of the OIS magnet 32A, in the Y axial direction, relative to the base portion 10. The OIS position detecting portion 23B detects the position of the OIS magnet 32B, in the X axial direction, relative to the base portion 10. Through this, the OIS position detecting portions 23A and 23B are able to detect the position of the OIS frame portion 30, in the X axial direction and the Y axial direction, relative to the base portion 10. The OIS position detecting portions 23A and 23B are, for example, Hall elements, or the like.

The lead frames 24, 25A, 25B, 25C, and 25D are formed from, for example, copper alloy, with nickel plating and gold plating applied sequentially thereto. The lead frames 25A, 25B, 25C, and 25D are provided at respective corners of the base 11. The suspension wires 42A, 42B, 42C, and 42D are joined respectively to the lead frames 25A, 25B, 25C, and 25D.

The individual lead frames 24, 25A, 25B, 25C, and 25D are connected to a controlling portion (not shown). Electric power or signals outputted from the controlling portion is inputted into the OIS coils 22A and 22B, the OIS position detecting portions 23A and 23B, the AF position detecting portion 36, and the AF coil 62 through the lead frames 24, 25A, 25B, 25C, and 25D, and an interconnection (not shown) that is joined to the lead frame 24 or the suspension wires 42A, 42B, 42C, and 42D. Moreover, the signals that are outputted from the OIS position detecting portions 23A and 23B, and the AF position detecting portion 36, are also inputted into the controlling portion through the lead frames 24, 25A, 25B, 25C, and 25D, and the interconnection that is joined to the lead frame 24 or the suspension wires 42A, 42B, 42C, and 42D.

The frame supporting portion 40 is structured from top leaf springs 41A, 41B, 41C, and 41D and suspension wires 42A, 42B, 42C, and 42D.

Top leaf springs 41A, 41B, 41C, and 41D are each plate-shaped members that have right triangular frames. The top leaf springs 41A, 41B, 41C, and 41D are formed from metal that is elastic and electrically conductive.

The top leaf springs 41A, 41B, 41C, and 41D are provided at respective supporting portions 37A, 37B, 37C, and 37D of the OIS frame portion 30.

The suspension wires 42A, 42B, 42C, and 42D are formed from metal that is elastic and electrically conductive.

One end each of the suspension wires 42A, 42B, 42C, and 42D is connected to the respective top leaf spring 41A, 41B, 41C, and 41D. Moreover, the other end of each of the suspension wires 42A, 42B, 42C, and 42D is connected to the respective lead frame 25A, 25B, 25C, and 25D of the base portion 10.

Through a structure such as described above, the frame supporting portion 40 supports the OIS frame portion 30 so as to be able to rotate.

The OIS frame portion 30 holds a lens retaining portion 60. The OIS frame portion 30 rotates in the X axial direction and the Y axial direction relative to the base portion 10.

The OIS frame portion 30 is supported by the frame supporting portion 40 so as to be able to rotate.

The OIS frame portion 30 is structured from a frame 31 that is a rectangular frame, OIS magnets 32A and 32B that are provided on the frame 31, an AF magnet 35A, and an AF position detecting portion 36.

The OIS magnets 32A and 32B are provided respectively on positioning portions 33A and 33B of the frame 31. The positioning portions 33A and 33B are formed respectively along two adjacent edges of the frame 31.

In the OIS frame portion 30, the OIS magnet 32A is disposed facing the OIS position detecting portion 23A and the OIS coil 22A of the base portion 10, and the OIS magnet 32B is disposed facing the OIS position detecting portion 23B and the OIS coil 22B of the base portion 10.

The AF magnet 35A is provided on the supporting portion 35B that is formed on a corner portion 38B of the frame 31. Here the corner portion of the frame 31 refers to a region in the vicinity of a corner that is between two edges that form a corner of the frame 31. The shape of the corner of the frame 31 is arbitrary. The corner of the frame 31 is not limited to being a right angle, but rather may be formed having curvature, for example. The corner portion 38B of the frame 31 is a corner portion that is made from an edge on which the OIS magnet 32A is disposed and an edge on which the OIS magnet 32B is disposed.

As illustrated in FIG. 5 and FIG. 6, the AF magnet 35A faces the AF coil 62 of the lens retaining portion 60. The AF magnet 35A and the AF coil 62 structure an AF driving portion 92 for driving the lens retaining portion 60. The driving of the lens retaining portion 60 and the automatic focal point adjustment, by the AF driving portion 92, will be described below.

The AF position detecting portion 36 is provided on a supporting portion 36C that is formed on a corner portion 38D of the frame 31. The corner portion 38D of the frame 31 is opposite from the corner portion 38B wherein the AF magnet 35A is positioned (that is, it is positioned on the diagonal line).

The AF position detecting portion 36 faces the AF position detecting magnet 65 of the lens retaining portion 60. The AF position detecting portion 36 faces the base portion 10, and detects the position, in the Z axial direction, of the AF position detecting magnet 65 of the lens retaining portion 60. Through this, the AF position detecting portion 36 is able to detect the position, in the Z axial direction, of the lens retaining portion 60 relative to the base portion 10. The AF position detecting portion 36 is a magnetic sensor such as, for example, a Hall element, or the like.

In the frame 31, the lens retaining portion 60 is contained within an opening portion 31A. As illustrated in FIG. 6, bearing slide portions 72A and 71A are formed respectively at mutually opposite corner portions 38A and 38C, which are other than the corner portions 38B and 38D, in the frame 31. The bearing slide portions 71A and 72A each have grooves that extend in the Z axial direction. Bearings 73A and 73B, and a bearing 73C, are disposed respectively in the bearing slide portions 71A and 72A. The bearing slide portions 71A and 72A hold the lens retaining portion 60 through the bearings 73A and 73B, and the bearing 73C. The holding of the lens retaining portion 60 will be described below.

Furthermore, supporting portions 37A, 37B, 37C, and 37D are formed a respective corner portions 38A, 38B, 38C, and 38D of the frame 31. Top leaf springs 41A, 41B, 41C, and 41D are provided on respective supporting portions 37A, 37B, 37C, and 37D.

The lens supporting portion 70 supports the lens retaining portion 60. The lens supporting portion 70 is a set of bearings 73A and 73B, and a bearing 73C. As illustrated in FIG. 3 and FIG. 6, the bearings 73A and 73B are disposed between a groove on the bearing slide portion 71A of the frame 31 and a groove of the bearing slide portion 71B of a cylindrical member 61. Moreover, the bearing 73C is provided between a bearing slide portion 72A of the frame 31 and a bearing slide portion 72B of the cylindrical member 61. Supporting of the lens retaining portion 60 will be described below.

The lens retaining portion 60 moves in the Z axial direction to adjust the focal point. The lens retaining portion 60 is contained in the opening portion 31A of the frame 31.

The lens retaining portion 60 is structured from a cylindrical member 61 that has an exterior shape that is octagonal, a yoke 63, an AF coil 62, and an AF position detecting magnet 65.

The lens barrel is contained within the cylindrical shape of the cylindrical member 61.

The lens barrel is attached to an attaching portion 74 that is provided on the inner peripheral surface of the cylindrical member 61. Through this, the lens barrel is held in the cylindrical member 61. Note that the cylindrical member 61 may hold one or more lenses directly, rather than holding a lens barrel.

Moreover, bearing slide portions 71B and 72B are formed on respective side face portions 67 and 68 that face the cylindrical member 61. The bearing slide portions 71B and 72B have grooves that extend in the Z axial direction.

A yoke 63 is provided on a side face portion 64 of the cylindrical member 61. Moreover, the AF coil 62 is provided on the yoke 63 of the side face portion 64. The AF coil 62 faces the AF magnet 35A of the OIS frame portion 30, as illustrated in FIG. 5 and FIG. 6.

The AF coil 62 and the AF magnet 35A structure the AF driving portion 92 that drives the lens retaining portion 60.

The AF position detecting magnet 65 is provided on a side face portion 66 that faces the side face portion 64. The AF position detecting magnet 65, as illustrated in FIG. 5 and FIG. 6, faces the AF position detecting portion 36 of the OIS frame portion 30.

Here, as illustrated in FIG. 7, the side face portion 64 and the side face portion 66, when the cylindrical member 61 is viewed in a plan view, have a positional relationship wherein the perpendicular line N1 from the side face portion 64 to the side face portion 66 is perpendicular to the perpendicular line N2 from the side face portion 67 to the side face portion 68. Consequently, the bearing slide portion 71B, the AF position detecting magnet 65, the bearing slide portion 72B, and the AF coil 62 are disposed sequentially, at 90° intervals, on the outer periphery of the cylindrical member 61, which is centered on the point of intersection N between the perpendicular line N1 and the perpendicular line N2.

The supporting and holding of the lens retaining portion 60 will be explained.

The lens retaining portion 60 is contained in the opening portion 31A of the frame 31. In this case, as illustrated in FIG. 6, the lens retaining portion 60 is arranged such that the AF coil 62 and the yoke 63 face the AF magnet 35A of the OIS frame portion 30, and the AF position detecting magnet 65 faces the AF position detecting portion 36 of the OIS frame portion 30.

Moreover, the groove of the bearing slide portion 71B of the lens retaining portion 60 faces the groove of the bearing slide portion 71A of the frame 31. The bearings 73A and 73B are held in the groove of the bearing slide portion 71B and the groove of the bearing slide portion 71A. The groove of the bearing slide portion 72B of the lens retaining portion 60 and the groove of the bearing slide portion 72A of the frame 31 also face each other. The bearing 73C is held in the groove of the bearing slide portion 72B and the groove of the bearing slide portion 72A. Given this, the lens retaining portion 60 is supported on the bearings 73A and 73B, and the bearing 73C, so as to enable movement in the Z axial direction.

Moreover, the lens retaining portion 60 is held on the OIS frame portion 30 by the force of magnetic attraction of the yoke 63 and the AF magnet 35A of the OIS frame portion 30, which are disposed facing each other.

For the cover portion 80, the bottom plate is a rectangular cover. The cover portion 80 covers the OIS frame portion 30, the frame supporting portion 40, the lens retaining portion 60, and the lens supporting portion 70. The cover portion 80 is attached to the base 11 of the base portion 10.

The cover portion 80 has an opening portion 82 in a bottom plate 221. The light from the imaging subject passes through the opening portion 82 to be incident into the lens barrel, to arrive at an imaging element that is disposed therebehind.

The driving and the automatic focal point adjustment of the lens retaining portion 60 will be explained next.

The mutually facing AF magnet 35A of the OIS frame portion 30, and AF coil 62 of the lens retaining portion 60 structure the AF driving portion 92. Moreover, the AF position detecting portion 36 of the OIS frame portion 30 detects the position, in the Z axial direction, of the lens retaining portion 60 relative to the base portion 10, from the magnetic field of the AF position detecting magnet 65 of the lens retaining portion 60. The AF coil 62 is disposed so that the axis of the coil is perpendicular to the magnetic field of the AF magnet 35A. Consequently, when an electric current is supplied from the controlling portion to the AF coil 62, the magnetic field that is produced in the AF coil 62 interacts with the magnetic field of the AF magnet 35A. Through this, a force in the Z axial direction acts on the AF coil 62. The cylindrical member 61 of the lens retaining portion 60 wherein the AF coil 62 is provided is supported by the bearing 73A and 73B and the bearing 73C, and thus the lens retaining portion 60 moves in the Z axial direction relative to the OIS frame portion 30. The controlling portion controls the direction of the current that flows in the AF coil 62, enabling control of the direction of movement of the lens retaining portion 60.

As described above, the lens retaining portion 60 is driven by the AF driving portion 92. The AF driving portion 92 moves the lens retaining portion 60 to the position in the Z axial direction wherein, for example, the contrast is maximized for the image that is captured. Through this, the lens driving device 100 carries out automatic focal point adjustment in the imaging device 1. In this case, the controlling portion performing feedback control of the position of the lens retaining portion 60 in the Z axial direction, based on the position of the lens retaining portion 60 in the Z axial direction, detected by the AF position detecting portion 36, enables the lens driving device 100 to control, with high precision, the position of the lens retaining portion 60 in the Z axial direction. Moreover, through this feedback control, the lens driving device 100 is able to maintain stably the position of the lens retaining portion 60 in the Z axial direction. The driving and camera shake prevention of the OIS frame portion 30 will be explained next.

The mutually facing OIS coil 22A of the base portion 10 and OIS magnet 32A of the OIS frame portion 30 structure an OIS driving portion for driving the OIS frame portion 30 in the Y axial direction. Moreover the mutually facing OIS coil 22B of the base portion 10 and OIS magnet 32B of the OIS frame portion 30 structure an OIS driving portion for driving the OIS frame portion 30 in the X axial direction. The OIS position detecting portions 23A and 23B of the base portion 10 face the OIS magnets 32A and 32B respectively. The OIS position detecting portion 23A detects the position of the OIS frame portion 30, in the Y axial direction, relative to the base portion 10. The OIS position detecting portion 23B detects the position of the OIS frame portion 30, in the X axial direction, relative to the base portion 10.

The OIS coil 22A is disposed so that the coil axis is perpendicular to the magnetic field of the OIS magnet 32A. Consequently, when an electric current is supplied by the controlling portion to the OIS coil 22A, the magnetic field that is produced in the OIS coil 22A interacts with the magnetic field of the OIS magnet 32A. Through this, a force acts on the OIS magnet 32A in the Y axial direction. The OIS frame portion 30 is supported, by the frame supporting portion 40, so as to enable rotation, and thus the OIS frame portion 30 moves in the Y axial direction relative to the base portion 10. The controlling portion is able to control the direction of movement of the OIS frame portion 30 through controlling the direction in which the electric current flows in the OIS coil 22A.

Moreover, the OIS coil 22B of the base portion 10 is disposed so that the coil axis is perpendicular to the magnetic field of the OIS magnet 32B. Consequently, when an electric current is supplied by the controlling portion to the OIS coil 22B, the magnetic field that is produced in the OIS coil 22B interacts with the magnetic field of the OIS magnet 32B. Through this, a force acts on the OIS magnet 32B in the X axial direction. The OIS frame portion 30 is supported, by the frame supporting portion 40, so as to enable rotation, and thus the OIS frame portion 30 moves in the X axial direction relative to the base portion 10. The controlling portion is able to control the direction of movement of the OIS frame portion 30 through controlling the direction in which the electric current flows in the OIS coil 22B.

The OIS frame portion 30 is driven by the OIS driving portion as described above.

The OIS driving portion moves the OIS frame portion 30 so as to cancel out vibration that is detected by a vibration sensor of the imaging device 1. Through this, the lens driving device 100 is able to prevent camera shaking in the imaging device 1. The lens driving device 100 is able to prevent camera shaking, with high accuracy, through the controlling portion performing feedback control of the position of the OIS frame portion 30, based on the position of the OIS frame portion 30 that is detected by the OIS position detecting portions 23A and 23B.

The tilt of the lens retaining portion 60 in respect to the XY plane, produced through movement of the lens retaining portion 60 in the first embodiment in the Z axial direction, will be explained in the present embodiment.

In the first embodiment, as illustrated in FIG. 6, the bearings 73A and 73B of the lens supporting portion 70 are held by the bearings slide portion 71B of the lens retaining portion 60 and of the bearing slide portion 71A of the frame 31. The bearing 73C of the lens supporting portion 70 is held by the bearing slide portion 72B of the lens retaining portion 60 and the bearing slide portion 72A of the frame 31. The bearings 73A and 73B, and the bearing 73C, support the lens retaining portion 60.

The bearing slide portion 71A and the bearing slide portion 72A are formed respectively on opposite corner portions 38C and 38A of the frame 31.

That is, when the frame 31 is viewed in the plan view, the bearings 73A and 73B, and the bearing 73C are disposed at the corner portion 38C and the corner portion 38A, respectively, that have the broadest spacing the opening portion 31A.

Because the bearings 73A and 73B, and the bearing 73C, which support the lens retaining portion 60, are disposed at the positions with the widest spacing, it is possible to suppress the tilting of the lens retaining portion 60, in respect to the XY plane, that is produced through movement of the lens retaining portion 60 in the Z axial direction.

Moreover, as illustrated in FIG. 6, the lens driving portion 92 is disposed at a corner portion 38B that is different from the corner portions 38C and 38A of the frame 31 wherein the bearings 73A and 73B and the bearing 73C are arranged.

Through this, the difference in the distance between the AF driving portion 92 and the bearing 73A or the bearing 73B and the distance between the AF driving portion 92 and the bearing 73C can be reduced. Consequently, the driving force from the AF driving portion 92 is applied equally to the bearings 73A and 73B and the bearing 73C. Because, the driving force is applied equally to the bearings 73A and 73B and the bearing 73C, this further suppresses the tilting of the lens retaining portion 60, in respect to the XY plane, produced through moving the lens retaining portion 60 in the Z axial direction. Furthermore, as illustrated in FIG. 7, in the cylindrical member 61 of the lens retaining portion 60, because the bearing slide portion 71B, the AF coil 62, and the bearing slide portion 72B are arranged at 90° intervals centered on the point of intersection N, the difference between the distance between the AF driving portion 92 and the bearing 73A or the bearing 73B and the distance between the AF driving portion 92 and the bearing 73C can be reduced even further. Consequently, this can further suppress the tilt of the lens retaining portion 60 in respect to the XY plane that is produced through movement of the lens retaining portion 60 in the Z axial direction.

Note that in order to further suppress tilting of the lens retaining portion 60 in respect to the XY plane, preferably the point of intersection N is on the Z axis.

As described above, through arranging the bearings 73A and 73B and the bearing 73C that the opposing corner portion 38C and corner portion 38A, the lens driving device 100 is able to suppress the tilt of the lens retaining portion 60, in respect to the XY plane, that is produced through movement of the lens retaining portion 60 in the Z axial direction of the lens.

Moreover, through disposing of the lens driving portion 92 at a corner portion 38B other than the corner portions 38C and 38A of the frame 31 wherein the bearings 73A and 73B and the bearing 73C are disposed, the tilt of the lens retaining portion 60, in respect to the XY plane, produced through movement of the lens retaining portion 60 in the Z axial direction, can be suppressed further.

Moreover, through arranging the bearing slide portion 71B, the AF coil 62, and the bearing slide portion 72B on the cylindrical member 61 of the lens retaining portion 60 at 90° intervals, centered on the point of intersection N, the lens driving device 100 can further suppress the tilt of the lens retaining portion 60, in respect to the XY plane, that is produced through movement of the lens retaining portion 60 in the Z axial direction.

A portion or all of the above described example can be described also as in the supplementary notes below, but there is no limitation to that which is below.

A lens driving device comprising:

a lens retaining portion for holding a lens group;

a rectangular frame for enclosing the lens retaining portion;

two first supporting portions for supporting the lens retaining portion on the frame; and a first driving portion for driving the lens retaining portion in the optical axial direction of the lens, wherein:

in the plan view, the first supporting portions are disposed at respective opposing corner portions of the frame, and the first driving portion is disposed in a corner portion other than the corner portions wherein the first supporting portions are disposed.

A lens driving device as set forth in Supplementary Note 1, wherein:

the lens retaining portion is of a octagonal shape in the plan view;

the first supporting portions each support opposing side faces of the lens retaining portion;

the first lens driving portion drives the lens retaining portion on a side wall of the lens holding portion that is different from a side wall of the lens retaining portion that is supported by a first supporting portion; and the perpendicular line from one side face, of the side faces that are supported by the first supporting portions, to the other side face, and the perpendicular line from the side face that is driven by the first driving portion to the side face that opposes the side face that is driven by the first driving portion cross at right angles.

A lens driving device as set forth in Supplementary Note 1 or 2, comprising:

a base;

a second supporting portion for supporting the frame on the base; and a second driving portion for driving the frame so as to cross the optical axial direction of the lens perpendicularly.

An imaging device, comprising:

a lens driving device as set forth in any one of Supplementary Notes 1 through 3.

An electronic device, comprising:

a lens driving device as set forth in any one of Supplementary Notes 1 through 3.

The accuracy for detecting the position of the lens supporting portion 60 in the Z axial direction by the AF position detecting portion 36 of the first embodiment will be explained in the present embodiment.

In the first embodiment, as illustrated in FIGS. 5 and 6, the side face portion 64 of the cylindrical member 61 that is provided with the AF coil 62 of the AF driving portion 92 and the side face portion 66 of the cylindrical member 61 wherein the AF position detecting magnet 65 is provided are opposite from each other. Moreover, the AF magnet 35A of the AF driving portion 92 faces the AF coil 62. The AF position detecting portion 36 of the OIS frame portion 30 faces the AF position detecting magnet 65.

Consequently, when the lens driving device 100 is viewed in the plan view, the AF position detecting portion 36 and the AF driving portion 92 face each other, with the lens barrel, wherein the cylindrical member 61 is held, positioned therebetween. That is, the AF position detecting portion 36 and the AF driving portion 92 are provided at positions wherein the lens and the cylindrical member 61 are positioned therebetween.

Because the AF position detecting portion 36 and the AF driving portion 92 are disposed at positions with the lens and the cylindrical member 61 positioned therebetween, the distance between the AF coil 62 and the AF position detecting portion 36 is large. As a result, this reduces the magnetic field interference of the AF coil 62 on the AF position detecting portion 36.

Through this, the AF position detecting portion 36 is able to detect, with high accuracy, the position of the lens retaining portion 60 in the Z axial direction relative to the base portion 10. That is, the lens driving device 100 is able to control, with high accuracy, the position of the lens retaining portion of the 60 in the Z axial direction.

In movement of the lens retaining portion 60 in the Z axial direction, the angle of the lens retaining portion 60 in respect to the XY plane (that is, the tilt with the AF coil 62 as the support point) may change. In this case, the AF position detecting portion 36 is provided at a position that is far from the AF coil 62, and thus, in feedback control, the AF position detecting portion 36 is able to detect, as dislocation of the lens retaining portion 60, a larger value than the distance of movement in the Z axial direction of the AF coil 62 that is equipped on the lens retaining portion 60. Through this, in that the lens driving portion 92, the distance of movement of the lens retaining portion 60 in the Z axial direction is controlled by the controlling portion so as to be lower, thus enabling the lens driving device 100 to control, with greater accuracy, the position of the lens retaining portion 60 in the Z axial direction.

As described above, because, when viewed in the plan view, the AF position detecting portion 36 and the AF driving portion 92 are provided with the lens and of the cylindrical member 61 positioned therebetween, the lens driving device 100 in the previous example is able to control the position of the lens retaining portion 60 in the Z axial direction more accurately.

While in the above examples, when viewed in the plan view, the AF position detecting portion 36 and the AF driving portion 92 are disposed at positions wherein the lens and cylindrical member 61 are positioned therebetween, the AF position detecting portion 36 and the AF driving portion 92, when viewed in the plan view, may be provided at positions wherein the lens is held therebetween.

For example, as depicted in FIG. 8 and FIG. 9, a reflecting plate 120 is provided instead of the AF position detecting magnet 65 on the cylindrical member 61. Moreover, an optical sensor 122 for detecting the position of the lens retaining portion 60 in the Z axial direction is provided on the base 11 at a position that faces the reflecting plate 120.

Through this, in the same manner as in the third embodiment, the lens driving device 100 is able to control the position of the lens retaining portion 60 in the Z axial direction with high accuracy.

Note that, for ease in understanding, FIGS. 8 and 9 are simplified, with only the base 11, the AF driving portion 92, the reflecting plate 120 and the optical sensor 122. In the lens retaining portion 60, the cylindrical member 61 may hold the lens directly.

A portion or all of the examples described above, can be described also as in the supplementary notes below, but there is no limitation to that which is below.

A lens driving device comprising:

a lens retaining portion for holding a lens group;

a first driving portion for driving the lens retaining portion in the optical axial direction of the lens; and a first position detecting portion for detecting a position of the lens retaining portion in the optical axial direction of the lens, wherein:

in the plan view, the first driving portion and the first position detecting portion are mutually provided at positions with the lens held therebetween.

A lens driving device as set forth in Supplementary Note 1, wherein:

in the plan view, the first driving portion and the first position detecting portion are mutually provided at positions with the lens retaining portion held therebetween.

A lens driving device as set forth in Supplementary Note 1 or 2, wherein:

the first position detecting portion in the first driving portion face each other.

A lens driving device as set forth in any one of Supplementary Note 1 through 3, wherein:

a base;

a frame for enclosing the lens retaining portion;

a first supporting portion for supporting the lens retaining portion on the frame;

a second supporting portion for supporting the frame on the base; and a second driving portion for driving the frame so as to cross the optical axial direction of the lens perpendicularly.

An imaging device, comprising:

a lens driving device as set forth in any one of Supplementary Notes 1 through 4.

An electronic device, comprising:

a lens driving device as set forth in any one of Supplementary Notes 1 through 4.

In the present embodiment, the attachment of the cover portion 80 to the base 11 of the base portion 10 in the first embodiment will be explained in reference to FIG. 10A through FIG. 13B.

In the lens driving device 100, the base 11 and the cover portion 80 are bonded together through an adhesive agent 240 that is provided in gaps 230 between the base 11 and the cover portion 80. The base 11 and the cover portion 80 structure a case 85.

The cover portion 80, as illustrated in FIG. 10A, has a rectangular bottom plate 221 and side plates 222. The bottom plate 221 has an opening portion 82 through which light from an imaging subject passes. The side plates 222 are structured from side plates 222A, 222B, 222C, and 222D, that extend from the respective four edges of the bottom plate 221. An opening portion 223, wherein the center part of each end portion is cut away, is provided in each of the side plates 222A, 222B, 222C, and 222D.

The cover portion 80 is formed as a single unit from a metal, such as stainless steel, or a resin, such as a thermoplastic resin.

The base 11, as illustrated in FIG. 10B, is formed in a flat rectangular plate-shape from a resin, such as a thermoplastic resin. The base 11 has a wall portion 212 in which is formed a primary face 11A and an opening portion 15 through which passes light that has passed through the lenses of the lens barrel.

The wall portion 212 surrounds, in a rectangle, OIS coils 22A and 22B, OIS position detecting portions 23A and 23B, and lead frames 24, 25A, 25B, 25C, and 25D, on the primary face 11A. The wall portion 212 is structured from wall portions 212A, 212B, 212C, and 212D that extend respectively from the four edges of the primary face 11A. Each of the wall portions 212A, 212B, 212C, and 212D is formed in a trapezoidal shape. That is, the heights of each of the wall portions 212A, 212B, 212C, and 212D, in the respective length directions, is lower toward both end portions than in the center portion. Here the length directions of the wall portions 212A, 212B, 212C, and 212D mean the direction in which each extends along the edge of the primary face 11A. Moreover, the heights of the wall portions 212A, 212B, 212C, and 212D means the height from the primary face 11A.

Moreover, between the wall portion 212 and the four edges of the primary face 11A, a flat portion 216 is provided.

When the cover portion 80 is disposed on the base 11, the contacting portion 224 of the end portion of the side plate 222 contacts the flat portion 216 of the base 11, and the cover portion 80 covers the primary face 11A of the base 11. In this case, each of the side plates 222A, 222B, 222C, and 222D faces the respective wall portion 212A, 212B, 212C, and 212D. Moreover, portions of the respective wall portions 212A, 212B, 212C, and 212D are exposed, in the centers thereof, from the opening portion 223 of each of the side plates 222A, 222B, 222C, and 222D.

Gaps 230 are formed between the wall portions 212 and the side plates 222.

The adhesive agent 240, which penetrates into the gaps 230, adhesively bonds the base 11 and the cover portion 80. The adhesive agent 240 is filled into the gaps 230 through the opening portions 223 of the respective side plates 222. The adhesive agent 240 has viscosity such that it cannot penetrate through the gaps 230. The adhesive agent 240 is, for example, a thermally curable resin.

The method for attaching the cover portion 80 to the base 11 will be explained next in reference to FIG. 12A through FIG. 12D. Note that in FIG. 12A, the OIS coils 22A and 22B, the OIS frame portion 30, the frame supporting portion 40, and the like, are omitted, for ease in understanding.

As illustrated in FIG. 12A, first the cover portion 80 is disposed on the base 11. In this case, the contacting portion 224 of the cover portion 80 is guided along the outside surfaces of the wall portion 212, and thus the contacting portions 224 of the cover portion 80 can be brought into contact easily with the flat portion 216 of the base 11. Following this, as illustrated in FIG. 12B, the adhesive agent 240 is filled into the gaps 230 through the opening portions 223 of the side plates 222. In this case, a portion at the center portion of the wall portion 212 is exposed from the opening portion 223 of the side plate 222, and thus this can prevent the adhesive agent 240 that has been filled in from flowing past the wall portion 212 and entering into the interior of the wall portion 212.

Next, as illustrated in FIG. 12C, the adhesive agent 240 that has been filled in through the opening portion 223 penetrates into the gap 230 through capillary action. Through this process, the adhesive agent 240 will reach both end portions of the gap 230, as shown in FIG. 12D.

Finally, the adhesive agent 240 is cured to a prescribed method. For example, if the adhesive agent 240 is a thermally curable resin, the adhesive agent 240 is cured through heating.

Through the steps described above, the cover portion 80 is attached to the base 11.

The penetration of the adhesive agent 240 into the gaps 230 will be explained.

Capillary action is a phenomenon wherein a liquid moves through being drawn along the surface of an object through the adhesive force between the surface of the object and the molecules of the liquid overcoming the cohesive force that acts between the molecules of the liquid. The adhesive agent 240 that is filled through the opening portions 223 is drawn toward the wall portion 212 and the side plate 222 through the adhesive forces with the wall portions 212 and the side plates 222, to penetrate into the gaps 230.

In the present embodiment, the adhesive agent 240 is filled into the opening portions 223, and thus the adhesive agent 240 penetrates toward the directions of the end portions of the gap 230 from the center portion of the wall portion 212. Moreover, the because the height of the wall portion 212 is less toward both end sides than in the center portion, which is exposed from the opening portion 223, the cross-sectional area of the cross section in the direction that is perpendicular to the direction that extends from the center portion toward the end portions of the wall portion 212 in the gap 230 gets smaller in the directions toward the end portions from the center portion of the wall portion 212. Consequently, the cross-sectional area of the gap 230 is smaller towards the direction in which the adhesive agent 240 penetrates, promoting this capillary action in the gap 230. Moreover, because the height of the wall portion 212 is lower towards the end portions than the center portion, the adhesive agent 240 that has reached the top face 215 of the wall portion 212 is pushed out in the direction of the end portions of the wall portion 212, as illustrated in FIG. 13A and FIG. 13B.

In this way, the adhesive agent 240 that is filled through the opening portion 223 can penetrate quickly all the way to both end portions of the gap 230 from the center portion of the wall portion 212 in a short time.

As described above, in the present embodiment the cross-sectional area of the cross section of the gap 230 in the direction that is perpendicular to the directions toward the end portions from the center portion of the wall portion 212 is smaller in the directions toward the end portions than in the center portion of the wall portion 212, making it possible to cause penetration of the adhesive agent 240 to both end portions of the gap 230 in a short time.

Moreover, because the height of the wall portion 212 is lower towards the end portions from the center portion, the adhesive agent 240 can be caused to penetrate all the way to both end portions of the gap 230.

Note that the shape of the wall portion 212 of the base 11 is not limited to being a trapezoidal shape wherein the height is lower towards both end portions than at the center portion. What is necessary is for the wall portion 212 of the base 11 to be lower toward the end portions, in the direction of the length of the wall portion 212, than that of the wall portion 212 that is exposed through the opening portion 223, as illustrated in FIG. 11D.

For example, the wall portion 212 of the base 11 may be an arc shape wherein the height is less toward both end portions than at the center, as illustrated in FIG. 11B. Moreover, the wall portion 212 of the base 11 may be a stepped shape wherein the height is reduced in stages, as illustrated in FIG. 11C. Furthermore, the wall portion 212 of the base 11 may be formed with recessed and protruding portions 213 on the top face 215 of the wall portion 212.

Moreover, the position wherein the height of the wall portion 212 is tall is not limited to being at the center portion of the wall portion 212, but rather it may be arbitrary. For example, the position wherein the height of the wall portion 212 is tall may be at one of the end portions of the wall portion 212. In this case, the height of the wall portion 212 would be lower towards the other end portion, for example. Note that the opening portion 223 is provided in a position, in the side plate 222, corresponding to the position wherein the height of the wall portion 212 is tall.

A plurality of positions wherein the height of the wall portion 212 is high may be provided. In this case, a plurality of opening portions 223 may be provided in each of the side plates 222A, 222B, 222C, and 222D.

While in the example above, the cross-sectional area of the gap 230 was reduced, relative to the center portion, in the directions of the end portions in the wall portion 212, there is no limitation to the direction of the cross-sectional area of the gap 230 being a direction from the center portion to an end portion of the wall portion 212.

Instead, the cross-sectional area of the cross section of the gap 230 in the direction that is perpendicular to the direction from the end portion of the wall portion 212 in the height direction toward the primary face 11A of the base 11 may be reduced in the direction toward the primary face 11A of the base 11 from the end portion in the height direction of the wall portion 212 that is exposed from the opening portion 223.

In the present embodiment, as illustrated in FIG. 14A and FIG. 14B, the face 214 that faces the side plate 222 of the wall portion 212 is tilted, toward the inside of the case 85, relative to a plane that is perpendicular to the primary face 11A. Note that the height of the wall portion 212 is constant.

On the other hand, when the cover portion 80 is attached to the base 11, the face that opposes the wall portion 212 of the side plate 222 is perpendicular to the primary face 11A.

Consequently, the spacing of the wall portions 212 and the side plates 222 will be narrower toward the primary face 11A from the top end of the wall portions 212. That is, the cross-sectional area of the cross section of the gap 230 in the direction that is perpendicular to the direction from the end portion of the wall portion 212 in the height direction toward the primary face 11A of the base 11 is reduced in the direction toward the primary face 11A of the base 11 from the end portion in the height direction of the wall portion 212 that is exposed from the opening portion 223.

Note that preferably the angle between the face 214 of the wall portion 212 and the face of the side plate 222 that faces the wall portion 212 is no greater than 45°. The method for attaching the cover portion 80 to the base 11, and the penetration of the adhesive agent 240, will be explained referencing FIG. 15A through FIG. 16C.

First, in the same manner as in the fifth embodiment, the cover portion 80 is placed on the base 11.

Following this, the adhesive agent 240 is filled into the gaps 230 from the opening portions 223 of the side plates 222, as illustrated in FIGS. 15A and 16A.

Moreover, as illustrated in FIG. 15B and FIG. 16B, the adhesive agent 240 that has been filled in from the opening portions 223 is caused to penetrate into the gaps 230 through capillary action. In this case, the cross-sectional area of the cross section of the gap 230 in the direction that is perpendicular to the direction toward the primary face 11A of the base 11, from the end portions, in the height direction of the wall portion 212, is smaller in the direction toward the primary face 11A of the base 11 from the end portion in the height direction, of the wall portion 212 that is exposed through the opening portion 223, and thus even if there is variability in the shapes of the wall portion 212 and the side plate 222, still, regardless of the height-direction position of the wall portion 212, the adhesive agent 240 will penetrate rapidly in the directions of the end portions of the wall portion 212. Moreover, capillary action in the direction toward the primary face 11A of the base 11 from the end portions, in the height direction, of the wall portion 212 is heightened, so that the adhesive agent 240 will penetrate uniformly to both end portions of the gap 230, as illustrated in FIGS. 15C and 16C.

Finally, the adhesive agent 240 is cured to a prescribed method.

Through the steps described above, the cover portion 80 is attached to the base 11. As described above, in the present embodiment the cross-sectional area of the cross section of the gap 230 in the direction that is perpendicular to the direction toward the primary face 11A from the end portion of the wall portion 212 in the height direction is smaller toward the direction toward the primary face 11A from the end portion in the height direction of the wall portion 212 that is exposed from the opening portion 223, so that the adhesive agent 240 can be caused to penetrate uniformly all the way to both end portions of the gap 230 in a short time.

Because the spacing between the wall portion 212 and the side plate 222 at the top end of the wall portion 212 is wide, this prevents the adhesive agent 240 that is filled therein from going past the wall portion 212 to enter into the inside of the wall portion 212. Furthermore, because the face 214 of the wall portion 212 is angled toward the inside of the case 85 relative to the plane that is perpendicular to the primary face 11A of the base 11, the side plate 222 of the cover portion 80 is guided along the face 214, so that the cover portion 80 can be placed on the base 11 easily.

While above, the face 214 of the wall portion 212 that faces the side plate 222 is angled toward the inside of the case 85 relative to a plane that is perpendicular to the primary face 11A, the surface that is angled is not limited to the face 214. For example, as illustrated in FIG. 17A, the surface of the side plate 222 that faces the wall portion 212 may be angled toward the outside of the case 85 relative to the plane that is perpendicular to the primary face 11A. Moreover, as illustrated in FIG. 17B, the face 214 of the wall portion 212 and the face of the side plate 222 that faces the wall portion 212 may be inclined.

Moreover, while in the example above, the face 214 is a plane, the shape of the face 214 is not limited thereto. For example, the face 214 may instead be a concave curved surface. Moreover, the face 214 may be structured from a plurality of flat surfaces.

Moreover, in the present embodiment and in Embodiment 6, a plurality of opening portions 223 may be provided in each of the side plates 222A, 222B, 222C, and 222D. Moreover, the height of the wall portions 212 may, in the same way as in the fifth embodiment, be lower toward the end portions, in the lengthwise direction of the wall portion 212, from the wall portion 212 that is exposed through the opening portions 223. The top leaf springs 41A, 41B, 41C, and 41D in the first embodiment will be explained in the present embodiment.

In the lens driving device 100, the top leaf springs 41A, 41B, 41C, and 41D are provided respectively at the corner portions 38A, 38B, 38C, and 38D of the frame 31. Moreover, the top leaf springs 41A, 41B, 41C, and 41D are joined respectively to suspension wires 42A, 42B, 42C, and 42D through soldering.

First, the corner portions 38A, 38B, 38C, and 38D of the frame 31 will be explained using, as an example, the corner portion 38B wherein the top leaf spring 41B is provided. The structures of the corner portions 38A, 38C, and 38D are the same as for that of the corner portion 38B, in regards to attaching the top leaf springs 41A, 41C, and 41D.

As illustrated in FIGS. 3 and 18, in the corner portion 38B, the top face of an L-shaped sidewall 311 of the frame 31 is formed so as to be lower, in the Z axial direction, than the supporting portion 37B that is provided with the top leaf spring 41B. Moreover, an opening portion 312 that is surrounded by the sidewall 311 of the frame 31 and the supporting portion 37B is formed in the corner portion 38B.

Two circular columnar protruding portions 313 are formed in the supporting portion 37B. The protruding portion 313 protrudes in the Z axial direction.

The structures of the top leaf springs 41A, 41B, 41C, and 41D will be explained next in reference to FIG. 19.

The top leaf springs 41A, 41B, 41C, and 41D are plate-shaped members that have identical shapes and sizes. The top leaf spring 41B will be explained below.

As illustrated in FIG. 19, the top leaf spring 41B has a frame that is formed in a right triangle from a angled edge portion 333 and edge portions 335 and 336. The edge portion 335 and the edge portion 336 are joined at right angles at an apex portion 334. A circular through hole 331 is formed at the joining portion of the angled edge portion 333 and the edge portion 335. An elliptical through hole 332, that extends in parallel to the lengthwise direction of the angled edge portion 333, is formed at the joining portion of the angled edge portion 333 and the edge portion 336. Note that the widths of the edge portion 335 and the edge portion 336 are identical.

An opening portion 343 with an irregular pentagonal shape is formed on the inside of the frame. In the opening portion 343, an arm portion 337 extends out, from the apex portion 334, in the direction toward the angled edge portion 333. An outer peripheral portion 338, a connecting portion 339, a joining portion 340, a through hole 341, and a slit 342 are formed at the end portion of the arm portion 337 on the angled edge portion 333 side. The outer peripheral portion 338 is formed in a circular ring shape. The outer peripheral portion 338 is joined to an end portion of the arm portion 337, on the angled edge portion 333 side, on the outer periphery of the ring. Moreover, the outer peripheral portion 338 is surrounded by the connecting portion 339 and the joining portion 340.

The connecting portion 339 protrudes in a strip-shaped from the outer edge of the joining portion 340. Moreover, one end of the connecting portion 339 is joined to the inner periphery of the outer peripheral portion 338. That is, the connecting portion 339 joins the outer peripheral portion 338 and the joining portion 340.

The joining portion 340 is formed in a circle. The joining portion 340 is joined to the outer peripheral portion 338 through the connecting portion 339. The outer peripheral portion 338 is joined to the arm portion 337, and so the joining portion 340 is joined to the arm portion 337 through the connecting portion 339 and the outer peripheral portion 338.

Moreover, a through hole 341, into which the suspension wire 42B is inserted, is formed in the center portion of the joining portion 340.

A C-shaped slit 342 is formed between the outer peripheral portion 338 and the joining portion 340. In the present embodiment, the slit 342 is formed so as to be concentric with the outer peripheral portion 338 and the joining portion 340.

Moreover, the connecting portion 339 has a length that is equal to the width of the slit 342. The arm portion 337, the outer peripheral portion 338, and the connecting portion 339 each have their respective prescribed widths. The prescribed widths of the arm portion 337, the outer peripheral portion 338, and the connecting portion 339 are narrower than the widths of the edge portions 335 and 336.

The shape and dimensions of the top leaf spring 41B are determined so that the arm portion 337 will determine the elasticity of the top leaf spring 41B. For example, the outer peripheral portion 338 and the connecting portion 339 each have moduli of elasticity that are near to being rigid bodies. In particular, the connecting portion 339 is formed in a shape that has a modulus of elasticity that is adequately larger than the modulus of elasticity of the arm portion 337. Through these, the elasticity of the top leaf spring 41B is determined by the arm portion 337.

Note that preferably the arm portion 337, the outer peripheral portion 338, the connecting portion 339, and the joining portion 340 are positioned within a single plane. Moreover, in order to avoid concentration of stresses, the inner corner portions and the outer corner portions of the top leaf spring 41B may be formed rounded.

The attachment of the top leaf spring 41B to the corner portion 38B and the joining of the top leaf spring 41B and the suspension wire 42B will be explained in reference to FIG. 20 through FIG. 22.

As depicted in FIG. 20, in a state wherein two protruding portions 313 of the corner portion 38B are inserted into respective through holes 331 and 332 of the top leaf spring 41B, the top leaf spring 41B is provided at a prescribed position of the supporting portion 37B. The top leaf spring 41B is secured to the supporting portion 37B by an adhesive agent.

In this case, the edge portions 335 and 336 of the top leaf spring 41B each rise away from the frame 31 at positions corresponding to the edges of the sidewall 311. Moreover, the opening portion 343 of the top leaf spring 41B is positioned at a position corresponding to the opening portion 312 of the frame 31. Consequently, in the top leaf spring 41B that is provided on the frame 31, the angled edge portion 333 functions as a leaf spring that is connected to the supporting portion 37B of the frame 31.

In the suspension wire 42B, one end portion is soldered to the top leaf spring 41B through solder 321 in a state wherein it is inserted into the through hole 341 of the top leaf spring 41B. Through this, the suspension wire 42B and the top leaf spring 41B are joined. The solder 321 is provided on the circular surface that is positioned on the front side of the joining portion 340. Consequently, the top leaf spring 41B is a leaf spring that is provided with a joining material (solder 321) for joining that which is to be joined (the suspension wire 42B) to the surface of the joining portion 340.

Note that the other end portion of the suspension wire 42B is soldered to the lead frame 25B of the base portion 10.

The solder 321 is formed through heating, using a soldering iron, an oven, or the like, a wire solder, a cream solder, or the like. The solder 321 preferably is a solder that includes a flux 361. Moreover, the solder 321 may be a solder that uses a flux in soldering.

As depicted in FIG. 21, the joining portion 340 that is provided with the solder 321 is joined to the arm portion 337 through the connecting portion 339 and the outer peripheral portion 338, and thus, in soldering, the flux 361 that is included in the solder 321 is prevented from spreading to the arm portion 337. This prevents the modulus of elasticity of the arm portion 337, which controls the elasticity of the top leaf spring 41B, from being changed by the flux 361. Note that, as illustrated in FIG. 21, preferably the position wherein the connecting portion 339 joins to the outer peripheral portion 338 is the furthest position from the position of the junction of the arm portion 337 to the outer peripheral portion 338, so as to cause the region over which the flux 361 spreads to be wider.

Here, as a reference example, the spread of the flux 361 in a leaf spring 350 that has no outer peripheral portion 338 or connecting portion 339, will be explained. Note that for ease in understanding, the structure of the leaf spring 350 is the same as the structure of the top leaf spring 41B, except for the structures that are explained using reference symbols that are different from those of the top leaf spring 41B.

As illustrated in FIG. 22, in the leaf spring 350, the arm portion 351 that corresponds to the arm portion 337 of the top leaf spring 41B extends in the direction facing the angled edge portion 333 from the apex portion 334. A circular joining portion 352 having a through hole in the center portion thereof is formed on the tip end of the arm portion 351. Note that in FIG. 21 and FIG. 22, the solder 321 is omitted, for ease in understanding. When the suspension wire 42B and the joining portion 352 of the leaf spring 350 have been soldered together, the joining portion 352 and the arm portion 351 are joined directly, and thus the flux 361 easily spreads from the joining portion 352, which has a wide area, to the arm portion 351, which has a narrow width.

Moreover, the flux 361 spreads in the arm portion 351, which tends to produce variability depending on the condition of the soldering.

In the reference example, the flux 361 spreads to the arm portion 351, changing the modulus of elasticity of the arm portion 351. Moreover, due to variability in the spread of the flux 361, there is variability in the modulus of elasticity of the arm portions 351. Consequently, it is difficult to prevent camera shaking with high accuracy in the shake correcting mechanism provided with the leaf spring 350.

As described above, in the top leaf spring 41B, the joining portion 340 is joined to the arm portion 337 through the connecting portion 339 and the outer peripheral portion 338, and thus preventing, in the soldering, the spreading of the flux 361 to the arm portion 337. Through this, a top leaf spring 41B is achieved that prevents the change in the modulus of elasticity of the arm portion 337, thereby preventing, with high accuracy, camera shaking in the lens driving device 100.

Note that the top leaf spring 41B prevents spreading of the solder 321 to the arm portion 337 in the same manner as for the flux 361.

Moreover, the top leaf spring 41B prevents the spread of the flux 361 and the solder 321 to the arm portion 337, without requiring a three-dimensional structure. Furthermore, the top leaf spring 41B can be manufactured from a single plate-shaped member. As a result, the top leaf spring 41B is manufactured easily and at a low cost.

In the present invention, the joining material for joining the top leaf spring 41B and the suspension wire 42B is not limited to being solder 321. For example, instead of the solder 321, the top leaf spring 41B and the suspension wire 42B may be joined through a conductive adhesive agent such as a silver paste, or the like, provided at the joining portion 340. The top leaf spring 41B prevents the conductive adhesive agent or the solvent for the conductive adhesive agent from spreading to the arm portion 337, in the same manner as for the flux 361.

Moreover, if no electric power is, or the like, is to be supplied through the suspension wire 42B, the top leaf spring 41B and the suspension wire 42B may be joined through a thermally curable adhesive agent or optically curable adhesive agent, provided in the joining portion 340.

In the present embodiment, the joining portion 340 is a circle, but it may instead be an ellipse, a polygon, or the like. Moreover, the outer peripheral portion 338 is not limited to being a circular ring, but it need only be annular.

The shapes and dimensions of the various portions of the top leaf spring 41B may be varied. The top leaf spring 41B may have a plurality of connecting portions 339 and arm portions 337.

Some or all of the portions in the eighth embodiment may be described also as in the addenda below:

A leaf spring, comprising:

a connecting portion provided with a joining material for connecting a connecting subject;

a linking portion protruding from an outer edge of the connecting portion;

an outer peripheral portion for surrounding the connecting portion and the linking portion, connected to one end of the linking portion; and an arm portion, connected to the outer peripheral portion on one end, having a prescribed modulus of elasticity.

A leaf spring as set forth in Supplementary Note 1, wherein:

the position, in the circumferential direction of the outer peripheral portion, wherein the connecting portion is joined to the outer peripheral portion, is the position that is furthest from the position to which the arm portion is joined to the outer peripheral portion.

A leaf spring as set forth in Supplementary Note 1 or 2, wherein:

the modulus of elasticity of the connecting portion is greater than the prescribed modulus of elasticity of the arm portion.

A leaf spring as set forth in any one of Supplementary Note 1 through 3, wherein: the through hole for insertion of the connecting subject is at the connecting portion.

A lens driving device comprising:

a leaf spring as set forth in any one of Supplementary Note 1 through 4;

a suspension wire that is connected to the connecting portion of the leaf spring;

a lens retaining portion for holding the lens, supported on the leaf spring and the suspension wire; and a driving portion for driving the lens retaining portion in a direction perpendicular to the optical axial direction of the lens.

A lens driving device as set forth in Supplementary Note 5, comprising:

a frame for enclosing the lens retaining portion, wherein:

the lens retaining portion is supported through the frame on the leaf spring and the suspension wire.

An imaging device, comprising:

a lens driving device set forth in Supplementary Note 5 or 6.

An electronic device, comprising:

a lens driving device set forth in Supplementary Note 5 or 6.

In the lens driving device 100, the OIS magnets 32A and 32B, the AF magnet 35A, and the AF position detecting portion 36 are provided on the frame 31 of the OIS frame portion 30. Moreover, the AF coil 62 and the AF position detecting magnet 65 are provided on the cylindrical member 61 of the lens retaining portion 60. That is, the OIS magnets 32A and 32B, the AF magnet 35A, and the AF position detecting magnet 65 are disposed divided onto the lens retaining portion 60 and the OIS frame portion 30, for which the relative positioning in the Z axial direction will change. Consequently, in the lens driving device 100, the position of the lens retaining portion 60 in the Z axial direction cannot be controlled with high accuracy through the attractive and repulsive forces between the AF position detecting magnet 65 and the OIS magnet 32A or 32B, or the AF magnet 35A.

In the present embodiment, a lens driving device 400 will be explained wherein no attractive or repulsive force will be produced through magnets between the OIS frame portion 430 and the lens retaining portion 460.

Specific structures in the lens driving device 400 according to the present embodiment will be explained in reference to FIG. 23 through FIG. 25.

The lens driving device 400, as illustrated in FIG. 23, is structured from a base portion 410, an OIS frame portion 430, a lens retaining portion 460, a lens supporting portion 470, and a cover portion 480.

The base portion 410 is structured from a base 411, OIS coils 422A and 422B, OIS position detecting portions 423A and 423B, and four lead frames (not shown).

The base 411 is formed in a flat rectangular plate shape from a resin, such as a thermoplastic resin, or the like. The base 411 has a circular opening portion 415 in the center portion thereof. The light from the imaging subject that has passed through the lenses of the lens barrel passes through the opening portion 415 to arrive at an imaging element (not shown). Moreover, holes 425A, 425B, 425C, and 425D, for securing, respectively, suspension wires 472A, 472B, 472C, and 472D are provided on the base 411.

A cover portion 480 is attached to the base 411.

The respective OIS coils 422A and 422B are installed respectively in the supporting portions 420A and 420B. The supporting portions 420A and 420B are formed on adjacent corner portions of the base 411. The respective OIS position detecting portions 423A and 423B are installed respectively in the supporting portions 421A and 421B. The supporting portions 421A and 421B are formed on the corner portions that are opposite from the corner portions whereon the supporting portions 420A and 420B are formed. Here the corner portion of the base 411 refers to a region in the vicinity of a corner that is between two edges that form a corner of the frame 431. The shape of the corner of the base 411 is arbitrary. For example, the corner of the base 411 is not limited to being a right angle, but rather may be formed with curvature.

The OIS coil 422A generates a magnetic field for moving the OIS frame portion 430 in the Y axial direction. The OIS coil 422B generates a magnetic field for moving the OIS frame portion 430 in the X axial direction. The OIS coils 422A and 422B respectively face the OIS magnets 432A and 432B of the OIS frame portion 430. The OIS coil 422A and the OIS magnet 432A structure an OIS driving portion for driving the OIS frame portion 430 in the Y axial direction. The OIS coil 422B and the OIS magnet 432B structure an OIS driving portion for driving the OIS frame portion 430 in the X axial direction.

In addition, the OIS position detecting portions 423A and 423B face the respective OIS magnets 434A and 434B of the OIS frame portion 430. The OIS position detecting portion 423A detects the position of the OIS magnet 434A, in the Y axial direction, relative to the base portion 410. The OIS position detecting portion 423B detects the position of the OIS magnet 434B, in the X axial direction, relative to the base portion 410. Through this, the OIS position detecting portions 423A and 423B are able to detect the position of the OIS frame portion 430, in the X axial direction and the Y axial direction, relative to the base portion 410.

One end portion each of the respective suspension wires 472A, 472B, 472C, and 472D are connected to respective lead frames. Each of the lead frames is connected to a controlling portion (not shown). The electric power or signals that are outputted to the AF position detecting portion 469 from the controlling portion are inputted into the AF position detecting portion 469 of the lens retaining portion 460 through the lead frames, the suspension wires 472A, 472B, 472C, and 472D, and the top leaf springs 471A, 471B, 471C, and 471D.

The OIS frame portion 430 holds a lens retaining portion 460.

The OIS frame portion 430 rotates in the X axial direction and the Y axial direction relative to the base portion 410. The OIS frame portion 430 is supported, by the suspension wires 472A, 472B, 472C, and 472D so as to enable rotation in the X axial direction and the Y axial direction.

The OIS frame portion 430 is structured from a frame 431 that is a rectangular frame, OIS magnets 432A, 432B, 434A, and 434B that are provided on the frame 431, and an AF position detecting magnet 435A.

In the frame 431, the lens retaining portion 460 is contained within an opening portion 431A.

OIS magnets 432A, 432B, 434A, and 434B are provided respectively at respective positioning portions 433A, 433B, 439A, and 439B. The respective positioning portions 433A, 433B, 439A, and 439B are formed at corner portions of the frame 431. The OIS frame portion 430 is disposed so that the OIS magnets 432A, 432B, 434A, and 434B respectively will face the OIS coils 422A and 422B and the OIS position detecting portions 423A and 423B of the base portion 410.

The AF position detecting magnet 435A is provided on the supporting portion 435B that is formed on an edge of the frame 431.

The lens retaining portion 460 moves in the Z axial direction to adjust the focal point.

The lens retaining portion 460 is contained in the opening portion 431A of the frame 431.

The lens retaining portion 460 is structured from a cylindrical member 461, having an The lens barrel is contained within the cylindrical shape of the cylindrical member 461.

The lens barrel is attached to an attaching portion 474 that is provided on the inner peripheral surface of the cylindrical member 461. The lens barrel, which has lenses, is held in the cylindrical member 461 thereby.

Note that the cylindrical member 461 may hold one or more lenses directly, rather than holding a lens barrel.

The AF coil 462 is a coil that is wound on a side face of the cylindrical member 461. When an electric current is supplied to the AF coil 462, the magnetic field that is produced in the AF coil 462 interacts with the magnetic fields of the OIS magnets 432A, 432B, 434A, and 434B. Through this, a force acts in the Z axial direction on the AF coil 462, moving the lens retaining portion 460 in the Z axial direction relative to the OIS frame portion 430.

The AF position detecting portion 469 is provided on an edge of the lens retaining portion 460. The AF position detecting portion 469 detects the position, in the Z axial direction, of the AF position detecting magnet 435A relative to the base portion 410. Through this, the AF position detecting portion 469 faces the base portion 410 and is able to detect the position, in the Z axial direction, of the lens retaining portion 460.

The lens supporting portion 470 is structured from top leaf springs 471A, 471B, 471C, and 471D, suspension wires 472A, 472B, 472C, and 472D, and a bottom leaf spring 473. The suspension wires 472A, 472B, 472C, and 472D are formed from metal that is elastic and electrically conductive.

One end of each of the suspension wires 472A, 472B, 472C, and 472D is connected to a respective top leaf spring 471A, 471B, 471C, and 471D. Moreover, the other end portions of the suspension wires 472A, 472B, 472C, and 472D are connected respectively to respective lead frames.

The top leaf springs 471A, 471B, 471C, and 471D are formed from metal that is elastic and electrically conductive. Each of the top leaf springs 471A, 471B, 471C, and 471D has a plate portion P of a right triangular frame shape, an elastic portion Q that is formed in a S shape, and a reed portion R that is formed in an arc shape, as illustrated in FIG. 24. The top leaf springs 471A, 471B, 471C, and 471D are each attached to the end faces on the front side of the frame 431. Moreover, the top leaf springs 471A, 471B, 471C, and 471D are connected electrically to the AF position detecting portion 469.

The bottom leaf spring 473 is formed from an elastic metal. The bottom leaf spring 473 is attached to an end face on the backside of the frame 431.

The top leaf springs 471A, 471B, 471C, in 471D, and the bottom leaf spring 473 hold the lens retaining portion 460 through holding, from the front and the rear, the lens retaining portion 460 that is enclosed in the frame 431. That is, the lens retaining portion 460 is held, so as to enable movement in the Z axial direction, on the top leaf springs 471A, 471B, 471C, and 471D and the bottom leaf spring 473.

Through the structure set forth above, the lens supporting portion 470 supports the OIS frame portion 430 so as to enable rotation. Moreover, the lens supporting portion 470 holds the lens retaining portion 460 so as to enable movement in the Z axial direction. For the cover portion 480, the bottom plate is a rectangular cover. The cover portion 480 covers the OIS frame portion 430, the lens retaining portion 460, and the lens supporting portion 470. The cover portion 480 is attached to the base 411 of the base portion 410.

The cover portion 480 has an opening portion 482 in the bottom plate. The light from the imaging subject passes through the opening portion 482 to be incident into the lens barrel, to arrive at the imaging element.

As described above, the OIS magnets 432A, 432B, 434A, and 434B, and the AF position detecting magnet 435A are disposed on the OIS frame portion 430, and thus no magnetic attractive force or repulsive force is produced between the OIS frame portion 430 and the lens retaining portion 460. This enables the lens driving device 400 to control, with high accuracy, the position of the lens retaining portion 460 in the Z axial direction.

The supply of electric power and signals to the AF coil 462 and the AF position detecting portion 469 will be explained next in reference to FIG. 25.

In the present embodiment, a driver IC for driving the AF coil 462 is provided in the AF position detecting portion 469.

Specifically, the AF position detecting portion 469 is provided with a controller 469A, a magnetic sensor 469B, an AF controlling portion 469C, and a driver circuit 469D, on an FPC (a flexible printed circuit).

Electric power outputted from a controlling portion is inputted into the controller 469A through the top leaf springs 471A and 471B. The controller 469A adjusts the magnitude of the electric current supplied to the magnetic sensor 469B.

Moreover, control signals from the controlling portion are inputted through the top leaf springs 471C and 471D into the controller 469A. The controller 469A outputs, to the AF controlling portion 469C, the control signals from the controlling portion. The control signals from the controlling portion are, for example, signals indicating a position for the lens retaining portion 460 in the Z axial direction at which the contrast of the captured image will be maximized. That is, the control signals from the controlling portion are control signals expressing the target position for the AF controlling portion 469C to move the lens retaining portion 460.

The magnetic sensor 469B is, for example, a Hall element. The magnetic sensor for 469B detects a voltage that is produced, in the current that is supplied from the controller 469A, by the magnetic field that is produced by the AF position detecting magnet 435A. The magnetic sensor 469B outputs, to the AF controlling portion 469C, the value of the voltage that is detected.

The AF controlling portion 469C finds the position of the lens retaining portion 460 in the Z axial direction, relative to the base portion 10 from the value of the voltage that is outputted by the magnetic sensor 469B. Moreover, the AF controlling portion 469C receives a control signal that expresses the target position for the movement of the lens retaining portion 460, outputted by the controller 469A.

The AF controlling portion 469C outputs, to the driver circuit 469D, a control signal that expresses the amount of movement of the lens retaining portion 460, based on the position found for the lens retaining portion 460 and the control signal that expresses the target position.

The electric power that is outputted by the controlling portion is inputted through the top leaf springs 471A and 471B into the driver circuit 469D. Moreover, the driver circuit 469D receives control signals that indicate the amounts of movement of the lens retaining portion 460, outputted from the AF controlling portion 469C. The driver circuit 469D supplies, to the AF coil 462, an electric current based on the control signal that expresses the amount of movement of the lens retaining portion 460.

In the present embodiment, the AF position detecting portion 469 is provided with a driver circuit 469D for driving the AF coil 462, and thus the lens driving device 400 can supply electric power and signals to the AF position detecting portion 469 through the for top leaf springs 471A, 471B, 471C, and 471D, to control the position of the lens retaining portion 460 in the Z axial direction with high accuracy.

Note that when a driver IC for driving the AF coil 462 is provided on the outside of the lens driving device 400 (for example, in a controlling portion), at least two connections are required for the supplying electric current from the external driver IC to the AF coil 462, in addition to the four top leaf springs 471A, 471B, 471C, and 471D. In this case, the lens retaining portion 460 that is equipped with the AF coil 462 moves in the Z axial direction relative to the OIS frame portion 430, and thus it is difficult to provide two more connections for supplying electric current from the external driver IC to the AF coil 462.

That is, in the present embodiment, the AF detecting portion 469 is equipped with a driver circuit 469D for driving the AF coil 462, making it possible to reduce the number of connections to the lens retaining portion 60.

The shapes of the plate portions P of the top leaf springs 471A, 471B, 471C, and 471D are not limited to frame shapes. The plate portions P may instead be formed so as to support the suspension wires 472A, 472B, 472C, and 472D through a cantilever structure. Moreover, the corners of the plate portion P may also be rounded. The elastic portion Q should be able to connect the plate portion P and the reed portion R elastically. The shape of the elastic portion Q is arbitrary. For example, the shape of the elastic portion Q may be a wave shape. The shape of the reed portion R is also arbitrary.

Moreover, the top leaf springs 471A, 471B, 471C, and 471D may relay either electric power or signals from the controlling portion.

The lens driving device 400 need not necessarily be provided with a camera shake preventing function. In this case, the lens driving device 400 is not provided with the OIS coils 422A and 422B, the OIS position detecting portions 423A and 423B, and the suspension wires 472A, 472B, 472C, and 472D. Moreover, the electric power and signals outputted by the controlling portion are supplied to the AF position detecting portion 469 through the lead frame of the base portion 410, a new lead frame that is provided on the OIS frame portion 430, and the top leaf springs 471A, 471B, 471C, and 471D. The lead frame that is provided on the OIS frame portion 430 and the lead frame of the base portion 410 are connected electrically.

Furthermore, if the AF position detecting portion 469 protrudes from the cover portion 480, a recessed portion may be provided, in a shutter that is disposed on the front side of the lens driving device 400, for accommodating the part of the AF position detecting portion 469 that protrudes from the cover portion 480. This makes it possible to reduce the thickness of a unit that comprises a shutter and the lens driving device 400.

A portion or all of the above example can be described also as in the supplementary notes below, but there is no limitation to that which is below.

A lens driving device comprising:

a lens retaining portion for holding a lens group;

a position detecting portion for detecting a position of the lens retaining portion;

a driving portion for driving the lens retaining portion based on a position of the lens retaining portion, detected by the position detecting portion; and a frame for enclosing the lens retaining portion, wherein:

the driving portion has a first coil that is provided on the lens retaining portion and a first magnet that is disposed on the frame, facing the coil; and the position detecting portion has a position detecting sensor that is provided on the lens retaining portion and a second magnet that is disposed on the frame, facing the position detecting sensor.

A lens driving device as set forth in Supplementary Note 1, comprising:

biasing means, that are electrically conductive and that are connected electrically to an external device, for biasing the lens retaining portion, wherein:

the position detecting sensor and the first coil are supplied an electric current from the external device through the biasing means.

A lens driving device as set forth in Supplementary Note 2, wherein:

the detecting portion comprises a driver circuit that supplies an electric current to the first coil;

the driver circuit receives a supply of electric power from the external device through the biasing means; and the first coil receives a supply of an electric current from the driver circuit.

An imaging device, comprising:

a lens driving device as set forth in any one of Supplementary Notes 1 through 3.

An electronic device, comprising:

a lens driving device as set forth in any one of Supplementary Notes 1 through 3. [0168] In the present embodiment, the lead frames 25A, 25B, 25C, and 25D, and the top leaf springs 41A, 41B, 41C, and 41D will be explained using the lead frame 25B and the top leaf spring 41B as examples, referencing FIG. 26 through FIG. 32. Moreover, the joining of the lead frames 25A, 25B, 25C, and 25D, the suspension wires 42A, 42B, 42C, and 42D, and the top leaf springs 41A, 41B, 41C, and 41D will be explained.

In the lens driving device 100, the lead frame 25B and the suspension wire 42B, as illustrated in FIG. 26, are joined through soldering. Moreover, the top leaf spring 41B and the suspension wire 42B are also joined through soldering. Furthermore, the top leaf spring 41B and the lead frame 25B oppose each other, with the suspension wire 42B held therebetween. The lead frame 25B supports the top leaf spring 41B and the suspension wire 42B.

The lead frame 25B is formed from copper alloy, and the surface thereof is plated. The surface of the face 522 of the lead frame 25B that faces the top leaf spring 41B is plated with nickel. Moreover, the surface of the face 523, which is opposite from the face 522, is plated with gold. Consequently, the solder wettability of the face 523 is higher than the solder wettability of the face 522.

The lead frame 25B has a through hole 514, as depicted in FIG. 27. The lead frame 25B is soldered to the suspension wire 42B, through solder 511, in a state wherein one end of the suspension wire 42B is inserted into a through hole 514. In soldering, the solder 511 is provided on the face 523, as illustrated in FIGS. 28 and 29.

The top leaf spring 41B is formed from copper alloy, and the surface thereof is plated. The surface of the face 521 that faces the lead frame 25B of the top leaf spring 41B is plated with nickel. Moreover, the surface of the face 521, which is opposite from the face 520, is plated with gold. Consequently, the solder wettability of the face 520 is higher than the solder wettability of the face 521.

The top leaf spring 41B, as depicted in FIG. 27, has a through hole 341 in the joining portion 340. The top leaf spring 41B is soldered to the suspension wire 42B, through solder 321, in a state wherein the other end of the suspension wire 42B is inserted into a through hole 341. In soldering, the solder 321 is provided on the face 520 in the joining portion 340, as illustrated in FIGS. 28 and 31.

The suspension wire 42B is formed from metal that is elastic and electrically conductive. In the present embodiment, the solder wettability of the face 523 of the lead frame 25B is higher than the solder wettability of the face 522 of the lead frame 25B, making it possible to suppress the spread of the solder 511, provided on the face 523, through the through hole 514, to the face 522 that faces the top leaf spring 41B. Consequently, the length of the part of the suspension wire 42B that undergoes elastic deformation between the lead frame 25B and the top leaf spring 41B is constant. As a result, the lens driving device 100 can prevent camera shake with high accuracy.

For example, as in the reference example illustrated in FIG. 30, in a lead frame 25B' having a face 522 that faces the top leaf spring 41B and a face 523' on the opposite side from the face 522', that both have the same solder wettability, the solder 511' that is provided on the face 523' will spread through the through hole 514' to the face 522'. The solder 511 that has spread to the face 522' bulges out along the suspension wire 42B', thus changing the length of the part of the suspension wire 42B' that undergoes elastic deformation. Moreover, the spread of the solder 511' on the face 522' tends to have variability depending on the soldering conditions, and thus the length of the part that undergoes elastic deformation will be different from suspension wire to suspension wire. Consequently, in a lens driving device that comprises a lead frame 25B', it is difficult to prevent camera shake with high accuracy.

In the top leaf spring 41B as well, the solder wettability of the face 520 is higher than the solder wettability of the face 521, making it possible to suppress the spread of the solder 321, provided on the face 520, through the through hole 341, to the face 521 that faces the lead frame 25B. Consequently, the lengths of the parts of the suspension wires 42B that undergo elastic deformation are caused to be uniform. As a result, the lens driving device 100 can prevent camera shake with high accuracy.

For example, as in the reference example illustrated in FIG. 32, in top leaf spring 41B' (joining portion 340') having a face 521' that faces the lead frame 25B and a face 520' on the opposite side from the face 521', that both have the same solder wettability, the solder 321' that is provided on the face 520' will spread to the face 521'. Consequently, as with lens driving device equipped with the lead frame 25B' in the reference example, in the lens driving device comprising the top leaf spring 41B', it is difficult to prevent shaking with high accuracy.

The forms of the faces 522 and 523 of the lead frame 25B, and the solder wettability, will be explained next.

The surface of the lead frame 25B is plated with nickel and plated with gold sequentially. The gold plating layer of the face 522 is removed through exposure of a laser beam onto the gold plating layer that is formed on the face 522. Through this, a nickel plating layer is formed on the surface of the face 522, and a gold plating layer is formed on the surface of the face 523 of the lead frame 25B. Note that the plating processes for the lead frame 25B may be performed separately for the face 522 and the face 523.

The solder wettability of the face 522 and the face 523 of the lead frame 25B may be measured through, for example, a method that tests a wetting width. The wetting width test method is standardized by in IEC (International Electric Standardization Committee), in JIS (JIS Z 3198-3), and in EIAJ (Electronic Industries Association of Japan). Note that the solder wettability may instead be measured through the menisograph test method, the globule method, the one-and dip method, the rotary dip method, or the like. The meniscograph test method is standardized by the IEC, JIS, and EIAJ.

In the top leaf spring 41B, as with the lead frame 25B, a gold plating layer is formed on the face 520 and a nickel plating layer is formed on the face 521. Moreover, the solder wettability of the face 520 and the face 521 of the top leaf spring 41B, may be measured through the wetting width test method, or the like, in the same manner as for the face 522 and the face 523 of the lead frame 25B.

As described above, in the lead frame 25B, the solder wettability of the face 523 on the side that is opposite from the face 522 is higher than the solder wettability of the face 522 that faces the top leaf spring 41B, thus making possible to prevent the solder 511 that is provided on the face 523 from spreading to the face 522.

Through this, the length of the part of the suspension wire 42B that undergoes elastic deformation between the lead frame 25B and the top leaf spring 41B is made constant. As a result, the lengths of the parts of the suspension wires 42A, 42B, 42C, and 42D that undergoes elastic deformation will be uniform, making it possible to prevent, with high accuracy, camera shaking of the lens driving device 100.

Moreover, in top leaf spring 41B as well, the solder wettability of the face 520 on the side that is opposite from the face 521 is higher than the solder wettability of the face 521 that faces the lead frame 25B, thus making possible to prevent the solder 321 that is provided on the face 520 from spreading to the face 521.

Through this, in the top leaf spring 41B as well, the length of the part of the suspension wire 42B that undergoes elastic deformation is made constant, in the same way as with the lead frame 25B. As a result, the lengths of the parts of the suspension wires 42A, 42B, 42C, and 42D that undergoes elastic deformation will be uniform, making it possible to prevent, with high accuracy, camera shaking of the lens driving device 100.

Note that in the lead frame 25B and/or top leaf spring 41B, the solder wettability of the face on the opposite side of the face that faces the other should be higher than the solder wettability of the face that faces the other.

In the present embodiment, the explanation was for a lead frame 25B, but 25A, 25C, and 25D have surfaces that are the same as those of the lead frame 25B. Moreover, the top leaf springs 41A, 41C, and 41D have surfaces that are the same as the surfaces of the top leaf spring 41B.

In the present embodiment, the surfaces of the faces 520 and 523 that have high solder wettability are gold plating layers, but instead the surfaces of the faces 520 and 523 may have gold, silver, tin, solder, or the like, which have high solder wettability, as the main component. Moreover, while the surfaces of the face 521 and face 522 that have low solder wettability were nickel plated layers, the surfaces of the face 521 and face 522 may instead be layers that have nickel, zinc, or the like, which have low solder wettability, as the main component.

Moreover, the solder wettability of the faces 520, 521, 522, 523 may be modified through an oxidizing process, a surface roughening process, or the like, or rather than through plating.

The joining material for joining the lead frame 25B, the suspension wire 42B, and the top leaf spring 41B is not limited to only solder. For example, the top leaf spring 41B and the suspension wire 42B may be joined through a conductive adhesive agent such as a silver paste, or the like. Moreover, if no electric power is, or the like, is to be supplied through the suspension wire 42B, the top leaf spring 41B and the suspension wire 42B may be joined through a thermally curable adhesive agent or optically curable adhesive agent. In this case, the wettability of the faces 520 and 523 in respect to the joining material is higher than the wettability of the faces 521 and 522 in respect to the joining material.

Some or all of the portions in the above may be described also as in the addenda below:

A lens driving device comprising:

a leaf spring;

a suspension wire wherein one end portion is connected to the leaf spring;

a supporting plate to which the other end portion of the suspension wire is connected; a lens retaining portion for holding the lens, supported on the leaf spring and the suspension wire; and a driving portion for driving the lens retaining portion in a direction perpendicular to the optical axial direction of the lens, wherein:

the leaf spring and/or the supporting plate is connected to the suspension wire through a joining material that is provided on the primary face; and the wettability of the primary face, in respect to the joining material, is higher than the wettability of the opposite side of the primary face, in respect to the joining material.

A lens driving device as set forth in Supplementary Note 1, wherein:

the leaf spring and/or the supporting plate has a through hole;

the suspension wire is inserted through the through hole; and the primary face on which the joining material is provided is the face on the opposite side from the face wherein the leaf spring and the supporting plate face each other.

A lens driving device as set forth in Supplementary Note 1 or 2, wherein:

the joining material is solder.

A lens driving device as set forth in any one of Supplementary Note 1 through 3, comprising:

a frame for enclosing the lens retaining portion, wherein:

the lens retaining portion is supported through the frame on the leaf spring and the suspension wire.

A lens driving device as set forth in any one of Supplementary Note 1 through 4, wherein:

the surface of the primary face of the joining material has, as a main component, gold, silver, tin, or copper; and the surface of the face on the side that is opposite from the primary face has, as a main component, nickel or zinc.

A lens driving device as set forth in any one of Supplementary Note 1 through 5, wherein:

the supporting plate and/or the leaf spring has at least one layer that is gold plating, silver plating, tin plating, solder plating, copper plating, zinc plating, and/or nickel plating.

A lens driving device as set forth in any one of Supplementary Note 1 through 6, wherein:

the leaf spring, the suspension wire, and the supporting plate are electrically conductive.

An imaging device, comprising:

a lens driving device as set forth in any one of Supplementary Notes 1 through 7.

An electronic device, comprising:

a lens driving device as set forth in any one of Supplementary Notes 1 through 7.

In Embodiment 10, a suspension wire 42B, for example, was inserted through a through hole 514 of the lead frame 25B and a through hole 341 of the top leaf spring 41B.

In the present embodiment, a method for positioning the base portion 10 and the OIS frame portion 30 will be explained referencing FIG. 33A through FIG. 34. Moreover, a method for inserting the suspension wires 42A, 42B, 42C, and 42D into the through holes 514 of the lead frames 25A, 25B, 25C, and 25D and into the through holes 341 of the top leaf springs 41A, 41B, 41C, and 41D will be explained in reference to FIG. 35A through FIG. 35E.

An alignment method for aligning the positions of the base portion 10 and the OIS frame portion 30 will be explained first.

In aligning the base portion 10 and the OIS frame portion 30, the positions of the through hole 514 of the lead frame 25B of the base portion 10 and of the through hole 341 of the top leaf spring 41B of the OIS frame portion 30 are aligned with the positions of the through hole 514 of the lead frame 25D of the base portion 10 and of the through hole 341 of the top leaf spring 41D of the OIS frame portion 30.

Note that in the explanation below, the crosswise direction of the drawing is defined as the X axis, the direction from the front side of the drawing toward the back side of the drawing is defined as the Y axis, and the vertical direction in the drawing is defined as the Z axis. Moreover, for ease in understanding, in FIG. 33A through FIG. 33G and FIG. 35A through FIG. 35E, the base portion 10 and the OIS frame portion 30 are depicted schematically.

First the base portion 10 and the OIS frame portion 30 that holds the lens retaining portion 60 (termed the "OIS frame portion 30," below) are prepared. In this case, the base portion 10 and the OIS frame portion 30 are placed on a working surface such as a workbench 505, as shown in FIG. 33A.

Note that the working surface of the workbench 505 is parallel to the XY plane. Following this, the OIS frame portion 30 is picked up by a robot 530, as depicted in FIG. 33B. In this case, the robot 530 holds the OIS frame portion 30 toward the top of the OIS frame portion 30.

Next a second camera 536 that is provided on the workbench 505 is moved by a robot 530 over the OIS frame portion 30. Given this, as depicted in FIG. 33C, the OIS frame portion 30 is imaged from below by the second camera 536.

Moreover, as depicted in FIG. 33C, the base portion 10 is imaged from above by a first camera 535 that is provided above the workbench 505. Note that the coordinates of the first camera 535 and the second camera 536 in the workbench 505 are established in advance.

Note that a line segment S1 that connects from the center of the through hole 514 of the lead frame 25B and the center of the through hole 514 of the frame 25D is calculated from the image of the base portion 10 that has the captured. Here finding the line segment refers to finding the coordinates of both ends of the line segment. The length L1 and direction of the line segment S1 are found thereby.

Given this, as depicted in FIG. 33D, the line segment S1 is set virtually, in a state wherein the length L1 and the direction thereof are maintained, at a distance H1 vertically above the bottom face of the base 11. Moreover, the coordinates of both ends of the virtual line segment S1 are calculated. The relative positional relationship G1 between the through hole 514 of the lead frame 25B, the through hole 514 of the lead frame 25D, and the line segment S1 is obtained thereby.

Moreover, a line segment S2 that connects from the center of the through hole 341 of the top leaf spring 41B and the center of the through hole 341 of the top leaf spring 41D is calculated from the image of the OIS frame portion 30 that has the captured. As with the line segment S1, the length L2 and direction of the line segment S2 are found thereby. Given this, as depicted in FIG. 33D, the line segment S2 is set virtually, in a state wherein the length L2 and the direction thereof are maintained, at a distance H2 vertically below the top face of the frame 31. Moreover, the coordinates of both ends of the virtual line segment S2 are calculated. The relative positional relationship G2 between the through hole 341 of the top leaf spring 41B, the through hole 341 of the top leaf spring 41D, and the line segment S2 is obtained thereby.

Following this, as illustrated in FIG. 30 3E, the path of movement of the virtual line segment S2 and the direction and angle by which the virtual line segment S2 must be rotated, in order to superimpose this virtual line segment S2 onto the virtually line segment S1, while maintaining the positional relationship G1 in a state wherein the positional relationship G2 is maintained are calculated.

Here the "superimposition" of one line segment and another line segment means, for example, causing the position of the midpoint M1 of the virtual line segment S1 and the position of the midpoint M2 of the virtual line segment S2 to be coincident, and causing the direction of the virtual line segment S1 and the direction of the virtual line segment S2 to be coincident, as illustrated in FIG. 3, as illustrated in FIG. 33F.

Note that this "midpoint" includes the vicinity of a midpoint, in a range that does not produce positioning error.

Consequently, the path of movement of the virtual line segment S2 is calculated from the coordinates of the midpoint M2, which were calculated from the coordinates of both ends of the virtual line segment S2, and the coordinates of the midpoint M1, which were calculated from the coordinates of both ends of the virtual line segment S1. For example, directions of movement and distances of movement are calculated respectively for the X axial direction, the Y axial direction, and the Z axial direction, based on the coordinates of the midpoint M1 and the coordinates of the midpoint M2, in order to move the midpoint M2 to the coordinates of the midpoint M1.

The direction and angle for rotating the virtual line segment S2, centered on the midpoint M2, are calculated from the coordinates of both ends of the virtual line segment S1 and the coordinates of both ends of the virtual line segment S2. Note that the virtual line segment S1 and the virtual line segment S2 are positioned in a plane that is parallel to the XY plane, and the virtual line segment S2 will be rotated in a plane that is parallel to the XY plane.

The position of the midpoint M2 of the virtual line segment S2 is caused to be coincident with the position of the midpoint M1 of the virtual line segment S1 through movement of the OIS frame portion 30 by the robot 530, based on the path calculated for moving the virtual line segment S2. Moreover, the direction of the virtual line segment S2 is caused to be coincident with the direction of the virtual line segment S1 through rotation of the OIS frame portion 30, by the robot 530, based on the direction and angle of rotation of the virtual line segment S2, centered on the midpoint M2.

Finally the OIS frame portion 30 is placed on the base portion 10, with a spacer 538 interposed therebetween, by the robot 530, as depicted in FIG. 33G.

The positions of the base portion 10 and the OIS frame portion 30 are aligned through the steps described above. That is, the respective positions of the through holes 514 of the lead frames 25A, 25B, 25C, and 25D can be aligned to the respective positions of the through holes 341 of the top leaf springs 41A, 41B, 41C, and 41D.

In the alignment method for the base portion 10 and the OIS frame portion 30, the position of the midpoint M1 of the virtual line segment S1 and the position of the midpoint M2 of the virtual line segment S2 are coincident, and thus the tolerance in assembling the base portion 10 and the OIS frame portion 30, and the tolerance in manufacturing the components that structure the base portion 10 and the OIS frame portion 30, and the like, are distributed to both sides of the virtual line segments S1 and S2. This improves the accuracy of the alignment between the base portion 10 and the OIS frame portion 30. Moreover, this enables a reduction in the diameters of the through holes 341 and 514.

FIG. 34 is a flowchart showing the method for aligning the base portion 10 and the OIS frame portion 30.

In Step S1, a line segment S1 that connects two prescribed positions of an object to be aligned, and a line segment S2 that connects two corresponding positions are calculated. The two prescribed positions correspond to the position of the center of the through hole 514 in the lead frame 25B and the position of the center of the through hole 514 of the lead frame 25D. Moreover, the two corresponding positions correspond to the position of the center of the through hole 341 of the top leaf spring 41B and the position of the center of the through hole 341 of the top leaf spring 41D.

The direction of the line segment S1 and the position of the midpoint M1 of the line segment S1 are found in Step S2.

The direction of the line segment S2 and the position of the midpoint M2 of the line segment S2 are found in Step S3.

In Step S4, in a state wherein the relative positioning between the two objects is maintained, the path for bringing the position of the midpoint M2 of the line segment S2 into coincidence with the position of the midpoint M1 of the line segment S1 is calculated.

In Step S5, the direction and angle of rotation, centered on the midpoint M2 of the line segment S2, that will cause the direction of the line segment S2 to be coincident with the direction of the line segment S1 are calculated.

In Step S6, in a state wherein the relative positioning between the two objects is maintained, the two objects are rotated, centered on the midpoint M2, based on the direction and angle of rotation calculated for S2.

In Step S7, in a state wherein the relative positioning between the two objects is maintained, the two objects are moved based on the path that was calculated.

In Step S8, the two objects are disposed at the two prescribed positions.

The positions of the base portion 10 and the OIS frame portion 30 are aligned through the steps described above.

The method for inserting the suspension wires 42B and 42D into the through holes 514 of the lead frames 25B and 25D and into the through holes 341 of the top leaf springs 41B and 41D will be explained next. The suspension wire 42B is inserted into the through hole 514 of the lead frame 25B and the through hole 341 of the top leaf spring 41B. The suspension wire 42D is inserted into the through hole 514 of the lead frame 25D and the through hole 341 of the top leaf spring 41D.

Note that the suspension wires 42A and 42C are also inserted into the through holes 514 of the lead frames 25A and 25C and the through holes 341 of the top leaf spring 41A and 41C through the same method.

First the aligned base portion 10 and OIS frame portion 30, the suspension wire 42B, which is held in a jig 532B, and the suspension wire 42D, which is held in a jig 532D, are prepared. The aligned base portion 10 and OIS frame portion 30 are placed on the working surface of the workbench 505.

Moreover, the jig 532B and the jig 532D are held, by a robot 531, above the working surface of the workbench 505. In this case, the spacing between the suspension wire 42B and the suspension wire 42D are set to the design value.

Next, as illustrated in FIG. 35A, the aligned base portion 10 and OIS frame portion 30 are imaged from above by the first camera 535. The robot 531 that is holding the jig 532B and the jig 532D is imaged from below by the second camera 536.

Next, a line segment S3 that connects from the center of the through hole 341 of the top leaf spring 41B and the center of the through hole 341 of the top leaf spring 41D is calculated from the image of the base portion 10 and OIS frame portion 30 that has the captured. The length L3 and direction of the line segment S3 are found thereby. Given this, as depicted in FIG. 35B, the line segment S3 is set virtually, in a state wherein the length L3 and the direction thereof are maintained, at a distance H3 vertically above the top faces of the top leaf springs 41B and 41D of the OIS frame portion 30. Moreover, the coordinates of both ends of the virtual line segment S3 are calculated. The relative positional relationship G3 between the through hole 341 of the top leaf spring 41B, the through hole 341 of the top leaf spring 41D, and the line segment S3 is obtained thereby. The line segment S4 connecting the center of the tip end portion 540 of the suspension wire 42B and the center of the tip end portion 540 of the suspension wire 42D is calculated from the image captured by the robot 531. The length L4 and direction of the line segment S4 are found thereby.

Given this, as depicted in FIG. 35B, the line segment S4 is set virtually, in a state wherein the length L4 and the direction thereof are maintained, at a distance H4 vertically below the bottom faces of the jigs 532B and 532D. Moreover, the coordinates of both ends of the virtual line segment S4 are calculated. The relative positional relationship G4 between the through tip end portion 540 of the suspension wire 42B, the tip end portion 540 of the suspension wire 42D, and the line segment S4 is obtained thereby.

Next, in a state wherein the positional relationship G4 is maintained, the virtual line segment S4 is superimposed on the virtual line segment S3 that maintains the positional relationship G3.

That is, as illustrated in FIG. 35C, the jig 532B and the jig 532D are moved to cause the position of the midpoint M3 of the virtual line segment S3 to be coincident with the position of the midpoint M4 of the virtual line segment S4. In addition, the jig 532B and the jig 532D are rotated centered on the midpoint M4 to cause the direction of the virtual line segment S3 to be coincident with the direction of the virtual line segment S4. The method for moving and rotating the jig 532B and the jig 532D is the same as the method for moving and rotating the OIS frame portion 30 in aligning the base portion 10 and the OIS frame portion 30.

As illustrated in FIG. 35D, the positions of the through hole 514 of the lead frame 25B, the through hole 341 of the top leaf spring 41B, and the suspension wire 42B, and the positions of the through hole 514 of the lead frame 25D, the through hole 341 of the top leaf spring 41D, and the suspension wire 42D are aligned thereby.

Finally, the suspension wires 42B and 42D are released from the jigs 532B and 532D, as depicted in FIG. 35E, to insert the suspension wires 42B and 42D into the through holes 341 and through holes 514.

The suspension wire 42B is inserted into the through hole 514 of the lead frame 25B and the through hole 341 of the top leaf spring 41B, and the suspension wire 42D is inserted into the through hole 514 of the lead frame 25D and the through hole 341 of the top leaf spring 41D through the steps set forth above.

As described above, in the alignment method for the suspension wires 42B and 42D, the through holes 514 of the lead frames 25B and 25D, and the through holes 341 of the top leaf springs 41B and 41D, the position of the midpoint M3 of the virtual line segment S3 and the position of the midpoint M4 of the virtual line segment S4 are coincident, and thus the tolerance in assembly and the tolerance in manufacturing the components, and the like, are distributed to both sides of the virtual line segments S3 and S4. This improves the precision of the alignment.

Moreover, because the accuracy of the alignment is improved, the diameters of the through holes 341 and 514 into which the suspension wires 42B and 42D are inserted can be reduced. This improves the accuracy and reliability of the camera shake correction of the lens driving device 1000.

For example, in the prior art, the positions of the suspension wires 42B and 42D were aligned directly to the positions of the through holes 341 and the through holes 514, and in order to insert the suspension wires 42B and 42D simultaneously into the through holes 341 and the through holes 514, the diameters of the through holes 341 and 514 were more than five times as large as the diameters of the suspension wires 42B and 42D. Specifically, when the diameters of the suspension wires 42B and 42D were 0.05 mm, the diameters of the through holes 341 and 514 were larger than 0.25 mm.

In the present embodiment, the accuracy of the alignment is improved, enabling the diameters of the through holes 341 and 514 to be equal to or less than five times the diameters of the suspension wires 42B and 42D. Moreover, the diameters of the through holes 341 and 514 can be put to 1.3 times or less, or 1.1 times or less, the diameters of the suspension wires 42B and 42D.

Note that the cross-sectional shapes of the through holes 341 and 514 are not limited to being circles, but instead may be ellipses, polygons, or the like. In this case, the cross-sectional areas of the through holes 341 and 514 can be 25 times or less the cross-sectional area of the suspension wires 42B and 42D. Moreover, the cross-sectional areas of the through holes 341 and 514 may be nine times or less, or four times or less, the cross-sectional areas of the suspension wires 42B and 42D.

While, above, the two suspension wires 42B and 42D were each inserted into the respective corresponding through holes 341 and through holes 514 simultaneously, instead, three or more of the suspension wires 42A, 42B, 42C, and 42D may be inserted simultaneously into the respectively corresponding through holes 341 and through holes 514.

In the present embodiment, the positions of the base portion 10 and of the OIS frame portion 30 are aligned through aligning the through holes 514 of the lead frames 25A, 25B, and 25C, respectively, to the respective positions of the through holes 341 of the top leaf springs 41A, 41B, and 41C. Following this, the respective suspension wires 42A, 42B, and 42C are inserted into the respectively corresponding through holes 341 and through holes 514. In the present embodiment, the difference from Embodiment 11 is that the center positions of the polygon surfaces and the orientations of the polygon surfaces are caused to be coincident, instead of the positions of the midpoints of the line segments and the directions of the line segments.

Note that the suspension wire 42A is inserted into the through hole 514 of the lead frame 25A and into the through hole 341 of the top leaf spring 41A. The suspension wire 42B is inserted into the through hole 514 of the lead frame 25B and the through hole 341 of the top leaf spring 41B. The suspension wire 42C is inserted into the through hole 514 of the lead frame 25C and the through hole 341 of the top leaf spring 41C.

An aligning method for the positions of the base portion 10 and the OIS frame portion 30 will be explained first.

First the base portion 10 and the OIS frame portion 30 are imaged in the same way as in Embodiment 11.

Following this, a triangular surface D1 that connects the center of the through hole 514 of the lead frame 25A, the center of the through hole 514 of the lead frame 25B, and the center of the through hole 514 of the lead frame 25C is calculated from the image captured for the base portion 10, as illustrated in FIG. 36. Here the calculation of the triangular surface means calculating the respective coordinates of the corners of the triangular surface (that is, the centers of the through holes 514). The relative positional relationships and directions for the corners of the triangular surface D1 are calculated thereby.

Given this, the triangular surface D1 is set virtually in a state wherein the positional relationships and directions between the corners are maintained, at a prescribed vertical distance above the bottom face of the base 11 of the base portion 10. Additionally, the coordinates of each of the corners of the virtual triangular surface D1 are calculated. The relative positional relationships between the through hole 514 of the lead frame 25A, the through hole 514 of the lead frame 25B, the through hole 514 of the lead frame 25C, and the triangular surface D1 are obtained thereby.

Moreover, a triangular surface D2 that connects the center of the through hole 341 of the top leaf spring 41A, the center of the through hole 341 of the top leaf spring 41B, and the center of the through hole 341 of the top leaf spring 41C is calculated from the image captured for the OIS frame portion 30, as illustrated in FIG. 37. The relative positional relationships and directions for the corners of the triangular surface D2 are calculated thereby.

Given this, the triangular surface D2 is set virtually in a state wherein the relative positional relationships and directions between the corners are maintained, at a prescribed perpendicular distance below the top face of the frame 31 of the OIS frame portion 30. Additionally, the coordinates of each of the corners of the virtual triangular surface D2 are calculated. The relative positional relationships between the through hole 341 of the top leaf spring 41A, the through hole 341 of the top leaf spring 41B, the through hole 341 of the top leaf spring 41C, and the triangular surface D2 are obtained thereby. The path for moving the virtual triangular surface D2 and the direction of rotation and angle of rotation of the virtual triangular surface D2 in order to superimpose the triangle are surface D2, in a state wherein the positional relationships are maintained, onto the virtual triangular surface D1, wherein the positional relationships are maintained are calculated next.

Here the "superimposition" of one triangular surface and another triangular surface means causing the position of the center of the virtual triangular surface D1 and the position of the center of the virtual triangular surface D2 to be coincident, and causing the direction of the virtual triangular surface D1 and the direction of the virtual triangular surface D2 to match. The orientation of the virtual triangular surface D1 and the orientation of the virtual training in the surface D2 can be caused to match through rotating the virtual triangular surface D2 so as to minimize the sum of the distances between mutually corresponding corners in a state wherein the center points are coincident.

Note that this "center point" includes the vicinity of a center point, in a range that does not produce positioning error.

As a result, in the same manner as in Embodiment 11, the path for moving the virtual triangular surface D2 is calculated from the coordinates of the center of the virtual triangular surface D1 and the coordinates of the center of the virtual triangular surface D2. Moreover, the direction and angle of rotation of the virtual triangular surface D2 is calculated from the coordinates of the center of the virtual triangular surface D1 and the coordinates of the center and of the corners of the virtual triangular surface D2. In the same manner as in Embodiment 11, the OIS frame portion 30 is moved based on the path that was calculated. Through this, the position of the center of the virtual triangular surface D1 and the position of the center of the virtual triangular surface D2 can be caused to match. Additionally, the OIS frame portion 30 is rotated based on the direction of rotation and angle of rotation that have been calculated. Through this, the orientation of the virtual triangular surface D1 and the orientation of the virtual triangular surface D2 can be caused to match.

Finally, the OIS frame portion 30 is placed on the base portion 10, with a spacer therebetween.

The positions of the base portion 10 and the OIS frame portion 30 are aligned through the steps described above.

In the present embodiment, the position of the center of the virtual triangular surface D1 and the position of the center of the virtual triangular surface D2 are caused to match, and thus the tolerance in assembly, and the tolerance in manufacturing of the components, and the like, can be distributed to each of the corners of the virtual triangular surface D1 and triangular surface D2. This improves the accuracy of the alignment between the base portion 10 and the OIS frame portion 30.

The insertion of the respective suspension wires 42A, 42B, and 42C into the respectively corresponding through holes 341 and through holes 514 will be explained.

First the aligned base portion 10 and OIS frame portion 30 are imaged. Moreover, in the same manner as in Embodiment 11, the suspension wires 42A, 42B, and 42C, which are held in jigs, are imaged.

The respective spacings between the suspension wires 42A, 42B, and 42C are set to the design values.

Following this, in the same manner as aligning the base portion 10 and the OIS frame portion 30 in the present embodiment, the triangular surface D2 of the OIS frame portion 30 and a triangle that connects the centers of the respective tip end portions of the suspension wires 42A, 42B, and 42C (described below as "the triangular surface that connects the tip end portions") are calculated.

Moreover, in the same manner as aligning the base portion 10 and the OIS frame portion 30 in the present embodiment, the central positions and orientations of the virtual triangular surface D2 and the virtual triangular surface that connects the tip portions are caused to match.

Finally, the suspension wires 42A, 42B, and 42C are released from the jigs.

Through the process described above, the respective suspension wires 42A, 42B, and 42C can be inserted into the respectively corresponding through holes 341 and through holes 514.

As described above, even in aligning the suspension wires 42A, 42B, and 42C with the respectively corresponding through holes 341 and through holes 514, the positions and orientations of the virtual triangular surface D2 and the virtual triangle that connects the tip portions are caused to match, and thus the tolerance in assembly, and the tolerance in manufacturing of the components, and the like, can be distributed to each of the corners of the virtual triangular surface D2 of the triangular surface that connects the tip end portions. This improves the precision of the alignment.

Moreover, because the precision of the alignment is improved, the diameters of the through holes 341 and of the through holes 514 can be reduced. This improves the accuracy and reliability of the camera shake correction of the lens driving device 100. In the examples, the combinations of the suspension wires 42A, 42B, 42C, and 42D are arbitrary. Moreover, the rotations of the line segments S1, S2, S3, and S4, the triangular surfaces D1 and D2, and of the triangular surface that connects the tip end portion are not limited to being within a plane that is parallel to the XY plane. Moreover, while in the above examples, the OIS frame portion 30 was moved, the base portion 10 may be moved instead.

Moreover, the suspension wires 42A, 42B, 42C, and 42D may be inserted into the respectively corresponding through holes 341 and through holes 514 simultaneously. The centers of the triangular surfaces D1 and D2 and the triangular surface that connects the tip end portions may be defined by the centroids of the triangular surfaces D1 and D2 and of the triangular surface that connects the tip end portions.

Moreover, the positions of a portion of the jigs that hold the suspension wires 42A, 42B, and 42C, and of a portion of the aligned base portion 10 and OIS frame portion 30, may be aligned.

Some or all of the portions of the above may be described also as in the addenda below:

An aligning method that is an aligning method for aligning each of two positions of an aligning object to respective positions of a first object and a second object, including:

a step for finding a direction of a first line segment that connects the two specific positions, and the position of a midpoint of the first line segment;

a step for finding a direction of a second line segment that connects the first object and the second object, and the position of a midpoint of the second line segment;

a step for matching the direction of the first line segment and the direction of the second line segment, in a state wherein the relative positioning between the first object and the second object is maintained; and a step for matching the position of the midpoint of the first line segment and the position of the midpoint of the second line segment, in a state wherein the relative positioning between the first object and the second object is maintained.

An aligning method that is an aligning method for aligning each of N (wherein began is in integer no less than 3) positions of an aligning object to respective positions of N subjects, including:

a step for finding an orientation of a first polygonal surface that is formed through connecting sequentially the N prescribed positions, and the position of the center point of the first polygonal surface;

a step for finding an orientation of a second polygonal surface that is formed through connecting sequentially the N subjects, and the position of the center point of the second polygonal surface;

a step for matching the orientation of the first polygonal surface and the orientation of the second polygonal surface, in a state wherein the relative positioning between the N subjects is maintained; and a step for matching the position of the center point of the first polygonal surface and the position of the center point of the second polygonal surface, in a state wherein the relative positioning between the N subjects is maintained.

An aligning method as set forth in Supplementary Note 1, wherein:

the first object and the second object are suspension wires, and the two prescribed positions are positions of through holes into which the suspension wires are to be inserted.

An aligning method as set forth in Supplementary Note 2, wherein:

The N subjects are suspension wires, and the N prescribed positions are positions of through holes into which the suspension wires are to be inserted.

A method for manufacturing a lens driving device, including:

an aligning method as set forth in any one of Supplemental Notes 1 through 4.

A computer program for causing a computer to function as:

first position detecting means for finding a direction of a first line segment that connects the two specific positions of subjects for alignment, and the position of a midpoint of the first line segment;

second position detecting means for finding a direction of a second line segment that connects the first object and the second object, and the position of a midpoint of the second line segment;

first rotating means for matching the direction of the first line segment and the direction of the second line segment, in a state wherein the relative positioning between the first object and the second object is maintained; and first moving means for matching the position of the midpoint of the first line segment and the position of the midpoint of the second line segment, in a state wherein the relative positioning between the first object and the second object is maintained.

A computer program for causing a computer to function as:

third position detecting means for finding an orientation of a first polygonal surface that is formed through connecting sequentially N (where N is an integer no less than 3) prescribed positions of an alignment subject, and the position of the center point of the first polygonal surface;

fourth position detecting means for finding an orientation of a second polygonal surface that is formed through connecting sequentially the N subjects, and the position of the center point of the second polygonal surface;

second rotating means for matching the orientation of the first polygonal surface and the orientation of the second polygonal surface, in a state wherein the relative positioning between the N subjects is maintained; and second moving means for matching the position of the center point of the first polygonal surface and the position of the center point of the second polygonal surface, in a state wherein the relative positioning between the N subjects is maintained.

A lens driving device comprising:

a suspension wire;

a leaf spring, having a first through hole through which one end portion of the suspension wire is inserted, connected to the suspension wire;

a supporting plate, having a second through hole through which the other end portion of the suspension wire is inserted, connected to the suspension wire;

a lens retaining portion for holding the lens, supported on the leaf spring and the suspension wire; and a driving portion for driving the lens retaining portion in a direction perpendicular to the optical axial direction of the lens, wherein:

the ratio of the diameter of the first through hole to the diameter of the suspension wire and/or the ratio of the diameter of the second through hole to the diameter of the suspension wire is no greater than 5.0.

A lens driving device as set forth in Supplementary Note 8, wherein:

the ratio of the diameter of the first through hole to the diameter of the suspension wire and/or the ratio of the diameter of the second through hole to the diameter of the suspension wire is no greater than 1.3.

A lens driving device as set forth in Supplementary Note 8, wherein:

the ratio of the diameter of the first through hole to the diameter of the suspension wire and/or the ratio of the diameter of the second through hole to the diameter of the suspension wire is no greater than 1.1.

An imaging device, comprising:

a lens driving device as set forth in any one of Supplementary Notes 8 through 10.

An electronic device, comprising:

a lens driving device as set forth in any one of Supplementary Notes 8 through 10.

Although an embodiment according to the present invention has been explained above, the present invention is not limited to this embodiment, but rather may be varied in a variety of ways within a range that does not deviate from the spirit or intent of the present invention.

The invention claimed is:

1. A case, comprising:

a plate-shaped base; and a cover having a bottom plate and a side plate that extends from and end portion of the bottom plate, for covering a primary face of the base, wherein:

the base has, on the primary face, a wall portion that extends along a peripheral edge portion of the primary face and that faces the side plate of the cover, the wall portion extending from the primary face of the base in a direction towards the bottom plate of the cover;

the side plate has an opening portion that exposes a portion of the wall portion;

wherein the base and the cover are bonded by an adhesive agent provided in a gap between the wall portion and the side plate; and wherein the gap has a cross-sectional area that is perpendicular to the wall portion, wherein the cross-sectional area decreases in height from the wall portion that is exposed from the opening portion towards a length-direction end portion of the wall portion, wherein a height of the wall portion from the primary face of the base gradually decreases from a center of the wall portion towards edges of the wall portion, wherein the adhesive agent penetrates into the gap through capillary action.

2. The case as set forth in claim 1, wherein:

the height of the wall portion is lowered stepwise.

3. The case as set forth in claim 1, wherein:

the spacing of the gap between the wall portion and the side plate is narrower further toward the primary face of the base from the height-direction end portion of the wall portion.

4. The case as set forth in claim 3, wherein:

the face of the wall portion that faces the side plate is angled relative to the a plane that is perpendicular to the primary face of the base.

5. The case as set forth in claim 3, wherein:

the face of the side plate that faces the wall portion is angled relative to the a plane that is perpendicular to the primary face of the base.

6. The lens driving device comprising:

as set forth in claim 1;

a lens retaining portion, for holding a lens, enclosed within the case; and a driving portion, enclosed within the case, for driving the lens retaining portion in the optical axial direction of the lens or in a direction that is perpendicular to the optical axial direction of the lens.

7. The lens driving device comprising:

a lens retaining portion for holding a lens group;

a driving portion for driving the lens retaining portion in the optical axial direction of the lens; and a position detecting portion for detecting a position of the lens retaining portion in the optical axial direction of the lens; and a case, for enclosing the lens retaining portion, the driving portion, and the position detecting portion, as set forth in claim 1, wherein:

in the plan view, the driving portion and the position detecting portion are mutually provided at positions with the lens held therebetween.

8. The lens driving device comprising:

a lens retaining portion for holding a lens group;

a rectangular frame for enclosing the lens retaining portion;

two supporting portions for supporting the lens retaining portion on the frame;

a driving portion for driving the lens retaining portion in the optical axial direction of the lens; and a case, for enclosing the lens retaining portion, the frame, the two supporting portions, and the driving portion, as set forth in claim 1, wherein:

in the plan view, the supporting portions are disposed at respective opposing corner portions of the frame, and the driving portion is disposed in a corner portion other than the corner portions wherein the supporting portions are disposed.

9. The imaging device, comprising:

a lens driving device as set forth in claim 6.

10. The electronic device, comprising:

a lens driving device as set forth in claim 6.

11. A method for manufacturing a case that comprises, on a primary face, a plate-shaped base that has a wall portion that extends along a peripheral portion of the primary face, and a cover having a bottom plate and a side plate that extends from and end portion of the bottom plate and that is provided with an opening portion, for covering a primary face of the base, the wall portion extending from the primary face of the base in a direction towards the bottom plate of the cover, comprising the steps of:

causing the side plate and the wall portion to oppose each other, exposing a portion of the wall portion from the opening portion, and disposing the cover on the base;

filling a gap between the wall portion and the side plate with an adhesive agent from the opening portion, the base and the cover being bonded by the adhesive agent;

causing the adhesive agent to penetrate from the wall portion that is exposed from the opening portion in at least a direction wherein the cross-sectional area of the gap between the wall portion and the side plate becomes narrow; and curing the adhesive agent that has penetrated into the gap between the wall portion and the side plate, wherein a height of the wall portion from the primary face of the base gradually decreases from a center of the wall portion towards edges of the wall portion, wherein the adhesive agent penetrates into the gap through capillary action.

* * * * *